US008159945B2

(12) United States Patent
Muro et al.

(10) Patent No.: US 8,159,945 B2
(45) Date of Patent: Apr. 17, 2012

(54) SENSOR NETWORK SYSTEM AND DATA PROCESSING METHOD FOR SENSOR NETWORK

(75) Inventors: Keiro Muro, Koganei (JP); Minoru Ogushi, Kodaira (JP); Kei Suzuki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1377 days.

(21) Appl. No.: 11/797,875

(22) Filed: May 8, 2007

(65) Prior Publication Data
US 2008/0031139 A1 Feb. 7, 2008

(30) Foreign Application Priority Data
Aug. 4, 2006 (JP) .................................. 2006-213338

(51) Int. Cl.
H04L 12/26 (2006.01)
(52) U.S. Cl. .......................... 370/232; 370/235; 370/254
(58) Field of Classification Search ........ 370/229–235.1, 370/252; 709/223
See application file for complete search history.

(56) References Cited

U.S. PATENT DOCUMENTS

| | | | | |
|---|---|---|---|---|
| 6,081,843 A * | 6/2000 | Kilkki et al. | .................. | 709/232 |
| 7,130,937 B2 * | 10/2006 | Hwang et al. | .................... | 710/57 |
| 7,250,855 B2 * | 7/2007 | Suenbuel et al. | ............. | 340/511 |
| 7,552,167 B2 * | 6/2009 | Yoshioka | ...................... | 709/203 |
| 2003/0165146 A1 * | 9/2003 | Sultan et al. | ................... | 370/403 |
| 2004/0136029 A1 | 7/2004 | Zhang et al. | | |
| 2004/0254652 A1 * | 12/2004 | Ota et al. | ......................... | 700/12 |
| 2005/0083850 A1 * | 4/2005 | Sin et al. | ........................ | 370/252 |
| 2006/0019695 A1 | 1/2006 | Miyazaki et al. | | |
| 2006/0167634 A1 * | 7/2006 | Cho et al. | ........................... | 702/5 |
| 2006/0224619 A1 * | 10/2006 | Kang et al. | ................ | 707/103 X |
| 2007/0021106 A1 * | 1/2007 | Kawasaki et al. | ........... | 455/412.1 |
| 2010/0070618 A1 * | 3/2010 | Kim et al. | ..................... | 709/221 |
| 2010/0274920 A1 * | 10/2010 | Kunii et al. | ................... | 709/233 |

FOREIGN PATENT DOCUMENTS

| | | |
|---|---|---|
| CN | 1399446 A | 7/2001 |
| JP | 2005-159646 | 11/2003 |

* cited by examiner

*Primary Examiner* — Hassan Kizou
*Assistant Examiner* — Roberta A Shand
(74) *Attorney, Agent, or Firm* — Stites & Harbison, PLLC; Juan Carlos A. Marquez, Esq.

(57) ABSTRACT

An overload on a communication path in a sensor network system is prevented while transferring information from a sensor node as close to real time as possible. When the transfer rate of events transferred from a boundary node (DR) toward a gateway (GW) exceeds a limit transfer rate (VL), one of nodes on the sensor node (S) side whose transmission rate meets a preset condition is identified as an excess transmission rate node. The excess transmission rate node, or a node that is not the excess transmission rate node and whose transmission rate should be reduced, is chosen as a deceleration node. A node that reduces the transmission rate of events from the deceleration node, or the transfer rate of the events, is chosen as a deceleration processing executing node. The deceleration processing executing node is instructed to execute preset processing.

18 Claims, 39 Drawing Sheets

| 140 | |
|---|---|
| | OBSERVATION VALUE JUDGING LOGIC |
| INTERMITTENT TYPE | ALWAYS TRUE |
| EVENT-DRIVEN TYPE | OBSERVATION VALUE > THRESHOLD |
| | OBSERVATION VALUE - LAST OBSERVATION VALUE > THRESHOLD |

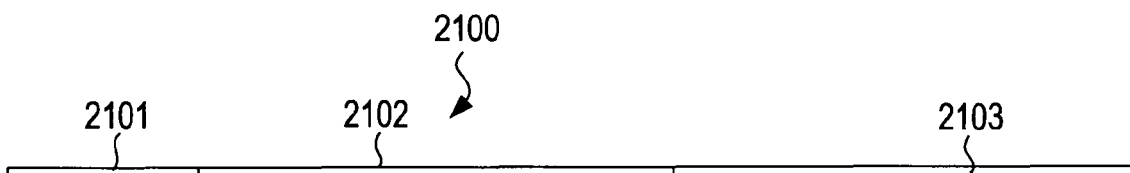

| RULE | DECELERATION NODE | DECELERATION PROCESSING EXECUTING NODE |
|---|---|---|
| RULE1 | EXCESS TRANSMISSION RATE NODE | DR |
| RULE2 | OTHER THAN EXCESS TRANSMISSION RATE NODE | DR |
| RULE3 | EXCESS TRANSMISSION RATE NODE | EXCESS TRANSMISSION RATE NODE |
| RULE4 | OTHER THAN EXCESS TRANSMISSION RATE NODE | OTHER THAN EXCESS TRANSMISSION RATE NODE |
| RULE5 | EXCESS TRANSMISSION RATE NODE | CR |
| RULE6 | EXCESS TRANSMISSION RATE NODE | PR |

FIG. 15

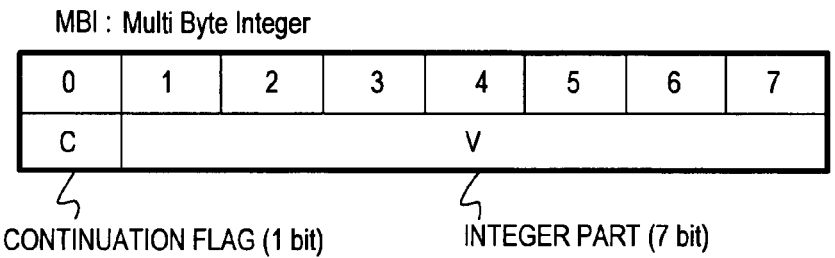
FIG. 33
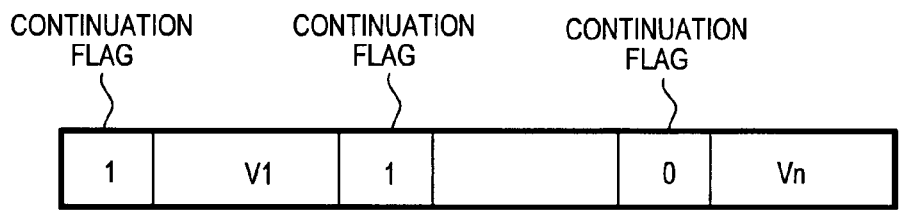
FIG. 34
| | TEMPERATURE V | TIME T |
|---|---|---|
| ABSOLUTE VALUE a | TEMPERATURE Ta : 23.10 °C<br>→ 2310 WHEN MULTIPLIED BY 100<br>→ 0x0906 (2 bytes IN HEX) | TIME Va : 2006/01/01 00:00:00<br>2000/01/01 00:00:00<br>→ 189,216,000 SECONDS SINCE 2000/01/01 00:00:00<br>→ 0x0B473500 (4 bytes IN HEX) |
| RELATIVE VALUE r | RELATIVE TEMPERATURE Tr :<br>HIGHER THAN REFERENCE NODE BY 1.0°C<br>→ 100 WHEN MULTIPLIED BY 100<br>→ 0x64 (1 byte IN MBI) | RELATIVE TIME Vr: 10 SECONDS BEHIND REFERENCE NODE<br>→ 0x0A (1 byte IN MBI) |
FIG. 35

SENSOR NETWORK SYSTEM AND DATA PROCESSING METHOD FOR SENSOR NETWORK

CLAIM OF PRIORITY

The present application claims priority from Japanese application P2006-213338 filed on Aug. 4, 2006, the content of which is hereby incorporated by reference into this application.

BACKGROUND OF THE INVENTION

This invention relates to a technique of utilizing information from many sensor nodes that are connected to a network, and more particularly, to a sensor network system capable of smoothly delivering information sent from the sensor nodes.

Sensor network system technology has been advancing in recent years. A sensor network system (hereinafter referred to as sensor net system) collects, via a network, sensing data which is obtained from many sensor nodes, and makes the information obtained from the many sensor nodes available over a network to computers and apparatuses that are located away from the sensor nodes.

In a sensor net system, information obtained by many sensor nodes is sent to a server computer or the like via relay stations or base stations, and the server computer gathers the information of the sensor nodes. The thus structured sensor net system has a possibility that too much amount of information from one sensor node causes a processing overload in a relay station or a base station that transfers the information, and accordingly a failure in collecting information from other nodes is generated. A technique for avoiding such a failure has been known in which a terminal whose communication characteristics (e.g., transmission intervals) deviate from average communication characteristics by a given degree or more is deemed as out of order and a server computer withholds sending of data to this terminal (see JP 2005-159646 A, for example).

Another avoidance technique has also been known in which a sensor node that sends a large amount of information is deemed as an abnormal sensor node and only information from normal sensor nodes is transmitted while information from any abnormal sensor nodes is discarded (see JP 11-120104 A, for example).

SUMMARY OF THE INVENTION

A communication failure may occur in a sensor net system when a router apparatus such as a relay station or a base station on a communication path between a sensor node and a server computer is required to transfer data in an amount that is equal to or more than a given per-unit-time amount and when that is large enough to cause a processing overload or a communication overload in the router apparatus. A failure in one router apparatus may propagate all over the sensor net system, causing the system to shut down.

The prior art examples described above prevent an overload on a communication path in a sensor net system by judging that a sensor node is abnormal when a level of communications of the sensor node exceeds a given value and by discarding information from the abnormal sensor node or withholding sending of information to the abnormal sensor node. However, the prior art examples have a problem in that, when other factors than a trouble in the sensor node causes the overload of the router apparatus on the communication path, a communication failure in the router apparatus cannot be prevented since no sensor node is out of order and accordingly the need to check the level of communications is not recognized.

In a case of a wearable sensor node, for example, a relay node such as a relay station or a base station that is located on the premises of a business organization or an institution sends, to a server computer, information measured by a sensor node that is worn by an employee or a user. A relay node installed in a conference room or the like provides many sensor nodes a connection to a wireless network while a conference is held. If more sensor nodes than the number of attendees expected upon designing of the sensor net system access the wireless network that is under control of a router apparatus serving as the relay node, the amount of information to be relayed by the router apparatus exceeds a designed value and the router apparatus suffers a communication failure despite the fact that no sensor node is out of order.

Users of the sensor net system can appropriately change sensor node settings about information measurement intervals and information transmission conditions. For instance, a sensor node with a temperature sensor can be used for a fire alarm by setting measurement intervals and transmission conditions of the sensor node such that a measured temperature is not transmitted and the measurement is executed at 5-minute intervals while the measured temperature is below a given high temperature and, once the given high temperature is reached, the measurement intervals are changed to 10-second intervals and every measured temperature is transmitted. If a fire actually breaks out in a place where this sensor node is installed, data transfer requests from the sensor node rapidly increase in number. The prior art examples described above judge that the sensor node is out of order as soon as a count of data transfer requests from the sensor node exceeds a given value, and discard data of the sensor node no matter how the information is urgent and beneficial to users.

It is not easy in the prior art examples to judge whether a trouble in a sensor node or a user's operation is the cause of data transfer requests equal to or more than a given value, and to determine whether a sensor node is working properly or not. A sensor net system in which detailed, real-time report of a phenomenon observed by a sensor node is required must avoid, as much as possible, discarding and delayed transmission of observation information that a sensor node outputs. This is particularly true for sensor net systems that contain a sensor node for delivering a warning as the one described above. A sensor net system of this type is not allowed to judge a sensor node as out of order and discard data of the sensor node simply because the sensor node has suddenly started to issue a large number of data transfer requests as in the prior art examples.

This invention has been made in view of the above-mentioned problems, and it is therefore an object of this invention to prevent an overload on a communication path in a sensor net system while transferring information from sensor nodes in real time as possible.

A representative aspect of this invention is roughly outlined as follows. According to this invention, when a transfer rate of a relay node exceeds a preset limit transfer rate, a sensor node whose transmission rate meets a given condition is identified as an excess transmission rate node, either the excess transmission rate node or another sensor node that is not the excess transmission rate node is chosen as a deceleration node of which the transmission rate is to be reduced, either the deceleration node or a relay node that is connected to the deceleration node is chosen as a deceleration processing executing node, and the deceleration processing executing node is instructed to execute given processing.

This invention ensures reliability of a sensor net system by transferring information from sensor nodes as close to real time as possible without discarding the information completely while preventing the transfer rate of relay nodes from increasing to a level that makes a sensor network unstable.

This invention also makes sure that information that is urgent and beneficial to users is transferred without being lost or delayed.

BRIEF DESCRIPTION OF THE DRAWINGS

FIG. 8 is an example of an explanatory diagram showing an operation mode table which is used in the sensor node according to the first embodiment.

FIG. 15 is an explanatory diagram showing an example of a deceleration processing rule table according to the first embodiment.

FIG. 33 is an explanatory diagram showing an example of a data format for a variable data length integer according to the first embodiment.

FIG. 34 is an explanatory diagram showing an example of a data format for a variable data length integer that is constituted of multiple bytes according to the first embodiment.

FIG. 35 is an explanatory diagram showing an example of an observation value which is expressed in absolute value and relative value according to the first embodiment.

DETAILED DESCRIPTION OF THE PREFERRED EMBODIMENTS

Embodiments of this invention will be described below with reference to the accompanying drawings.

First Embodiment

Figure 1:
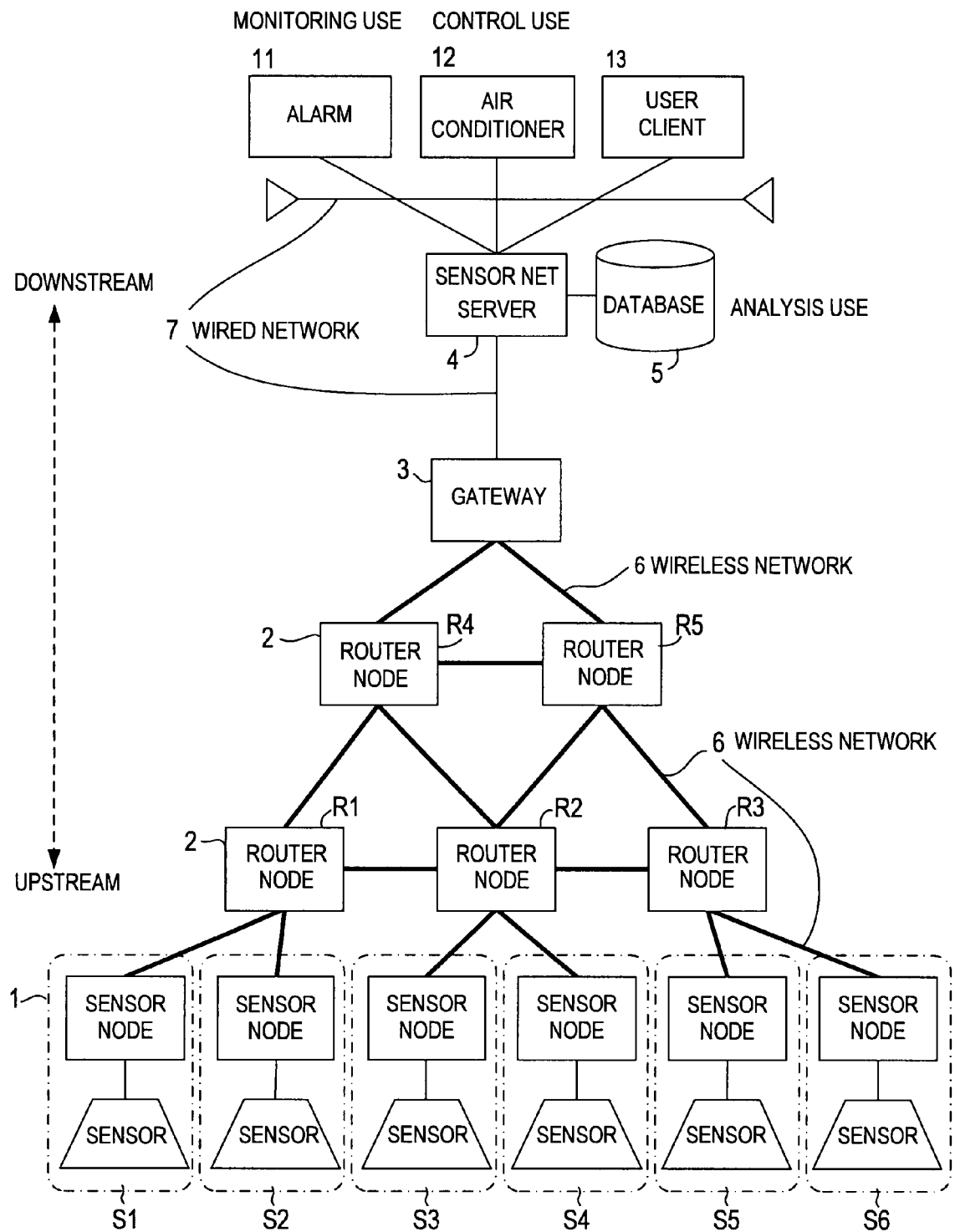
FIG. 1 is an example of a block diagram showing a sensor net system according to a first embodiment of this invention.

FIG. 1 is a block diagram showing an example of a sensor network system (hereinafter referred to as sensor net system) to which this invention is applied.

The sensor net system observes environmental information through sensors in many sensor nodes 1 dispersed throughout an environment. The observation information is delivered to a sensor net server 4 via router nodes 2 and a gateway 3 which are connected by a wireless network 6. The sensor net system thus collects observation information to the sensor net server 4 to serve as a computer system that assists a user in making a decision or the like. The sensor net server 4 has a database 5 which stores collected observation information.

Each sensor node 1 has a sensor such as a temperature sensor or a humidity sensor and an identifier for identifying an individual (person or subject), and is connected to one router node 2 via the wireless network 6. Each router node 2 has multiple sensor nodes 1 connected thereto, and collects observation information from the connected sensor nodes 1.

The router node 2 transfers observation information collected from the sensor nodes 1 that are under the direct control of this router node 2 to adjacent router nodes 2. Alternatively, the router node 2 transfers the observation information from the sensor nodes 1 to the gate way 3 to which the router node 2 is connected via the wireless network 6.

One gateway 3 is connected to the sensor net server 4 in the example of FIG. 1, but multiple gateways 3 each having the wireless network 6 may be connected to the sensor net server 4. Some router nodes 2 or gateways 3 may have no connected sensor nodes 1 to control. Such router nodes 2 or gateways 3 function as relay nodes for transferring observation information and commands. The router nodes 2 and the gateways 3 that have the sensor nodes 1 to control, too, can function as relay nodes if connected to other router nodes 2.

In this specification, sending data out of a sensor node is expressed as data transmission whereas sending data out of a relay node is expressed as data transfer. Also, a relay node is considered herein as a sensor node in the case where the relay node not only transfers data from a node under its control toward a server computer but also transmits information, for instance, when the relay node has a sensor and sends information that is obtained by the relay node to a server computer, or when the relay node sends information toward the server computer indicating a trouble due to a hardware failure or software bug of the relay node.

The gateway 3 is connected to the sensor net server 4 via a wired network 7, and transfers to the sensor net server 4 observation information which is received via the wireless network 6 from each router node 2. In the following description, multiple sensor nodes 1 are discriminated from one another by reference symbols S1 to Sn, and multiple router nodes 2 are discriminated from one another by reference symbols R1 to Rn. The wireless network 6 in this embodiment is a multihop mesh network, enabling one router node 2 to communicate observation information and the like with another router node 2. The wireless network 6 between the router node 2 and the sensor node 1 and between the router nodes 2 can be built from, for example, a personal area network (PAN).

The gateway 3 and the sensor net server 4 are connected to the wired network 7. Also connected to the wired network 7 are an alarm 11 and an air conditioner 12, which operate in accordance with instructions from the sensor net server 4, and a user terminal 13.

The sensor net server 4 sounds an alert by sending an instruction to start operating to the alarm 11 when observation information from a given sensor node 1 exceeds a given temperature. The sensor net server 4 also sends an instruction to start operating to the air conditioner 12 when observation information from a given sensor node 1 exceeds a given temperature. The user terminal 13 is used by a user or an administrator to set or manage the sensor net system and utilizes observation information accumulated in the sensor net server 4. The user terminal 13 can change settings of the gateway 3, the router node 2, or the sensor node 1 via the sensor net server 4. For instance, the user terminal 13 sets the measurement interval of a sensor of a specific sensor node 1 and sends a measurement interval setting instruction (command), along with the identifier of this sensor node 1, to the sensor net server 4. The sensor net server 4 sends the setting instruction from the user terminal 13 to the specific sensor node 1, thereby instructing the sensor node 1 to change the settings. The command from the sensor net server 4 is transferred upstream to the specific sensor node 1 by the gateway 3 and the router node 2.

In FIG. 1, the direction toward the sensor node 1 is upstream for observation information and the direction toward the sensor net server 4 is downstream. The router node R1 in the example of FIG. 1 is an upstream router node whereas the router node R4 is a downstream router node. The hierarchy level of computers becomes progressively higher from the sensor nodes 1 toward the sensor net server 4.

The sensor net server 4 functions as a server node which provides collected observation information to the user terminal 13 and which gives instructions and notifications based on observation information to computers on the wired network 7.

(Configuration of the Sensor Net System)

A description will be given below on details of the components of the sensor net system shown in FIG. 1.

(Hardware Configuration of the Sensor Node)

Figure 2:
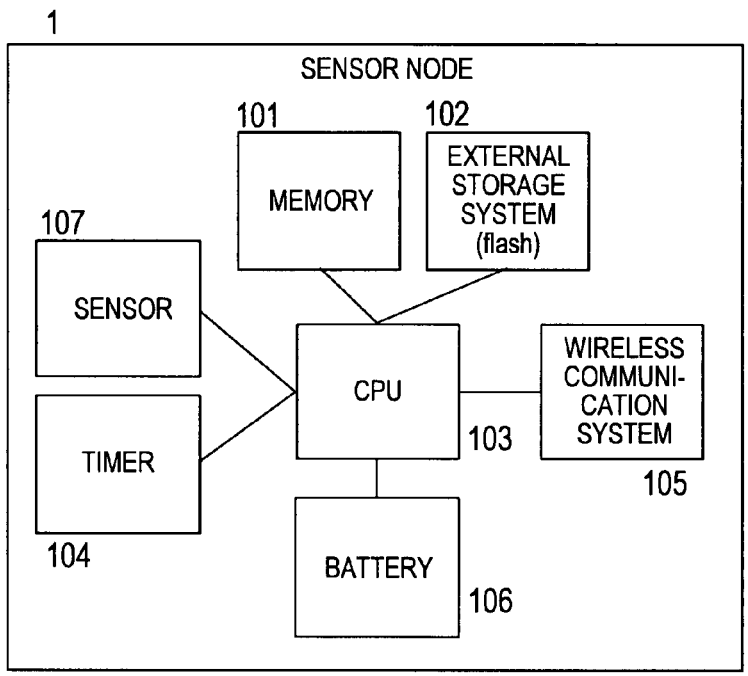
FIG. 2 is an example of a block diagram showing hardware of a sensor node according to the first embodiment.

FIG. 2 is a block diagram showing the configuration of each sensor node 1. The sensor node 1 is a node that observes an environment and issues observation information as an event. The sensor node 1 contains a memory 101, a CPU 103, a non-volatile external storage system 102 for long-term data recording, a sensor 107 for environment observation, a timer 104 used to activate the sensor node 1 periodically, a wireless communication device 105 for wireless communications with the router node 2 and others, and a battery 106 as a power source for the components of the sensor node 1.

The term event refers to a communication frame that stores information issued voluntarily by a node (the sensor node 1, the router node 2, or the gateway 3. The same applies in the following description.) and indicative of a state or a change in state. The term command refers to a communication frame with which a node is asked to perform some processing.

A program recorded in the external storage system 102, which is constituted of a flash memory or the like, is read onto the memory 101 upon activation of the sensor node 1, and is executed by the CPU 103 to drive the sensor 107 in a given cycle (measurement interval) and obtain observation information as will be described later. The obtained observation information is transmitted as an event to the router node 2. The sensor node 1 avoids idle power consumption and makes the battery 106 last long by executing, repeatedly at measurement intervals that are preset in the timer 104, processing in which the CPU 103 is activated for acquisition and transmission of observation information and then the CPU 103 as well as the rest of the components enter a sleep state. The measurement interval of the sensor node 1 is set to, for example, 5 minutes, and the sensor node 1 sends observation information to the router node 2 intermittently or when driven by an event.

The sensor 107 can be, for example, a temperature sensor, a humidity sensor, an illuminance sensor, a distortion sensor for detecting the loosening of a bolt, a pressure sensor for detecting someone seating on a chair or opening and closing of a door, an infrared sensor for detecting the presence of a person, or an infrared sensor for detecting pulses. Name tag nodes attached to clothing are also a type of the sensor node, and a switch that detects an input made by a user through operation of a button serves as a sensor device for a name tag node.

(Hardware Configuration of the Router Node)

Figure 3:
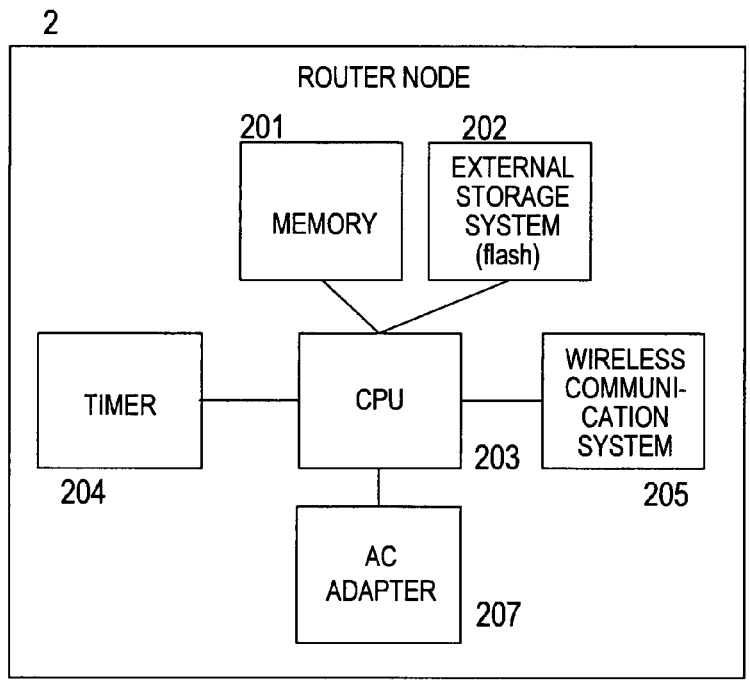
FIG. 3 is an example of a block diagram showing hardware of a router node according to the first embodiment.

FIG. 3 is a block diagram showing the configuration of each router node 2. The router node 2 is a node for relaying communications. The router node 2 is composed of a memory 201, a CPU 203, a timer 204, a non-volatile external storage system 202 for long-term data recording, a wireless communication device 205 for communications via the wireless network 6, and an AC adapter 207 as a power source to the components of the router node 2. When the router node 2 is activated, the CPU 203 reads onto the memory 201 a program recorded in the external storage system 202, which is constituted of a flash memory or the like, and executes the program to perform processing.

The router node 2 receives, as an event, observation information issued by the sensor node 1, and transfers the event downstream to another router node 2 or to the gateway 3. Which communication path each router node 2 should use in transferring events and commands to the gateway 3 or the sensor node 1 is set in advance through the user terminal 13 or other measures.

The router node 2 transfers an event from the sensor node 1 downstream to another router node 2 or to the gateway 3, and transfers a command from a downstream router node 2 or gateway 3 upstream to another router node 2 or to the sensor node 1.

The router node 2 also monitors the event transfer rate (the data transfer amount per unit time or the communication velocity) and judges whether or not a given limit transfer rate (or limit velocity) VL has been exceeded. The router node 2 is determined as a boundary node, which is the initiator of deceleration processing, when the velocity of inflow from any node that is under direct control of this router node 2 does not exceed the limit transfer rate. In other words, the router node 2 that is downstream of the initiator of deceleration processing is prevented from redundantly being another initiator of deceleration processing. "The initiator of deceleration processing" means a router node that performs processing of determining the deceleration amount, selecting a deceleration processing executing node, and the like as will be described later.

The limit transfer rate VL is set in advance to each router node 2 (or gateway 3) in a velocity corresponding to the processing performance of the CPU 203 and the communication device 205 while allowing a given margin for the event transfer amount that the router node 2 (or the gateway 3) can handle per unit time.

The transfer rate (the reception velocity or the transmission velocity) and the limit transfer rate VL are expressed in, for example, per-second packet count or per-second octet count.

The router node 2 that is determined as the initiator of deceleration processing performs deceleration processing in order to avoid excessively high transfer rate. Deceleration processing is outlined as follows:

(1) Boundary Node Determining Processing

When one router node 2 detects a transfer rate anomaly in which the event transfer rate exceeds the limit transfer rate VL, there is a possibility that an upstream router node 2 has detected the transfer rate anomaly as well. The router node 2 therefore judges whether the initiator of deceleration processing is itself or another node. The own node is judged as a boundary node and serves as the instruction giver in deceleration processing when the inflow velocity of data from a node upstream of the own node (the transmission rate in the case of data from the sensor node 1, and the transfer rate in the case of data from the router node 2) is normal whereas the transfer rate of data from the own node to a downstream node is excessively high. The router node 2 that detects an excessively high transfer rate does not serve as the instruction giver in deceleration processing unless the router node 2 is a boundary node.

(2) Selection of a Deceleration Processing Target

Deceleration processing is executed by the boundary node itself, the router node 2 that is upstream of the boundary node 2, or the sensor node 1.

A node that executes deceleration processing can choose, as a target node of deceleration processing (a deceleration node), either a specific sensor node of which the transmission rate is excessively high (an excess transmission rate node) or another sensor node that is not the excess transmission rate node.

The term excess transmission rate node refers to the sensor node 1 whose per-unit time data transmission amount (transmission rate) satisfies Expression (5) described below. Examples of the excess transmission rate node include the following.

A. The sensor node 1 that transmits a large amount of data due to a software bug or a hardware failure, in other words, the sensor node 1 in which an anomaly is generated.

B. An intermittent sensor node 1 to which an excessively high transmission rate is set through the user terminal 13 (for example, the sensor node 1 that is set to take measurement at an interval of a few seconds).

C. An unauthorized sensor node 1 that is installed with a malicious intent to issue events in large amount to thereby shut down the sensor net system.

Figure 7:
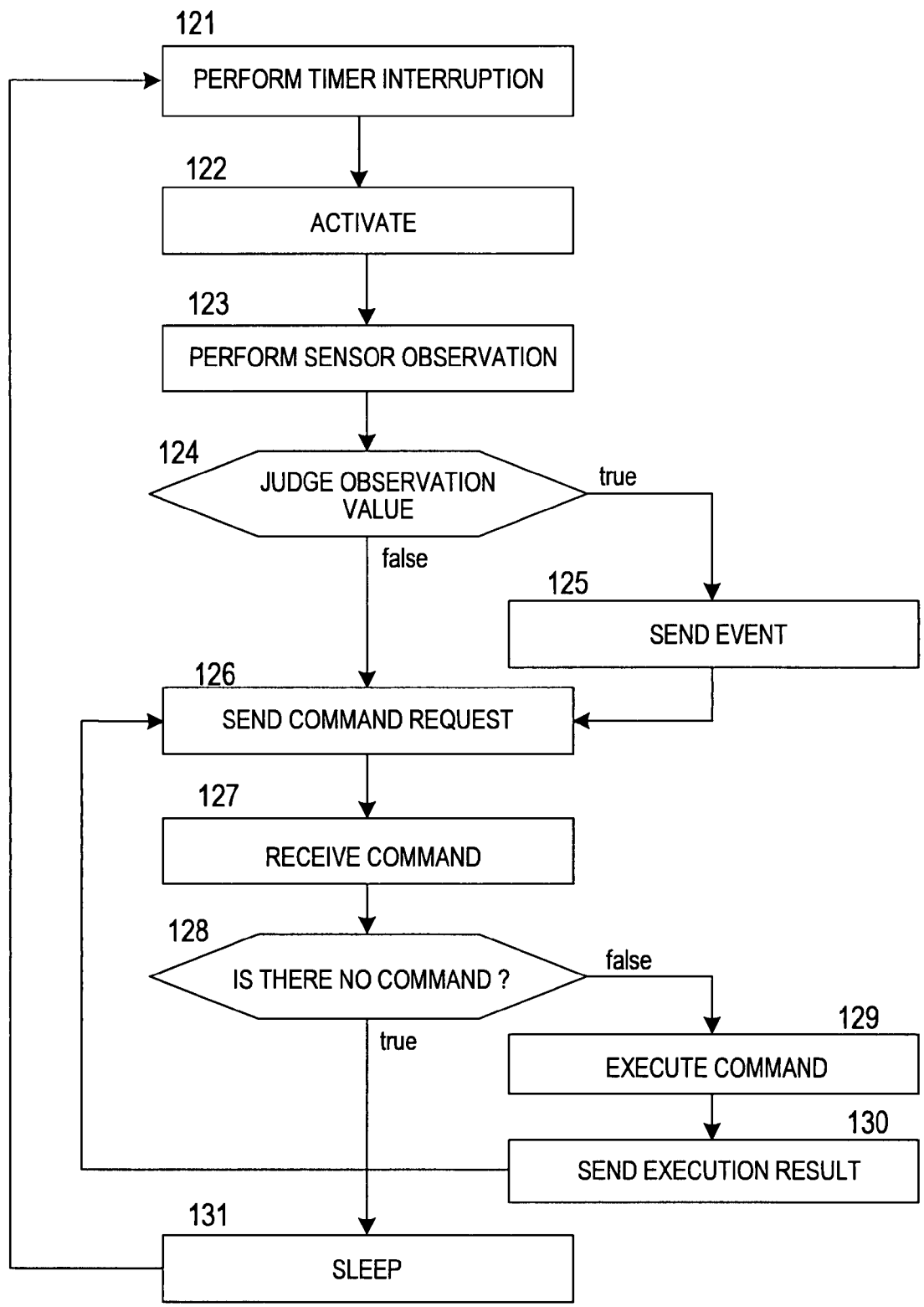
FIG. 7 is a flow chart showing an example of processing that is executed in the sensor node according to the first embodiment.

D. An event-driven sensor node 1 that sends events in large amount as a result of a condition being met in succession (the event-driven type constantly observes with the sensor 107 as opposed to the intermittent type, which is shown in FIG. 7, and transmits only when a given condition is met).

E. A large number of sensor nodes under control of one router node, for example, wearable sensor nodes 1 worn by many conference attendees who flock to a conference room in which the router node 2 is installed.

As described above, in addition to a sensor node whose transmission rate is excessively high due to a failure, any sensor node is deemed as an excess transmission rate node when the sensor node is normal but has an excessively high transmission rate due to settings, or when the sensor node has a normal transmission rate but the router node transfer rate exceeds the limit transfer rate while at the same time Expression (5) is satisfied.

Accordingly, there is a possibility that an event from an excess transmission rate node has to be given priority. An example of this is a case where the sensor node 1 is the event-driven type and a user requests an event from a sensor node that meets a given condition as in the above-mentioned item D. Another example is a case where the sensor node 1 is the intermittent type and a user requests extremely short-term data as in the above-mentioned item B. Still another example is a case where the above-mentioned items E and B or E and D are true. Then, an event from an excess transmission rate node has to be given priority.

Whether to choose an excess transmission rate node as a deceleration node is therefore determined by whether or not an event measured by the sensor node is urgent to the user, in other words, whether it is beneficial to the user. For instance, when a sensor node that measures the temperature transmits events in large amount because of a fire, or when a sensor node senses a higher temperature or humidity than a given value in a space where foods have to be kept at an appropriate temperature and humidity and accordingly sends events in large amount, or when a sensor node that measures the acceleration transmits events in large amount because of an earthquake, those urgent events are required to be transferred downstream before other events.

Whereas urgent events are preferentially transferred, downstream transfer is restrained for events that are not urgent, for example, events transferred at an excessively high router node transfer rate simply because too many intermittent sensor nodes have gathered in one space, or events transmitted in large amount from a sensor node due to a failure in an illuminance sensor in a space where the temperature and the humidity are controlled.

In this manner, either an excess transmission rate node or a sensor node that is not an excess transmission rate node is chosen as a deceleration node depending on the purpose of a user.

(3) Selection of a Deceleration Processing Executing Node

A node that executes deceleration processing can be one chosen from the group consisting of a boundary node, an upper router node that is upstream of the boundary node, an excess transmission rate node, and a sensor node that is not an excess transmission rate node.

Deceleration processing that is executed in the sensor node 1 is reduction of a data rate (transmission rate) at which the sensor node 1 transmits events to the router node 2 or the gateway 3. Deceleration processing that is executed in the router node 2 or the gateway 3 is reduction of a data rate (transfer rate) at which events are transferred to the router node 2 or the gateway 3.

The combination of a deceleration node and a deceleration processing executing node in the items (2) and (3) is defined by rules RULE1 to RULE6, which will be described later.

(4) Specifics of Deceleration Processing

As mentioned above, deceleration processing is classified into processing in which the sensor node 1 reduces its own transmission rate and processing in which the router node 2 reduces the transfer rate upon reception of data from the sensor node 1.

Deceleration processing in which the sensor node 1 itself reduces the amount of data transmitted per unit time includes the following.

a1: Increasing the measurement interval of the sensor node 1.

a2: Sending observation information in a mass.

a3: Carrying out "pseudo-communications" between the sensor node 1 and the router node 2.

Deceleration processing in which the router node 2 reduces the transfer data amount includes the following.

b1: Cutting up observation information from a deceleration node into three pieces, the maximum value, the minimum value, and the mean value.

b2: Sending observation information in a mass.

As described above, deceleration processing is executed by determining a boundary node which initiates the deceleration processing, determining a deceleration node, determining a deceleration processing executing node, and determining which type of deceleration is to be carried out.

This deceleration processing makes it possible to transfer information from a sensor node as close to real time as possible without discarding the information completely while preventing the transfer rate of a relay node from increasing to a level that makes the sensor network unstable.

Furthermore, since an excess transmission rate node or a sensor node that is not an excess transmission rate node is chosen as a deceleration target depending on whether information from the node is urgent or not, an event from an excess transmission rate node can be transferred downstream instead of being discarded or delayed if the event is beneficial to a user.

(Hardware Configuration of the Gateway)

Figure 4:
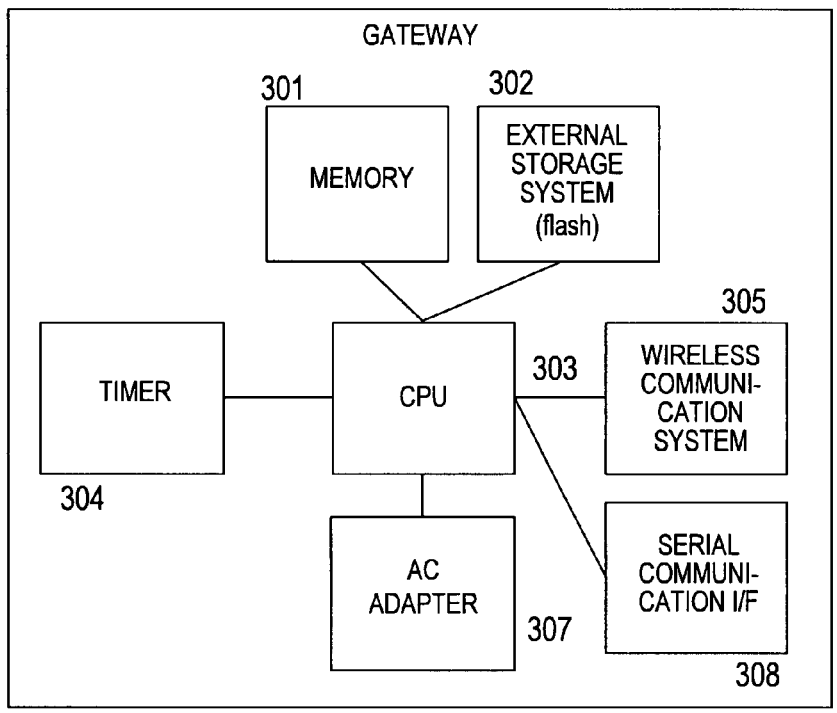
FIG. 4 is an example of a block diagram showing hardware of a gateway according to the first embodiment.

FIG. 4 is a block diagram showing the configuration of the gateway 3. The gateway 3 is similar to the router node 2 in that it is a node for relaying communications, but differs from the router node 2 in that it communicates with the wireless network 6 and the wired network 7 both.

The gateway 3 is composed of a memory 301, a CPU 303, a timer 304, a non-volatile external storage system 302 for long-term data recording, a wireless communication device 305 for communications via the wireless network 6, an AC adapter 307 as a power source to the components of the gateway 3, and a serial communication interface 308 for communications with the wired network 7. When the gateway 3 is activated, the CPU 303 reads onto the memory 301 a program recorded in the external storage system 302, which is constituted of a flash memory or the like, and executes the program to perform processing.

The gateway 3 receives an event from the router node 2 over the wireless network 6, and transfers the event to the sensor net server 4 over the wired network 7. The gateway 3 receives a command from the sensor net server 4 over the wired network 7, and transfers the command upstream to the router node 2 over the wireless network 6.

The gateway 3 also monitors the event transfer rate (the data transfer amount per unit time) and judges whether or not the given limit transfer rate VL is exceeded or not. The limit transfer rate VL is set in advance to the gateway 3 in accordance with the processing performance of the CPU 303 and the transfer rate of the communication device 305 while allowing a given margin for the event transfer amount that the gateway 3 can handle per unit time.

When the transfer rate of received events exceeds the limit transfer rate VL and it is a boundary node, the gateway 3 judges that the upstream router node 2 or sensor node 1 is issuing events in large amount and performs deceleration processing to prevent the transfer rate from increasing to an excessive level in the manner described above with reference to the router node 2.

(Hardware Configuration of the Server)

Figure 5:
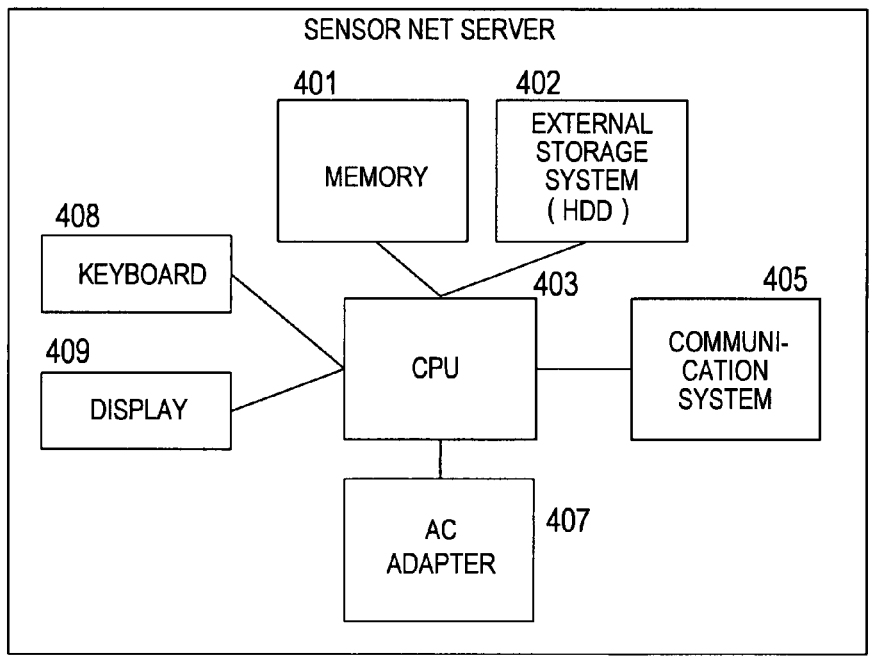
FIG. 5 is an example of a block diagram showing hardware of a sensor net server according to the first embodiment.

FIG. 5 is a block diagram showing the configuration of the sensor net server 4.

The sensor net server 4 of FIG. 5 is a server node that collects, accumulates, and delivers observation information. The sensor net server 4 is composed of a memory 401, a CPU 403, a non-volatile external storage system 402 for long-term data recording, a communication device 405 for communications, an AC adapter 407 as a power source to the components in the sensor net server 4, a keyboard 408 used for operation by an administrator, and a display 409 for displaying information. A program recorded in the external storage system 402, which is constituted of a disk device or the like, is read onto the memory 402 upon activation of the sensor net server 4, and is executed by the CPU 403 to perform given processing. The sensor net server 4 may use such storage system as a SAN or a NAS instead of a disk device.

The program read onto the memory 402 stores an event received from the gateway 3 in the database 5, and provides observation information in the database 5 as requested by the user terminal 13. The sensor net server 4 receives, from the user terminal 13 in advance, an action taken in response to a received event and a condition for executing the action. The sensor net server 4 provides a service in which a preset action is executed when a received event meets an action execution condition.

To give an example of the preset action and action execution condition, consider a case where mail is sent to the user terminal 13 of a person C when the sensor node 1 that is worn by a person A arrives at a conference room B. In this example, "when the sensor node 1 of the person A arrives at the conference room B" is the execution condition and "sending of mail" is the action.

(Software Configuration of the Sensor Node)

Figure 6:
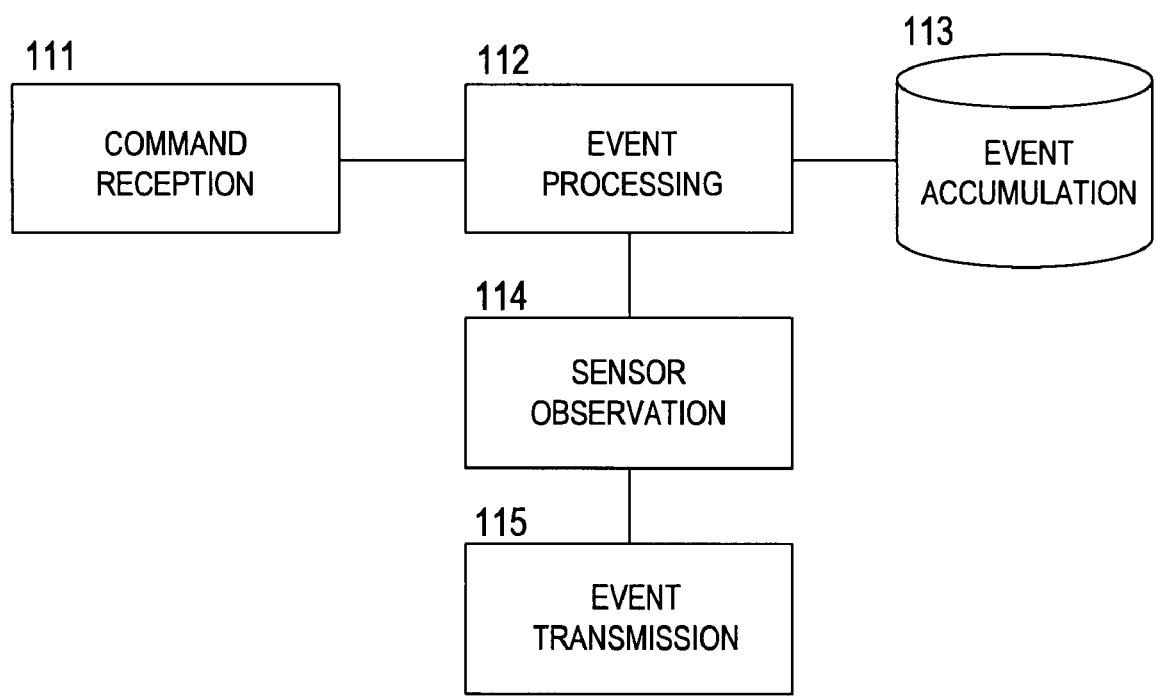
FIG. 6 is an example of a block diagram showing software function elements of the sensor node according to the first embodiment.

FIG. 6 shows software function elements of the sensor node 1 and a flow chart of FIG. 7 shows an example of processing that is executed in the sensor node 1.

Major software elements executed in the sensor node 1 are a command receiving unit 111, which receives a command from the sensor net server 4 (the user terminal 13), an event processing unit 112, which executes a received command to set the sensor node 1 or to process the event, an event accumulating unit 113, which stores, in the non-volatile memory 102 or in the memory 101, observation information measured by the sensor 107 and information created by the event processing unit 112, a sensor observation unit 114, which drives the sensor 107 to obtain observation information, and an event transmitting unit 115, which sends to the router node 2 observation information obtained by the sensor observation unit 114 or information kept by the event accumulating unit 113. The sensor node 1 executes those units in a given cycle to obtain and send observation information as described above.

An example of processing that is executed in the sensor node 1 will be described with reference to FIG. 7.

After a cycle (measurement interval) preset to the timer 104 in the sensor node 1 passes, the timer 104 issues an interruption command to the CPU 103 to activate the CPU 103 out of a sleep state (121, 122).

The activated CPU 103 drives the sensor 107 to measure the environment (123). The CPU 103 temporarily stores observation information measured by the sensor 107 in the memory 101. Referring to an operation mode table 140, which is stored in advance in the memory 101 or the non-volatile memory 102, the CPU 103 determines the current operation mode and judges whether to send observation information (124). The operation mode table 140 holds, as shown in FIG. 8, a mode 141 for sending observation information and a condition 142 for sending observation information as an event. Set as the mode 141 are an intermittent type mode in which observation information is sent each time the CPU 103 is activated intermittently, an event-driven type mode in which only observation information that meets the condition 142 is sent, and other modes. One of the modes is chosen in accordance with a request from the user terminal 13. The intermittent type is the mode that is set in the initial state. In the intermittent type mode, "always true" is set as the condition 142.

As the condition 142 in the event-driven type mode or other modes, an arbitrary conditional expression is stored such that, for example, an event is sent when the value of observation information (observation value) exceeds a given threshold, or when the difference between the current observation value and the last observation value exceeds a given threshold. The condition 142 can be set through the user terminal 13 or the sensor net server 4.

Event transmission processing (125) is always executed when the operation mode is the intermittent type. When the operation mode is the event-driven type, on the other hand, the event transmission processing is executed in the case where observation information meets the condition 142 whereas command request processing (126) is performed instead of transmission of observation information in the case where the observation information does not meet the condition 142.

In the command request processing (126), when there are commands that are directed to this sensor node 1 accumulated in the router node 2, the sensor node 1 requests downloading and receives one command (127). The sensor node 1 does not constantly request the router node 2 to send information directed to itself in order to avoid wasting the battery power of the battery 106. The sensor node 1 reduces consumption of the battery 106 by performing command reception processing subsequently to event transmission and thus reducing the number of times it connects with the router node 2.

The sensor node 1 judges whether or not a command directed to this sensor node 1 is still left in the router node 2 as a result of reception of the command (128). When a command is received, the sensor node 1 executes the command (129) and sends the result of executing the command to the router node 2 (130). The sensor node 1 then returns to the command request processing (126) and repeats the processing of Steps 126 to 130 until the router node 2 no longer has accumulated commands.

When no command addressed to its own sensor node 1 is left in the router node 2, the CPU 103 shuts down all the components of the sensor node 1 except the timer 104 and then enters into a sleep state (131).

Through repetition of the above-mentioned processing, the sensor node 1 can send events intermittently by activating the CPU 103 at given observation intervals to execute acquisition of observation information and event transmission. The above-mentioned processing also enables the sensor node 1 to receive a command from the user terminal 13 or the sensor net server 4 and change settings such as the observation interval, the operation mode, or the condition 142.

The event-driven type mode shown in FIG. 8 is not the only event-driven type mode. Also included in event-driven type modes are a batch transmission mode in which observation information obtained over separate observations is stored in the memory 101 to be sent in a single communication and a pseudo-communication mode in which observation information (or the rate of change) is sent when the rate of change of the observation information value is changed.

In any operation mode, the sensor net server 4 activates the CPU 103 and obtains observation information from the sensor 107 for every cycle set to the timer 104. The batch transmission mode is an operation mode in which observation information measured by the sensor 107 in a given cycle is kept stored in the memory 101 until the count of the stored pieces of observation information reaches a given value, the stored pieces of observation information is then sent together in a single communication to the router 2, and after the observation information is cleared from the memory 101, the above-mentioned operation is repeated.

The flow chart of FIG. 7 shows an example in which the sensor 107 makes observations intermittently. Alternatively, the sensor 107 may constantly makes observations to send observation information only when the condition 142 of the event-driven type mode shown in FIG. 8 is satisfied.

(Transfer Rate Anomaly Patterns in the Sensor Net System)

Described next are patterns in which the transfer rate becomes excessively high in the sensor net system. As described above, it is not only when a failure occurs in the sensor node 1 that an excessively high transfer rate is detected in the sensor net system, and there are cases where the transfer rate exceeds the limit transfer rate VL despite the fact that the sensor node 1 is normal.

Figure 9:
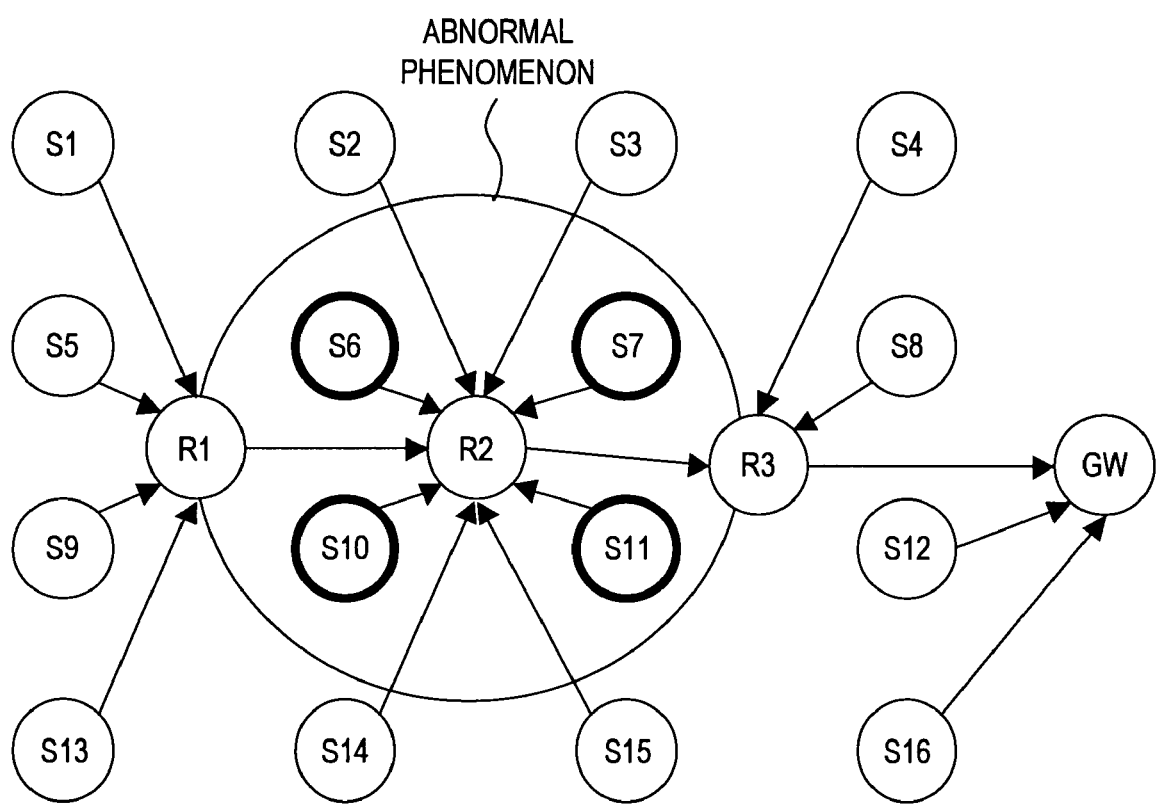
FIG. 9 is a block diagram showing an example of the sensor net system according to the first embodiment in which a router node is set up inside a structure.

FIG. 9 shows an example in which the sensor nodes S1 to S16 each having a temperature sensor as the sensor 107 are arranged inside a building. The sensor nodes S1 to S16 are each connected to one of the router nodes R1 to R3, or to the gateway 3 (GW).

The sensor nodes S1 to S16 are the event-driven type and set, for example, such that observation information is sent to the router nodes (or the gateway) when the observed temperature exceeds a given temperature. Of the router nodes of FIG. 9, the router node R1 is positioned at the most upstream followed by the router node R2 and the router node R3 positioned downstream which is connected to the gateway GW.

When a fire breaks out within the circular range in FIG. 9, the value of observation information (hereinafter referred to as observation value) from four sensor nodes in this range, that is, sensor nodes S6, S7, S10, and S11, exceeds a given temperature and events are sent to the router node R2. Although the four sensor nodes are normal, the router node R2 which has the sensor nodes S6, S7, S10, and S11 under its control receives events in large amount due to the fire in addition to events from the upstream router node R1, and accordingly transfers data to the downstream router node R3 at a transfer rate that exceeds the limit transfer rate. An excessively high transfer rate in one router node R2 also causes the transfer rate of the downstream router node R3 and of the gateway GW to exceed the limit transfer rate, thus propagating to the downstream.

In the example of FIG. 9, the node whose transfer rate has increased to an excessive level is the router node R2, and it is the sensor nodes S6, S7, S10, and S11 that have caused the excessively high transfer rate. Since events from the sensor nodes S6, S7, S10, and S11 contain urgent information, it is desirable to exclude those sensor nodes from deceleration processing targets while choosing other sensor nodes than the sensor nodes S6, S7, S10, and S11 and nodes upstream of the router node R2 as deceleration processing targets.

Figure 10:
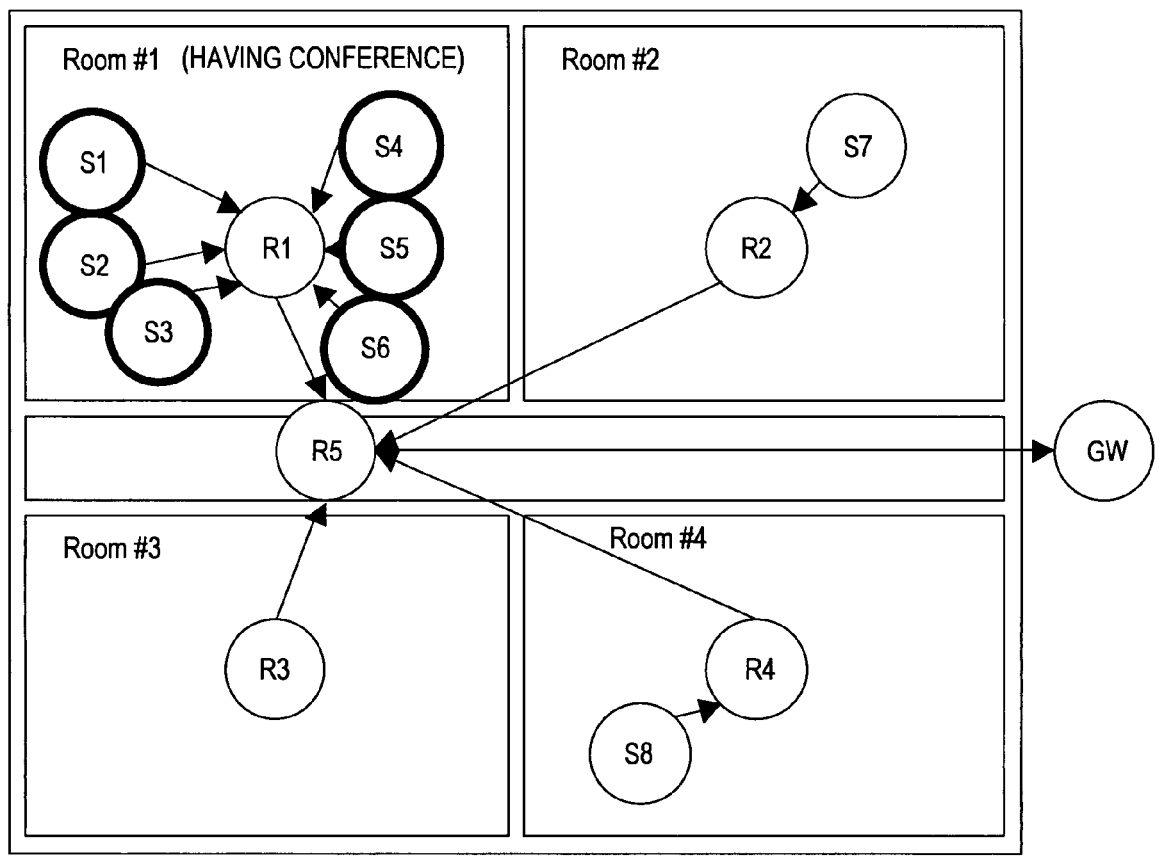
FIG. 10 is a block diagram showing an example of the sensor net system according to the first embodiment in which a router node is set up inside a conference room.

The description given next with reference to FIG. 10 is about a transfer rate anomaly in the sensor net system due to a wearable sensor node or other mobile sensor nodes that can move from one router node to another.

FIG. 10 shows an example in which the sensor nodes S1 to S8 are worn by persons and the router nodes R1 to R5 are placed in conference rooms Room#1 to Room#4 and in a corridor. The router node R5 in the corridor is connected to the gateway GW whereas the router nodes R1 to R4, which are in the conference rooms Room#1 to Room#4, respectively, are each connected to the downstream router node R5. This is called a star arrangement. The sensor nodes S1 to S8 move among the router nodes R1 to R5 as the persons wearing the sensor nodes move around.

In FIG. 10, many people are gathering in the conference room Room#1 and the sensor nodes S1 to S6 are connected to the router node R1. The router node R1 connects with the sensor nodes S1 to S6 which have been brought to the conference room Room#1 by those many people, and sends events received from the sensor nodes S1 to S6 to the gateway GW via the router node R5.

The router node R1 in this case may transfer data to the downstream router node R5 at a transfer rate that exceeds the limit transfer rate due to events sent from those many sensor nodes S1 to S6. The excessively high transfer rate in the router node R1 causes the transfer rate of the downstream router node R5 and of the gateway GW to exceed the limit transfer rate, thus propagating the anomaly in the router node R1 to the downstream router nodes. In the example of FIG. 10, the transfer rate becomes excessively high in the sensor net system when the sensor nodes S1 to S6 and the router node R1 are normal but the transfer rate becomes excessively high simply because the sensor nodes S1 to S6 have moved to the conference room Room#1, not because of an abnormal phenomenon as the one shown in FIG. 9 or an anomaly in a person wearing a sensor node.

Since events from the sensor nodes S1 to S6 in this example are not urgent events, it is desirable that the router node R1 chooses the sensor nodes S1 to S6 as deceleration nodes as described above. The transfer rate that has become excessively high can be reduced by thus restricting the transmission rate of the sensor nodes S1 to S6 and restricting the transfer rate of the router node R1.

The sensor nodes S1 to S6 can limit the transmission rate by, for example, increasing the measurement interval as in the above-mentioned item a1, or by the batch transmission of the item a2, or by the pseudo-communication of the item a3. The router node R1 can limit the transfer rate by, for example, sending only the maximum value, the minimum value, and the mean value of the above-mentioned item b1, or by the batch transmission of events of the item b2.

When the transfer rate in the sensor net system increases to an excessive level in this invention, the router node 2 or the gateway 3 detects a transfer rate anomaly, a node between the excess transmission rate node whose transmission rate has become excessively high and the node that has detected the transfer rate anomaly is set as a deceleration processing executing node, and the deceleration processing executing node executes deceleration processing. Alternatively, the excess transmission rate node may be set as a deceleration processing executing node so that the excess transmission rate node reduces the transmission rate. Deceleration processing that is executed in the router node 2 or the gateway 3 will be described below.

(Software Configuration)

The router node 2 and the gateway 3 have the configurations shown in FIGS. 3 and 4, respectively, and the difference between the two is that the gateway 3 communicates with the wireless network 6 and the wired network 7 both whereas the router node 2 communicates with the wireless network 6 alone. However, the router node 2 and the gateway 3 execute the same processing, which includes event or command transfer processing and deceleration processing to deal with a transfer rate anomaly, in the same manner. Described below is the processing that is executed in the router node 2, and the same processing is executed in the gateway 3 as well.

Figure 11:
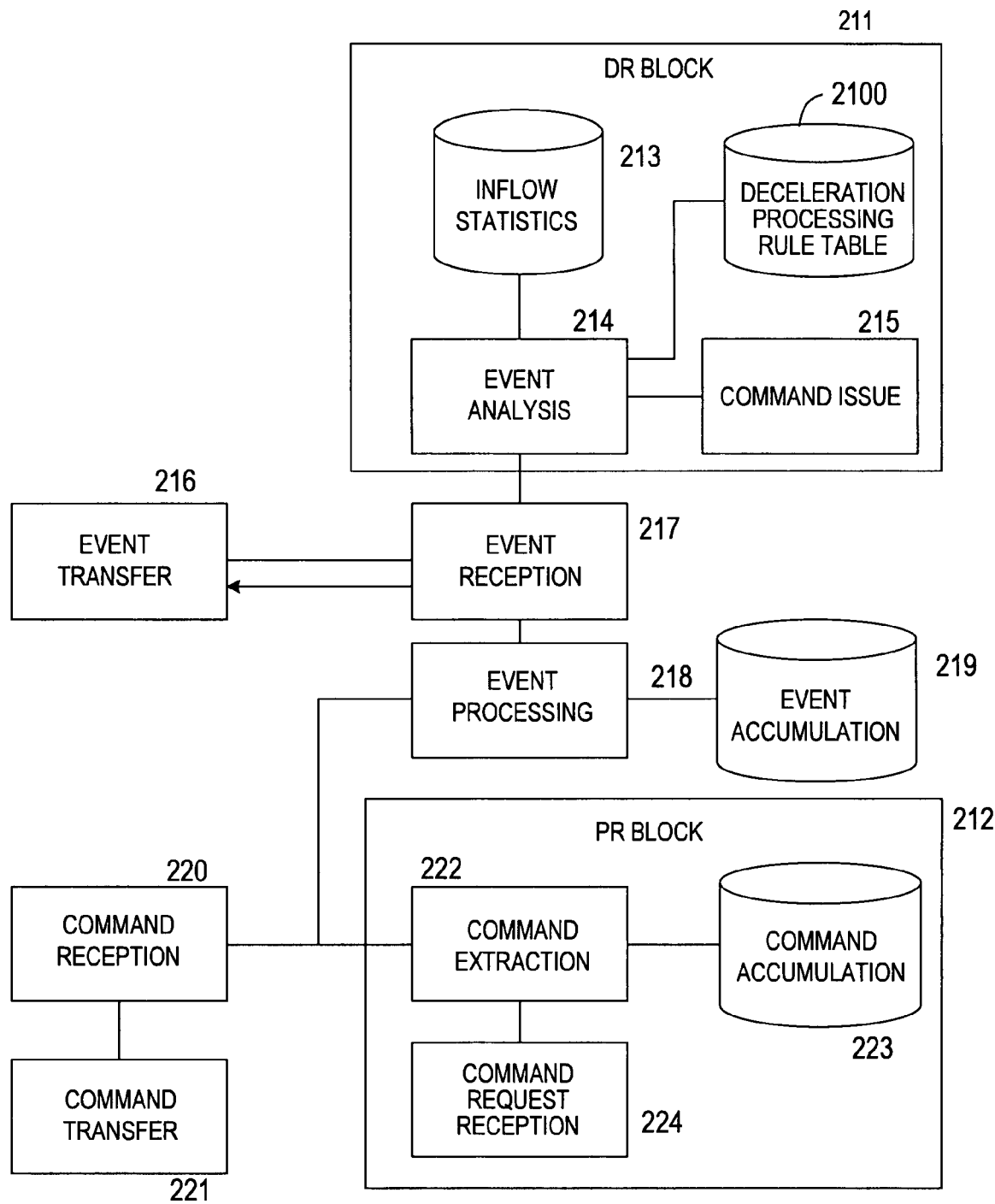
FIG. 11 is an example of a block diagram showing software function elements of the router node or the gateway according to the first embodiment.

FIG. 11 is a function block diagram of software that is executed in the router node 2. The router node 2 of FIG. 11 has, in order to transfer events and commands, an event receiving unit 217, which receives an event from an upstream node, an event transferring unit 216, which sends a received event to a downstream node, a command receiving unit 220, which receives a command from a downstream node, and a command transferring unit 221, which sends a received command to an upstream node. The command receiving unit 220 receives a command also from the sensor node 1 in the case where the sensor node 1 is connected to the router node 2.

When a command directed to this router node 2 is sent from the user terminal 13 or the sensor net server 4, an event processing unit 218 sets processing that is to be executed in the router node 2. For instance, when the router node 2 receives a command for batch transmission, the event processing unit 218 temporarily stores an event received from an upstream node in an event accumulating unit 219 in association with the ID of the sensor node 1. After a given count of events are accumulated in the event accumulating unit 219 for each sensor node ID, the event processing unit 218 sends the accumulated events with this ID to a downstream node at once.

When the router node 2 receives a command for transferring only the maximum, minimum, and mean values of observation information, the event processing unit 218 temporarily stores an event received from an upstream node in the event accumulating unit 219 in association with the ID of the sensor node 1. After a given count of events are accumulated in the event accumulating unit 219 for each sensor node ID, the event processing unit 218 calculates the maximum observation value, the minimum observation value, and the mean observation value in the accumulated events with this ID, and sends the three calculated events to a downstream node at once. In short, the router node 2 transfers information from one sensor node 1 to a downstream node in a reduced amount.

When the router node 2 receives a command for pseudo-communications, the event processing unit 218 temporarily stores an event received from an upstream sensor node in the event accumulating unit 219 in association with the ID of the sensor node 1. The event processing unit 218 calculates the rate of change for each sensor node ID and, in a given cycle for activating the sensor node 1, outputs a product obtained by multiplying the last observation value by the rate of change to the downstream router node 2 as an observation value of the sensor node 1. The sensor node 1 is activated in the given cycle to obtain an observation value, and sends the obtained observation value to the router node 2 only when the rate of change of the observation value is changed. The amount of data transferred between the sensor node 1 and the router node 2 can be reduced in this pseudo-communication.

A parent router (PR) block 212 functions when the sensor node 1 is connected to an upstream node. The PR block 212 contains a command extracting unit 222, which extracts a command addressed to the sensor node 1 that is under control of this router node R1 out of commands that the command receiving unit 220 has received from a downstream node, a command accumulating unit 223, which stores an extracted command, and a command request receiving unit 224, which receives a command download request from the sensor node 1 that is under control of this router node 2 and, when a command addressed to this sensor node 1 is found in the command accumulating unit 223, sends the found command in response to the command download request.

As described above with reference to FIG. 7, the sensor node 1 is activated intermittently to communicate with the router node 2 and requests router node 2 through the communication to send a command. The command request receiving unit 224 fetches, from the command accumulating unit 223, via the command extracting unit 222, a command that is associated with the ID of the requester sensor node 1, and transfers the command to this sensor node 1. The command request receiving unit 224 executes the transmission and reception of a command of the sensor node 1 through the command receiving unit 220 and the command transferring unit 221. The command accumulating unit 223 stores a command in, for example, the external storage system 202.

The router node 2 also has a detected router (DR) block 211, which detects a failure in the sensor net system and instructs deceleration processing.

The DR block 211 includes an event analyzing unit 214, which has a limit transfer rate judging unit, a boundary node judging unit, an excess transmission rate node identifying unit, a deceleration node selecting unit, and a deceleration processing executing node selecting unit. The limit transfer rate judging unit analyzes an event received by the event receiving unit 217 to judge whether or not the transfer rate of this router node 2 exceeds the limit transfer rate. The boundary node judging unit judges, upon detection of a transfer rate anomaly, whether this router node 2 is the initiator of deceleration processing, namely, a boundary node. The excess transmission rate node identifying unit identifies which one of the sensor nodes connected to this router node 2 is an excess transmission rate node. The deceleration node selecting unit chooses, as a deceleration node, either the identified excess transmission rate node or another sensor node that is not the excess transmission rate node. The deceleration processing executing node selecting unit chooses, as a deceleration processing executing node, either the selected deceleration node or a relay node that is connected to the deceleration node. The DR block 211 also contains a inflow statistics unit 213, which measures the inflow velocity (transfer rate) of events received by the event receiving unit 217 and keeps the measurement result, and a command issuing unit 215, which commands deceleration processing when the event analyzing unit 214 judges that this router node 2 is the initiator of deceleration processing.

Deceleration processing that is executed in the DR block 211 of the router node 2 includes detecting a transfer rate anomaly, determining the initiator of deceleration processing, determining an excess transmission rate node, and determining the deceleration amount. Described below is the deceleration processing that the DR block 211 executes.

(Flow of Deceleration Processing)

Figure 12:
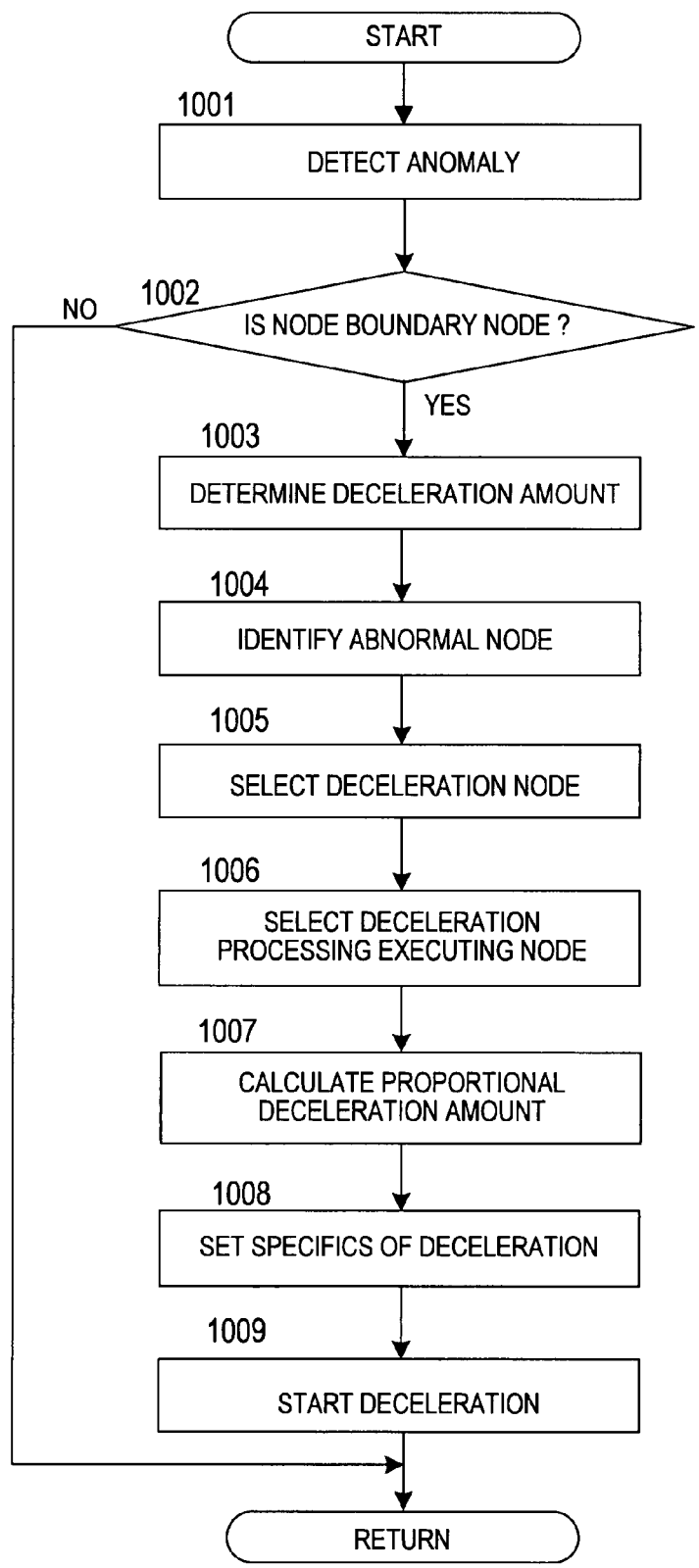
FIG. 12 is a flow chart showing an example of processing that is executed in the router node or the gateway according to the first embodiment.

FIG. 12 shows a flow chart for detection of a transfer rate anomaly and deceleration processing that are executed in the router node 2 or the gateway 3. The processing shown in FIG. 12 is executed repeatedly in a given cycle. In the following description, the deceleration processing will be outlined and then details of each step of the processing will be given.

The DR block 211 in the router node 2 (or the gateway 3) monitors the transfer rate (hereinafter referred to as inflow velocity) of received events and, when the inflow velocity exceeds the given limit transfer rate VL, detects a transfer rate anomaly in the sensor net system (Step 1001).

In order to determine which one of nodes that have detected the transfer rate anomaly is to perform deceleration processing, each node that has detected the transfer rate anomaly judges whether itself or another node is a boundary node (Step 1002). In the case where the same limit transfer rate VL is set to all the router nodes 2, a transfer rate anomaly detected in one node is also detected in a node downstream of the one node. Accordingly, in order to narrow the nodes down to one as the initiator of deceleration processing, a node downstream of which an abnormal inflow velocity is observed is deemed as a boundary node, and the boundary node is determined as the initiator of deceleration processing.

The node determined as the boundary node calculates, as a deceleration amount VR, how much the transfer rate of its own node, or the transfer rate of a node upstream of the own node, should be decelerated in order to bring the excessively high transfer rate down to or lower than the limit transfer rate VL (Step 1003).

Next, the inflow velocity (data transmission amount per unit time) is calculated for each identifier (ID) of the sensor node 1 that is included in events received by the boundary node, and the sensor node 1 whose inflow velocity exceeds a given value, which will be described later, is identified as a sensor node (excess transmission rate node) that has an excessively high transmission rate (Step 1004).

The boundary node selects a deceleration node, which is a target of transmission rate reduction, in accordance with a preset deceleration processing rule (Step 1005). The boundary node then determines a deceleration processing executing node, which executes deceleration processing, in accordance with the preset deceleration processing rule (Step 1006). In the processing of Step 1005 described above, an excess transmission rate node whose transmission rate is excessively high is not always chosen as a transfer rate reduction target as will be described later. In the case where an event from excess transmission rate node is urgent and is given priority, other nodes than the excess transmission rate node are selected as deceleration nodes and an urgent event from the excess transmission rate node is transferred downstream. In the processing of Step 1006 described above, an excess transmission rate node may be determined as a deceleration processing executing node, which executes reduction of the transfer rate of events from a deceleration node, or maybe a boundary node DR, a parent router PR, a child router CR, or the like is determined as a deceleration processing executing node.

The DR block 211 next calculates, as a proportional deceleration amount $v_{Ri}$, the amount of deceleration to be performed by the deceleration processing executing node for each path (Step 1007). The proportional deceleration amount $v_{Ri}$ is calculated based on the deceleration amount VR obtained in Step 1003 described above, and a deceleration amount in proportion to the transmission rate of each upstream sensor node that is connected to the deceleration processing executing node is set to the path. In the case where the deceleration processing executing node is one sensor node 1, proportional deceleration amount $v_{Ri}$ equals the deceleration amount VR.

To reduce the event transmission rate or the event transfer rate by the determined deceleration amount, the DR block 211 sets specifics of deceleration processing shown in the above-mentioned items a1 to a3 and b1 of (3) (Step 1008). The deceleration processing specifics may be set in accordance with the type of the deceleration processing executing node. For instance, when the deceleration processing executing node is a sensor node, the item a1"increasing the measurement interval" is set whereas the batch transmission of the item a2 is set when the deceleration processing executing node is the router node 2.

After thus selecting a deceleration processing executing node and a deceleration node, which is a target of transmission rate reduction, and determining specifics of deceleration processing, the boundary node sends a deceleration processing command and information of the deceleration node to the deceleration processing executing node. Receiving the information, the deceleration processing executing node starts deceleration processing (Step 1009).

Now, details of the processing executed in the steps of the flow chart of FIG. 12 will be described.

(Anomaly Detection and Determining of a Boundary Node)

Described here are the transfer rate anomaly detection processing and determining of a boundary node which are respectively executed in Step 1001 and Step 1002 of FIG. 12.

The event analyzing unit 214 in the DR block 211 of the router node 2 analyzes an event received by the event receiving unit 217 from the sensor node 1 or from an upstream router node 2, and detects as a result of analysis an increase in data transfer amount per unit time to an excessive level. The event analyzing unit 214 then calculates, from the inflow (reception amount) of events measured by the inflow statistics unit 213, the sum of the reception amount per unit time as the event inflow velocity (reception velocity) in this router node 2. The event reception amount (inflow) can be expressed in, for example, packet count or byte count (or octet count).

Figure 13:
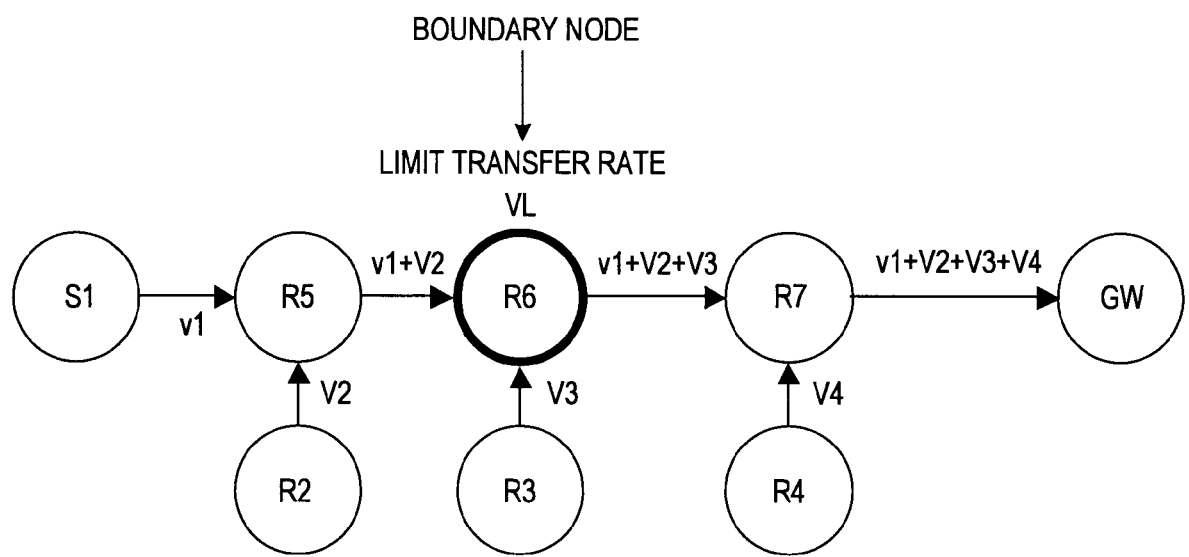
FIG. 13 is an example of an explanatory diagram showing a relation between the sensor node, the router node, the gateway, and a boundary node according to the first embodiment.

In this example, as shown in FIG. 13, six router nodes R2 to R7, the gateway GW, and the sensor node S1 are placed in the wireless network 6, the sensor node S1 and the router node R2 are connected to the most upstream router node R5, and the router node R6 is connected downstream to the router node R5. A sensor node (not shown) is connected to the router node R2.

The transmission rate of a sensor node is denoted by vi and the transfer rate of a router node is denoted by Vi in the following description. Each Vi is therefore the sum of the transmission rate vi of a sensor node that is connected directly to the router node concerned and the transfer rate of its upstream router node. For instance, when two sensor nodes are connected to the router node R2 and one of the two has a transmission rate v2 whereas the other has a transmission rate v3, the transfer rate V2 equals v2 plus v3.

The router node R5 receives events from the upstream sensor node S1 at an inflow velocity v1, receives events from the upstream router node R2 at an inflow velocity V2, and transfers the events to the downstream router node R6 at a velocity of v1+V2.

The router node R6 receives events from the router node R5 and the router node R3, and transfers the events to the downstream router node R7. A sensor node (not shown) is connected to the router node R3.

The router node R6 receives events from the upstream router node R5 at an inflow velocity of v1+V2, receives events from the upstream router node R3 at an inflow velocity of V3, and sends the events to the downstream router node R7 at a velocity of v1+V2+V3.

The router node R7 receives events from the router node R6 and the router node R4, and transfers the events downstream to the gateway GW. A sensor node (not shown) is connected to the router node R4.

The router node R7 receives events from the upstream router node R6 at an inflow velocity of v1+V2+V3, receives events from the upstream router node R4 at an inflow velocity of V4, and sends the events downstream to the gateway GW at a velocity of v1+V2+V3+V4.

The DR block 211 of the router node R6 is now focused on. $\Sigma vi$ denotes the sum of the inflow velocity vi at which events are transmitted to the router node R6 from the connected sensor nodes and which is measured by the inflow statistics unit 213 shown in FIG. 11. In order to detect an anomaly in the sensor net system, the event analyzing unit 214 compares the sum $\Sigma vi$ against the preset limit transfer rate VL. The event analyzing unit 214 also compares, for each ID of the sensor node 1, the inflow velocity vi against a given value $\epsilon$ in Expression (5), which will be described later.

The event analyzing unit 214 judges that an excessively high transfer rate has caused an anomaly in the sensor net system when the sum $\Sigma vi$ of the inflow velocity vi is equal to or more than the preset limit transfer rate VL. Then, if there is the sensor node 1 whose inflow velocity vi satisfies Expression (5) described below, the event analyzing unit 214 identifies the ID of this sensor node 1 as an excess transmission rate node. Specifically, the inflow statistics unit 213 extracts the ID of the sensor node 1 from a received event and holds the inflow velocity in association with the extracted ID. The event analyzing unit 214 identifies the sensor node 1 whose transmission rate satisfies Expression (5) described below as an excess transmission rate sensor node 1.

The sum $\Sigma vi$ of the inflow velocity vi of the router node R6 discussed here is v1+V2+V3. When the sum $\Sigma vi$ of the inflow velocity vi of the router node R6 is equal to or more than the limit transfer rate VL, the downstream router node R7 and the gateway GW also have an event inflow velocity sum $\Sigma vi$ that is equal to or more than the limit transfer rate VL, which means that all nodes along the downstream event transfer path of the router node R6 judge that there is an anomaly in the sensor net system. Any router node that judges that there is an anomaly in the sensor net system can be an initiator of deceleration processing and can command deceleration processing but, to avoid commanding deceleration processing redundantly, each router node that has detected a sensor net system anomaly judges whether itself or another node is the initiator of deceleration processing as follows.

When the inflow velocity of data into one node from a node that is connected directly to the one node is given as $\forall vn$, a node that receives data from an upstream node at a normal inflow velocity (less than the limit transfer rate VL) and that sends data to a downstream node at an inflow velocity (transfer rate) that is equal to or more than the limit transfer rate VL is determined as a boundary node, which serves as the initiator of deceleration processing. The following expression is used to judge whether a node is a boundary node or not when the inflow velocity $\forall vn$ of data from a directly connected node is normal:

Expression 1

$$(\forall v_n < V_L) \char`\^ (\Sigma v_i > V_L) \rightarrow \text{Boundary} \quad (1)$$

A node is judged as a boundary node, which is to serve as the initiator of deceleration processing, if the inflow velocity $\forall vn$ of a node directly connected to this node is less than the limit transfer rate VL whereas the sum $\Sigma vi$ of the inflow velocity vi of the sensor nodes is equal to or more than the limit transfer rate VL. In short, a node that satisfies the above-mentioned Expression (1) is determined as a boundary node. The router node R6 of FIG. 13 is set as follows:

$n=1: v1+V2$ $n=2: V3$

The same applies to other nodes of FIG. 13 and "n" represents a connection with one upstream node.

For example, when either inflow velocity vn is less than the limit transfer control VL and therefore is normal in FIG. 13 (the inflow velocity v1+V2 of data from the router node R5<VL, and the inflow velocity V3 of data from the subservient router node R3<VL), but the sum $\Sigma vi$ exceeds the limit transfer rate VL ($\Sigma vi = v1+V2+V3 > VL$), the event analyzing unit 214 of the router node R6 can determine that the router node R6 is a boundary node. In this case, the inflow velocity vn of data from one upstream node is equal to or more than the limit transfer rate VL and the above-mentioned Expression (1) is not satisfied in the router node R7 and the gateway GW, which are downstream of the router node R6. It is therefore judged that the router node R7 and the gateway GW do not fit for the initiator of deceleration processing despite the fact that the router node R7 and the gateway GW have detected an anomaly in the sensor net system. In other words, the router node R7 and the gateway GW do not satisfy the above-mentioned Expression (1) since the inflow velocity of events received from the router node R6 exceeds the limit transfer rate VL.

By thus allowing only one router node to serve as the initiator of deceleration processing, this embodiment avoids a situation in which redundant deceleration commands are issued to the sensor node or the relay node (deceleration processing executing node) that executes deceleration processing. As a result, information transmitted from a sensor node can be transferred toward a server computer while discarding as less of the information as possible and delaying transmission of the information as little as possible.

The boundary node obtains the inflow velocity for each ID of the sensor node 1 that is contained in events received from the upstream and, when there is the sensor node 1 whose inflow velocity satisfies Expression (5) described below, identifies the identifier of this sensor node 1 as the identifier of an excess transmission rate sensor node 1.

The limit transfer rate VL is determined from the upper limit of the processing performance of the router node 2 while taking into account a given margin and other factors, and has a preset value that will not cause the router node 2 to shut down immediately after the sum $\Sigma vi$ of the inflow velocity vi exceeds the limit transfer rate VL.

(Calculation of Deceleration Amount)

The deceleration amount calculation processing performed in Step 1003 is described next. The event analyzing unit 214 of the router node 2 uses, upon judging that its own router node is a boundary node, the following expression to calculate the deceleration amount VR by which the inflow velocity vi of its own router node or a node upstream of its own router node is to be reduced.

Expression 2

$$\text{Deceleration amount } V_R = \Sigma v_i - V_L \quad (2)$$

The deceleration amount VR is a value that is to be subtracted from the inflow velocity vi of an excess transmission rate node. How much the inflow velocity (transfer rate) of data from the own node to a downstream node, i.e., $\Sigma vi$, exceeds the limit transfer rate VL is set as the deceleration amount VR.

Determining a proportional deceleration amount in this manner enables the sensor net system to avoid discarding data completely and transfer as much data as possible downstream.

(Calculation of Proportional Deceleration Amount)

Next described is the proportional deceleration amount calculation processing which is performed in Step 1007. The event analyzing unit 214 of a deceleration processing executing node uses the following expression to calculate the proportional deceleration amount $v_{Ri}$ of each event inflow velocity based on the transfer rate $\Sigma v_i$ at which data is transferred downstream from its own node and the event transmission rate vi of each sensor node.

Expression 3

$$\text{Proportional deceleration amount } v_{Ri} = \frac{v_i}{\Sigma v_i} V_R \qquad (3)$$

In FIG. 13, when the router node R6 is a boundary node, Expression (3) is used to calculate the proportional deceleration amount $v_{Ri}$ that is in proportion with the ratio of the transmission rate vi of each sensor node 1 under control of the router node R6 to the sum $\Sigma v_i$. This means that the larger the transmission rate vi is, the larger the proportional deceleration amount $v_{Ri}$ of a sensor node becomes.

(Identification of an Excess Transmission Rate Node)

The event inflow velocity may be controlled uniformly by Expression (3), but the uniform control presents a possibility that events from a normal sensor node cannot be obtained. Accordingly, which sensor node is normal and which sensor node is an excess transmission rate node are identified as follows.

Since the inflow velocity vi of events from a normal sensor node is low, a sensor node having a low transmission rate (inflow velocity vi) is identified as a normal sensor node with the use of Expression (4). Deceleration processing for the thus identified normal sensor node is cancelled.

Expression 4

$$\frac{v_i}{\Sigma v_i} V_R < \varepsilon \rightarrow v_{Ri} = 0 \qquad (4)$$

In Expression (4), $\varepsilon$ represents a value that is set in advance in accordance with the performance of the router node 2, the specification of the sensor net system, and the like, and that is used to exclude a normal sensor node having a transmission rate as an excess transmission rate node by deeming the proportional deceleration amount $v_{Ri}$ of a normal sensor node to be 0.

The transmission rate vi of a sensor node whose proportional deceleration amount $v_{Ri}$ is set to 0 by Expression 4 is excluded from the sum $\Sigma v_i$ in Expression (2) and in Expression (3).

An excess transmission rate node is identified by the following expression.

Expression 5

$$\frac{v_i}{\Sigma v_i} V_R \geq \varepsilon \qquad (5)$$

Expression (5) is used to identify as an excess transmission rate node a sensor node in which a value obtained by multiplying the ratio of the node's per-unit time data transmission amount vi to the sum per-unit time data transmission amount $\Sigma v_i$ by the deceleration amount VR exceeds a given value E.

(Deceleration Processing Rule)

Described next is the deceleration node selection and the deceleration processing executing node selection processing which are respectively performed in Steps 1005 and 1006 of FIG. 12.

Figure 14:
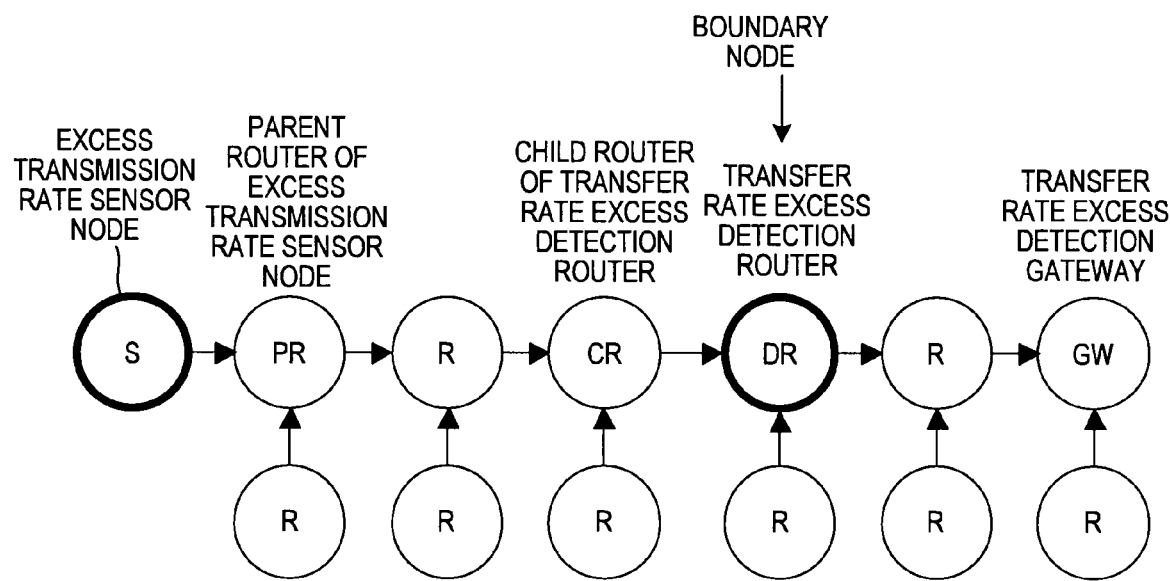
FIG. 14 is an example of an explanatory diagram showing a relation between the sensor node, the router node, the gateway, an excess transmission rate node, the boundary node, a parent router, and a child router according to the first embodiment.

To give a description on the relation between an excess transmission rate node and a deceleration processing executing node, each node in the wireless network 6 is defined as shown in FIG. 14. In FIG. 14, the router node 2 that detects a transfer rate anomaly and at the same time is determined as a boundary node is determined as a detected router (DR), that is, transfer rate excess detection router. A router node that is immediately upstream of the transfer rate excess detection router DR is a child router CR. The sensor node 1 whose transmission rate is to be reduced is determined as an excess transmission rate node, and the router node 2 to which the excess transmission rate node is directly connected is a parent router PR of the excess transmission rate node. The gateway 3 that detects a transfer rate anomaly and at the same time is determined as a boundary node is a transfer rate excess detection gateway.

A deceleration processing executing node may be selected with the use of, for example, a deceleration processing rule table 2100 shown in FIG. 15. The deceleration processing rule table 2100 defines a deceleration processing rule name 2101, a deceleration node 2102 indicating the type of a node that is to receive velocity control, and a deceleration processing executing node 2103 indicating a node that executes deceleration processing. The deceleration processing rule table 2100 is set in advance in the DR block 211 of the router node 2 and in the DR block 211 of the gateway 3. In this embodiment, the deceleration processing rule table 2100 is stored in the event analyzing unit 214, and which one of the preset deceleration processing rules (hereinafter simply referred to as rules) RULE1 to RULE6 should be used is set in advance through the user terminal 13 or other measures. The rules shown in FIG. 15 as an example are outlined as follows.

According to the rule RULE1, an excess transmission rate node having an excessively high transmission rate is chosen as a deceleration node and a transfer rate excess detection router DR is chosen as a deceleration processing executing node. The event sent from the excess transmission rate node is decelerated by the boundary node DR. In FIG. 14, the transfer rate excess detection router DR reduces the transfer rate of the events received from, for example, the excess transmission rate sensor node, a parent router PR, and a child router CR.

According to the rule RULE2, a node that is not an excess transmission rate node having an excessively high transmission rate is chosen as a deceleration node and a transfer rate excess detection router DR is chosen as a deceleration processing executing node. For instance, in FIG. 9, when the sensor nodes S6, S7, S10, and S11 are excess transmission rate nodes and the router node R2 is a boundary node, the router node R2 executes deceleration processing for events sent from other sensor nodes than the excess transmission rate nodes, namely events sent from the sensor nodes S2, S3, S14, and S15, thereby transferring events from the excess transmission rate nodes preferentially. The rule RULE2 gives priority to a sensor node whose observation value is deemed as must-be-delivered information, and is therefore suitable to conveyance of observation values of a sensor node that detects a fire or other emergencies.

According to the rule RULE3, an excess transmission rate node having an excessively high transmission rate executes deceleration processing. The excess transmission rate node increases the measurement interval or executes a batch transmission or a pseudo-communication, thereby reducing the inflow velocity of events from the sensor node that has an excessively high transmission rate.

According to the rule RULE4, a node that is not an excess transmission rate node having an excessively high transmission rate is chosen as a deceleration node and another node that is not an excess transmission rate node executes deceleration processing. For instance, in FIG. 9, when the sensor nodes S6, S7, S10, and S11 are excess transmission rate nodes, other sensor nodes than the excess transmission rate nodes, namely, the sensor nodes S2, S3, S14, and S15, execute deceleration processing (reduction of the transmission rate), thereby transferring events from the excess transmission rate nodes preferentially. The rule RULE4, similarly to the rule RULE2, gives priority to a sensor node whose observation value is deemed as must-be-delivered information, and is therefore suitable to conveyance of observation values of a sensor node that detects a fire or other emergencies.

According to the rule RULE5, an excess transmission rate node having an excessively high transmission rate is chosen as a deceleration node and a child router CR of a boundary node DR executes deceleration processing for events sent from the excess transmission rate node.

According to the rule RULE6, an excess transmission rate node having an excessively high transmission rate is chosen as a deceleration node and a parent router PR of the excess transmission rate node executes deceleration processing for events sent from the excess transmission rate node.

Desirably, as described above, the rules RULE1, RULE3, RULE5, and RULE6 (hereinafter referred to as rule A) in which an excess transmission rate node is chosen as a deceleration node are employed in the case where information from the excess transmission rate node is not urgent whereas the rules RULE2 and RULE4 (hereinafter referred to as rule B) in which a sensor node that is not an excess transmission rate node is chosen as a deceleration node are employed in the case where information from the excess transmission rate node is urgent.

A specific configuration that enables the sensor net system to judge whether information from an excess transmission rate node is urgent or not can be set in advance through the user terminal 13. For instance, the rule B is set in advance in the case where information sent from an event-driven sensor node is important to the user. The rule B is set in advance also when a sensor node is set to be event-driven type in order to reduce power consumption because events transmitted in large amount are unimportant. The rule A may be set in advance if information transmitted from an intermittent sensor node is deemed as unimportant. It is also possible to set one of the rules RULE 1 to RULE6 to each event, in other words, to each ID of a sensor in a sensor node.

A boundary node may choose one of the rules RULE1 to RULE6 in accordance with a given rule. For example, in the case where a flag corresponding to the data type of a sensing subject is attached to data, the event analyzing unit of the boundary node chooses one of the rules RULE1 to RULE6 based on a flag-deceleration processing rule table which is stored in the node.

The event processing unit of a sensor node may analyze an event and attach a flag that indicates an associated deceleration processing rule to the event when the event meets a given condition (e.g., a rapid change in measurement value), thus enabling the event analyzing unit of the boundary node to choose the associated rule based on the flag.

A server may analyze a received event to identify a sensor node from which an event (e.g., an event experiencing a rapid change in measurement value) that meets a given condition is issued and to send a command to an upstream router node which is an instruction to choose a deceleration processing rule that gives priority to information of the identified sensor node.

This embodiment thus enables a sensor net system that has a mixture of different sensor nodes to collect data that should be given priority depending on the circumstances.

In Steps 1005 and 1006 of FIG. 12, the boundary node chooses a deceleration node and a deceleration processing executing node in accordance with a rule set in the deceleration processing rule table 2100 in the manner described above.

Details of the rules RULE1 to RULE6 will be described next.

(RULE1)

Figure 16:
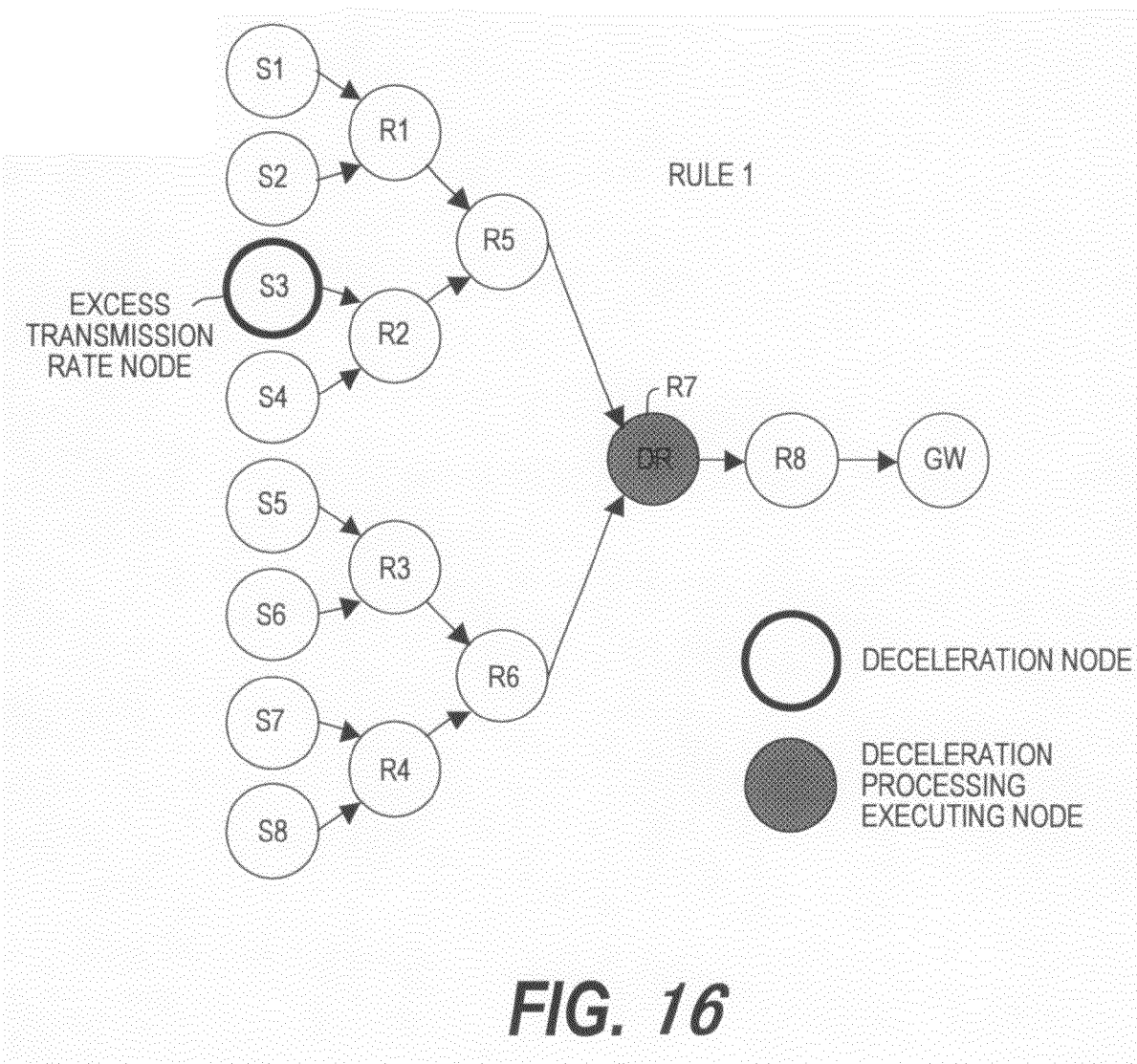
FIG. 16 is an example of a block diagram of a sensor net system in which a deceleration processing rule RULE1 is applied according to the first embodiment.

FIG. 16 shows an example of deceleration processing of the sensor net system in which the rule RULE1 is applied. In FIG. 16, the sensor nodes S1 and S2 are connected to the router node R1, the sensor nodes S3 and S4 are connected to the router node R2, the sensor nodes S5 and S6 are connected to the router node R3, and the sensor nodes S7 and S8 are connected to the router node R4. The router node R5 is connected downstream to the router nodes R1 and R2, and the router node R6 is connected downstream to the router nodes R3 and R4. The router node R7 is connected downstream to the router nodes R5 and R6, and the router node R8 and the gateway GW are connected in series downstream to the router node R7.

The router node R7 of FIG. 16 is a boundary node since the sum of the inflow velocity of the router nodes R5 and R6 is calculated by Expression (1) described above to be equal to or larger than the limit transfer rate VL and, at the same time, the inflow velocity of data from the router node R5 and the inflow velocity of data from the router node R6 are each less than the limit transfer rate VL.

According to the rule RULE1, the router node R7 determined as a boundary node DR reduces the transfer rate of events from an excess transmission rate node that is identified by the boundary node DR. The router node R7 determined as a boundary node DR therefore obtains the transmission rate vi for each ID of the sensor node 1 that is contained in events received from the upstream router nodes R5 and R6, and judges, as a deceleration node, i.e., excess transmission rate node, a node whose transmission rate vi satisfies Expression (5).

The example of FIG. 16 where the rule RULE1 is applied shows a case where the amount of data transferred from the sensor node S3 per unit time satisfies Expression (5) described above and is excessively high. The router node R7 performs deceleration processing so that the proportional deceleration amount $v_{Ri}$ calculated in Step 1007 of FIG. 12 is reached.

The router node R7 executes processing of one of the items b1 and a2, which are part of the deceleration processing listed in the item (3) in the above-mentioned section "(Hardware Configuration of the Router Node)".

b1: Cutting up observation information from an excess transmission rate node into three pieces, that is, the maximum value, the minimum value, and the mean value.

a2: Sending observation information in a mass.

Which one of the above-mentioned two types of processing should be chosen is set in advance by the administrator of the sensor net system through the user terminal 13 or by other measures.

For example, when it is the deceleration processing of the item b1 that is set as the rule RULE1 deceleration processing, the router node R7 temporarily stores observation values from the sensor node S3, which is an excess transmission rate node, calculates the maximum value, minimum value, and mean value of the stored observation values in a cycle that achieves the proportional deceleration amount $v_{Ri}$ obtained in Step 1007 of FIG. 12, and outputs the calculated values to the downstream router node R8. The router node R7 thus prevents the amount of data transferred downstream of the router node R7 from exceeding the limit transfer rate VL.

Similarly, when it is the batch transmission of the item a2 described above, the router node R7 temporarily stores events from the sensor node S3, and sends the stored observation values in a mass to the downstream router node R8 in a cycle that achieves the proportional deceleration amount $v_{Ri}$ obtained in Step 1007 of FIG. 12.

According to the rule RULE1, the processing of the item b1 or a2 prevents the amount of data transferred downstream of the router node R7 from exceeding the limit transfer rate VL. After deceleration processing is started, the router node R7 executes reversion processing, which will be described later, to return from the deceleration processing. Through the reversion processing, the router node R7 ends the deceleration processing and returns to normal processing at a point when the data transmission amount of the sensor node S3, which has been an excess transmission rate node, becomes less than a given threshold or satisfies Expression (4).

(RULE2)

Figure 17:
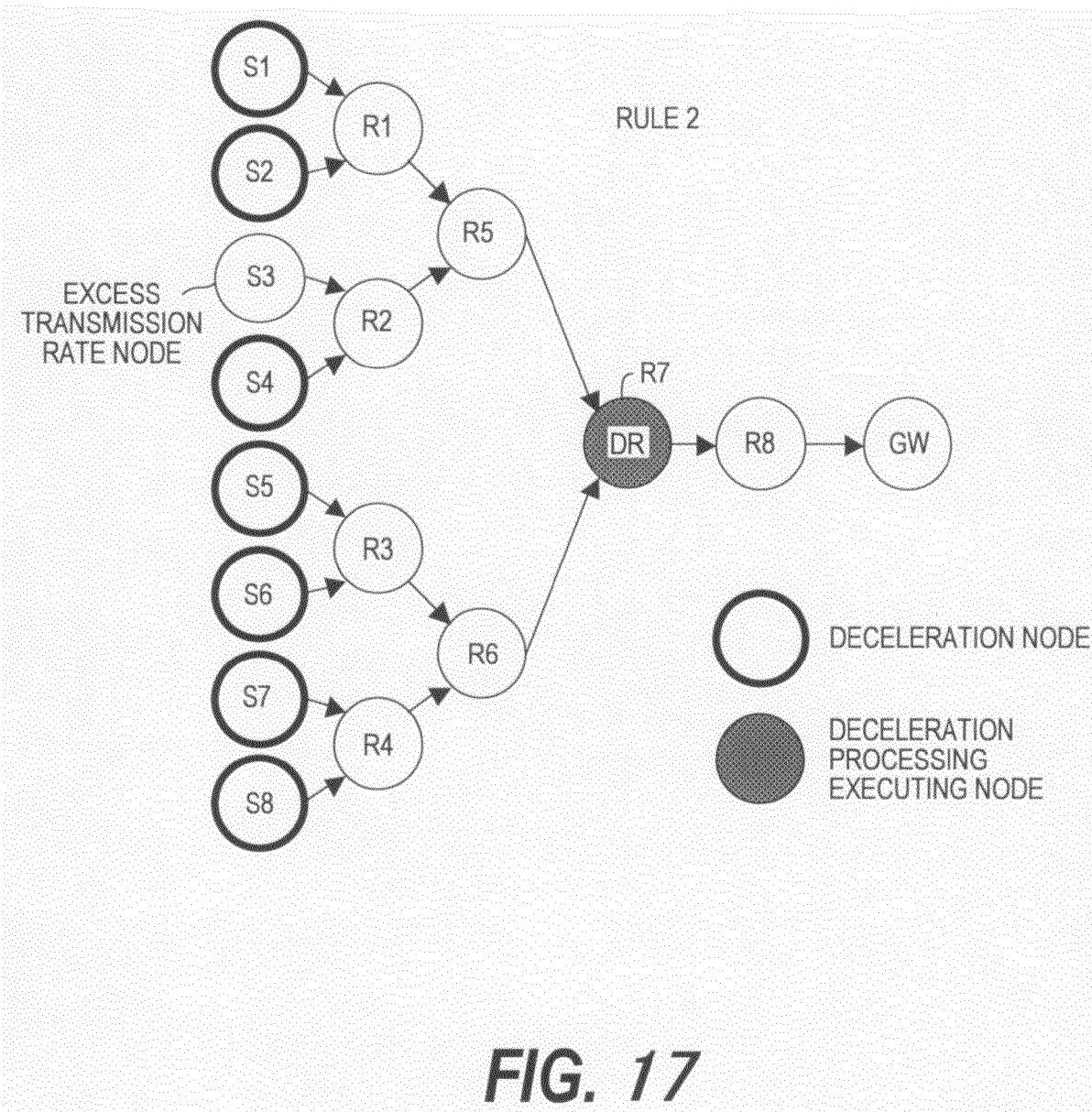
FIG. 17 is an example of a block diagram of a sensor net system in which a deceleration processing rule RULE2 is applied according to the first embodiment.

FIG. 17 shows an example of deceleration processing of the sensor net system in which the rule RULE2 is applied. In FIG. 17, the sensor nodes S1 to S8, the router node R1 to R8, and the gateway GW are arranged in the same way as in FIG. 16.

The example of FIG. 17 shows a case where the amount of data transferred per unit time from the sensor node S3, which is connected to the router node R2, satisfies Expression (5) and is excessively high.

The router node R7 is a boundary node since the sum of the inflow velocity of the router nodes R5 and R6 is calculated by Expression (1) to be equal to or larger than the limit transfer rate VL and, at the same time, the inflow velocity of data from the router node R5 and the inflow velocity of data from the router node R6 are each less than the limit transfer rate VL.

According to the rule RULE2, the sensor nodes 1 other than an excess transmission rate node that is identified by a boundary node DR are determined as deceleration nodes, and the boundary node DR reduces the transfer rate of events from the deceleration nodes 1. The router node R7 determined as a boundary node DR therefore judges, as deceleration nodes, other sensor nodes than the sensor node S3 whose transmission rate satisfies Expression (5), namely, the sensor nodes S1, S2, and S4 to S8. The router node R7 performs deceleration processing on the amount of data transferred from the deceleration nodes so that the proportional deceleration amount $v_{Ri}$ calculated by Expression (3) is reached.

The router node R7 executes processing of one of the items b1 and a2, which are part of the deceleration processing listed in the item (3) in the above-mentioned section "(Hardware Configuration of the Router Node)".

b1: Cutting up observation information from a node that is not an excess transmission rate node into three pieces, that is, the maximum value, the minimum value, and the mean value.

a2: Sending observation information in a mass.

Which one of the above-mentioned two types of processing should be chosen is set in advance by the administrator of the sensor net system through the user terminal 13 or by other measures.

For example, when it is the deceleration processing of the item b1 that is set as the rule RULE2 deceleration processing, the proportional deceleration amount $v_{Ri}$ is obtained in Step 1007 of FIG. 12 for each of the sensor nodes S1, S2, and S4 to S8, which are deceleration nodes.

The router node R7 then temporarily stores observation values from the sensor nodes S1, S2, and S4 to S8, which are deceleration nodes, calculates the maximum value, minimum value, and mean value of the stored observation values in a cycle that achieves the proportional deceleration amount $v_{Ri}$ obtained above, and outputs the calculated values to the downstream router node R8. The router node R7 thus prevents the amount of data transferred downstream of the router node R7 from exceeding the limit transfer rate VL.

Similarly, when it is the batch transmission of the item a2, the router node R7 temporarily stores events from the sensor nodes S1, S2, and S4 to S8, which are deceleration nodes, and sends the stored observation values in a mass to the downstream router node R8 in a cycle that achieves the proportional deceleration amount $v_{Ri}$ obtained in Step 1007 of FIG. 12.

According to the rule RULE2, observation values of the sensor node S3, whose transmission rate has increased to an excessive level, can be sent to the sensor net server 4 while the processing of the item b1 or a2 prevents the amount of data transferred downstream of the router node R7 from exceeding the limit transfer rate VL. After deceleration processing is started, the router node R7 executes reversion processing, which will be described later, to return from the deceleration processing. Through the reversion processing, the router node R7 ends the deceleration processing performed on the sensor nodes S1, S2, and S4 to S8, which are set as deceleration nodes, and returns to normal processing at a point when the amount of data transferred from the sensor node S3, which has been an excess transmission rate node, satisfies Expression (4).

Through the processing, urgent information (e.g., a rapid temperature rise due to a fire) can be transferred preferentially toward a server computer side and information important to a user can be delivered without discarding the information or delaying transmission of the information.

(RULE3)

Figure 18:
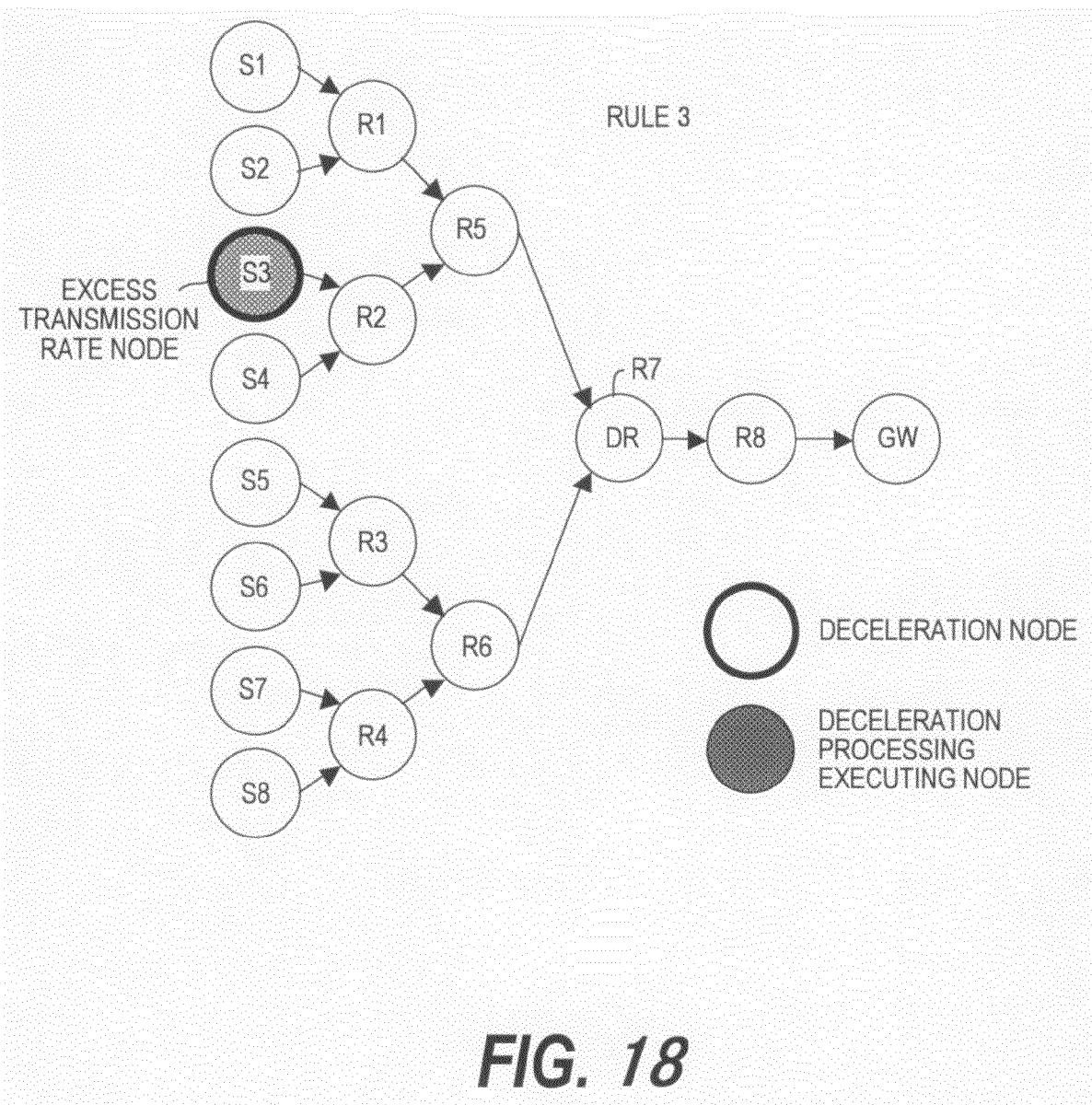
FIG. 18 is an example of a block diagram of a sensor net system in which a deceleration processing rule RULE3 is applied according to the first embodiment.

FIG. 18 shows an example of deceleration processing of the sensor net system in which the rule RULE3 is applied. In FIG. 18, the sensor nodes S1 to S8, the router node R1 to R8, and the gateway GW are arranged in the same way as in FIG. 16.

The router node R7 of FIG. 18 is a boundary node since the sum of the inflow velocity of the router nodes R5 and R6 is calculated by Expression (1) to be equal to or larger than the limit transfer rate VL and, at the same time, the inflow velocity of data from the router node R5 and the inflow velocity of data from the router node R6 are each less than the limit transfer rate VL.

According to the rule RULE3, an excess transmission rate node that is identified by a boundary node DR is determined as a deceleration node, and the boundary node DR instructs the excess transmission rate node to perform deceleration processing to reduce the transfer rate. The router node R7 determined as a boundary node DR therefore obtains the transfer rate for each ID of the sensor node 1 that is contained in events received from the upstream router nodes R5 and R6, and judges, as a deceleration node, a node whose transfer rate satisfies Expression (5) and is excessively high. The example of FIG. 18 shows a case where the amount of data transferred from the sensor node S3 per unit time has increased to an excessive level. The router node R7 instructs the sensor node S3 to execute deceleration processing so that the data transfer amount is reduced by the proportional deceleration amount $v_{Ri}$. The router node R7 instructs the sensor node S3, which is a deceleration node, to execute processing of one of the items a1, a2, and a3, which are part of the deceleration processing listed in the item (3) in the above-mentioned section "(Hardware Configuration of the Router Node)".

a1: Increasing the measurement interval of the sensor node 1.

a2: Sending observation information in a mass.

a3: Carrying out "pseudo-communications" between the sensor node 1 and the router node 2.

Which one of the above-mentioned three types of processing should be chosen is set in advance by the administrator of the sensor net system through the user terminal 13 or by other measures.

For example, when it is the deceleration processing of the item a1 that is set as the rule RULE3 deceleration processing, the router node R7 calculates such a measurement interval of the sensor node S3 that achieves the proportional deceleration amount $v_{Ri}$ obtained in Step 1007 of FIG. 12, and sends a command to the sensor node S3 to change the measurement interval to the calculated value. The sensor node S3 thus increases the measurement interval and accordingly reduces the per-unit time data transmission amount. As a result, the per-unit time data transfer amount in the router node R7 can be reduced to less than the limit transfer rate VL.

When it is the batch transmission of the item a2 that is set as the rule RULE3 deceleration processing, the count of observation values that should be kept by the sensor node S3 to be transmitted at once is calculated such that the proportional deceleration amount $v_{Ri}$ obtained in Step 1007 of FIG. 12 is reached. The calculated count is multiplied by the measurement interval of the sensor node S3, and the product is set as an interval at which the sensor node S3 sends events in a mass. The router node R7 sends, to the sensor node S3, the calculated count of observation values to be transmitted in a mass, and instructs the sensor node S3 to execute a batch transmission.

The sensor node S3 thus keeps observation values for the length of the measurement interval, and each time the count of kept observation values reaches the calculated count of observation values to be transmitted in a mass, sends multiple observation values in a single communication to reduce the per-unit time data transfer amount. As a result, the per-unit time data transfer amount in the router node R7 can be reduced to less than the limit transfer rate VL.

When it is the pseudo-communication of the item a3 that is set as the rule RULE3 deceleration processing, the router node R7 instructs the sensor node S3 to start a pseudo-communication.

The sensor node S3 thus obtains observation values at given measurement intervals and, if there is no change in difference (rate of change) from the last observation value, enters a sleep state without sending an obtained observation value. The sensor node S3 sends an obtained observation value only when there is a change in difference (rate of change) between the obtained observation value and the last observation value.

After obtaining at least two observation values from the sensor node S3, the router node R7 treats the difference between the two observation values as the rate of change, calculates an observation value from the rate of change at given measurement intervals of the sensor node S3, and sends the calculated observation value to the downstream router node R8.

This means that the sensor node S3, which is an excess transmission rate node, does not transmit events during a period in which the rate of change of observation value remains the same, and the amount of data transmitted from the sensor node S3 per unit time is thus reduced. As a result, the amount of data transferred to the router node R7 per unit time can be reduced to less than the limit transfer rate VL.

According to the rule RULE3, the processing of one of the items a1, a2, and a3 prevents the amount of data of events transferred to the router node R7 from increasing to an excessive level. After deceleration processing is started, the router node R7 executes reversion processing, which will be described later, to return from the deceleration processing. Through the reversion processing, the router node R7 ends the deceleration processing and returns to normal processing at a point when the amount of data transferred from the sensor node S3, which has been an excess transmission rate node, satisfies Expression (4).

The specifics (the items a1 to a3) of deceleration processing may be set or chosen by the sensor node 1 that is a deceleration node instead of being set by a boundary node DR. The boundary node DR in this case sends the proportional deceleration amount $v_{Ri}$ (or the deceleration amount VR) and a deceleration start command to the sensor node S3.

Figure 22:
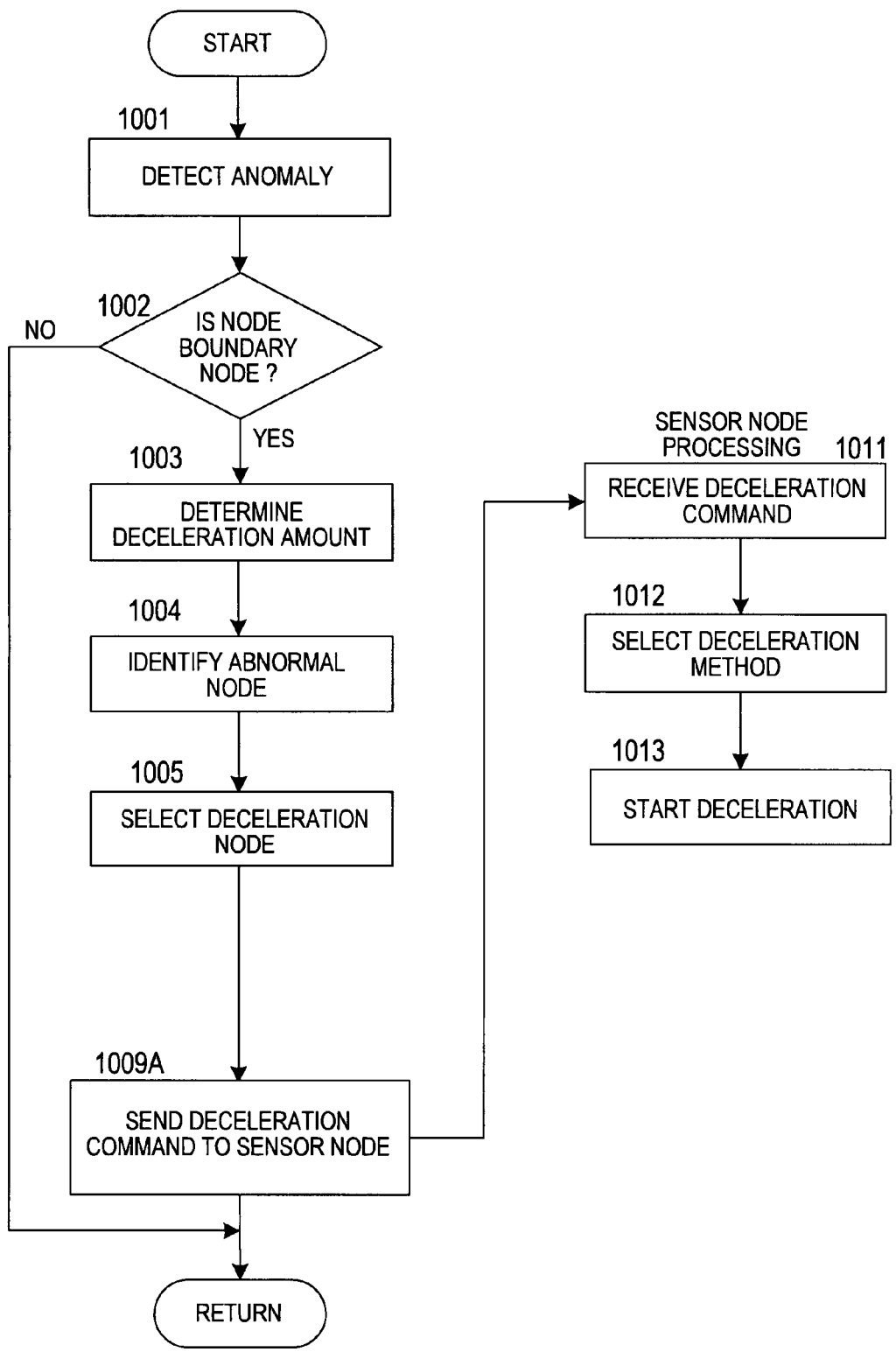
FIG. 22 is a flow chart showing an example of processing that is executed in a boundary node DR and the sensor node according to the first embodiment.

In FIG. 22, Steps 1006 to 1008 of FIG. 12 are omitted and Step 1009A includes sending a deceleration command from the boundary node DR to the sensor node S3, which is a deceleration node.

Receiving the deceleration command (1011), the sensor node S3 chooses (or sets) specifics of deceleration processing (1012), and starts transmission rate reduction (1013).

Through the processing, a sensor node can adjust the transmission rate by itself, and a communication failure can be avoided even when there is a lasting, rather than temporary, situation in which a sensor node transmits data in large amount.

(RULE4)

Figure 19:
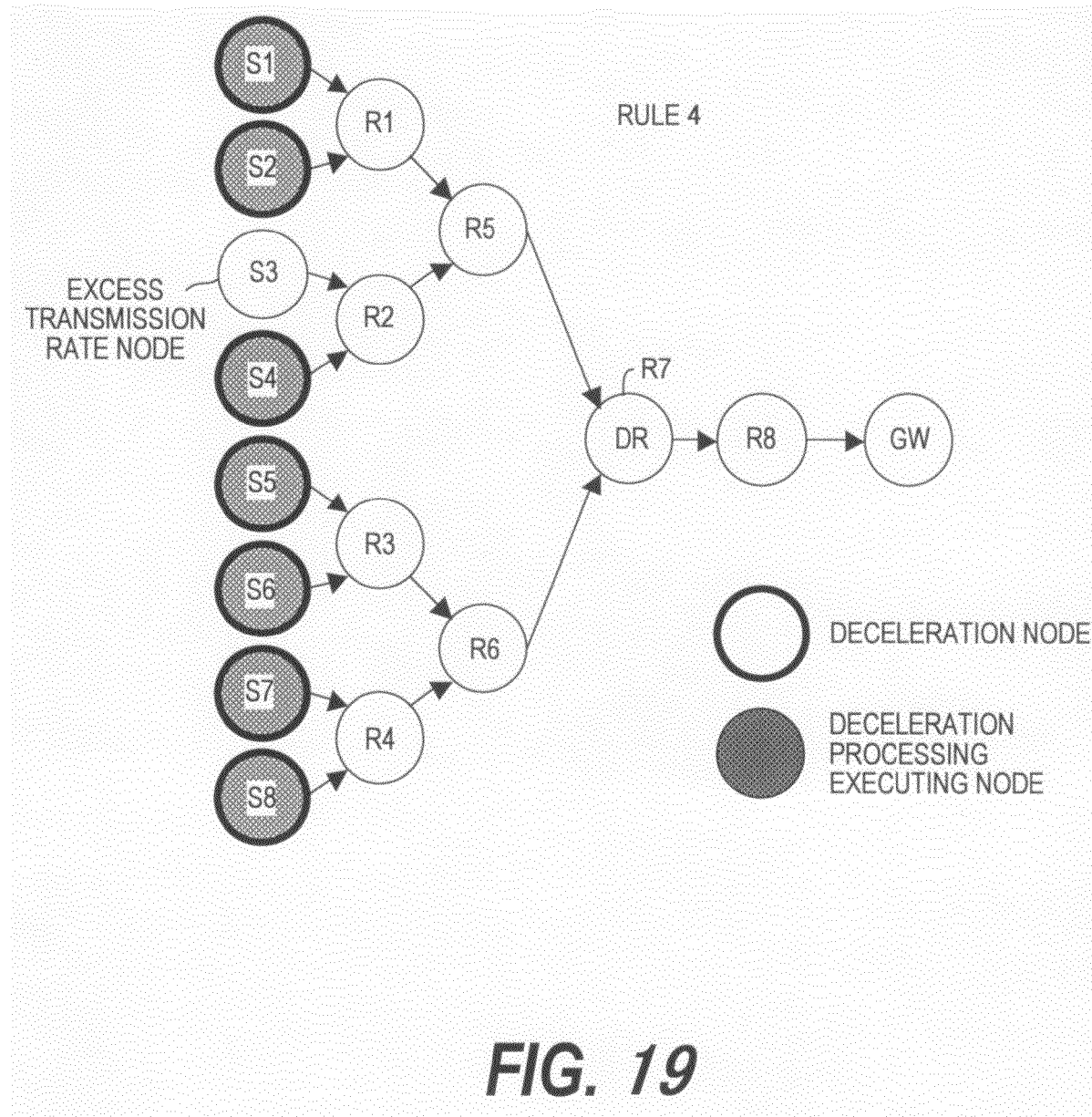
FIG. 19 is an example of a block diagram of a sensor net system in which a deceleration processing rule RULE4 is applied according to the first embodiment.

FIG. 19 shows an example of deceleration processing of the sensor net system in which the rule RULE4 is applied. In FIG. 19, the sensor nodes S1 to S8, the router nodes R1 to R8, and the gateway GW are arranged in the same way as in FIG. 16.

The router node R7 of FIG. 19 is a boundary node since the sum of the inflow velocity of the router nodes R5 and R6 is calculated by Expression (1) to be equal to or larger than the limit transfer rate VL and, at the same time, the inflow velocity of data from the router node R5 and the inflow velocity of data from the router node R6 are each less than the limit transfer rate VL.

According to the rule RULE4, a sensor node that is not an excess transmission rate node that is identified by a boundary node DR is determined as a deceleration node, and the deceleration node serves as a deceleration processing executing node. The example of FIG. 19 shows a case where the sensor node S3 is an excess transmission rate node. The router node R7 instructs other sensor nodes than the excess transmission rate node, namely, the sensor nodes S1, S2, and S4 to S8, to reduce the transmission rate, thereby reducing the data transmission rate of other sensor nodes than the excess transmission rate node.

The router node R7 determined as a boundary node DR therefore obtains the transfer rate for each ID of the sensor node 1 that is contained in events received from the upstream router nodes R5 and R6, and judges, as an excess transmission rate node, the sensor node S3 whose transfer rate satisfies Expression (5) and is excessively high.

According to the rule RULE4, in Step 1005 of FIG. 12, the router node R7 searches the received events for other sensor node IDs than that of the sensor node S3, which is an excess transmission rate node, and chooses the sensor nodes S1, S2, and S4 to S8 as deceleration nodes. In Step 1006 of FIG. 12, the router node R7 sets the deceleration nodes as deceleration processing executing nodes. In Step 1007 of FIG. 12, the router node R7 instructs to perform deceleration processing on the amount of data transferred from those deceleration nodes so that the proportional deceleration amount $v_{Ri}$ obtained by Expression (3) is reached.

The router node R7 instructs the sensor nodes S1, S2, and S4 to S8, which are deceleration nodes, to execute processing of one of the items a1, a2, and a3, which are part of the deceleration processing listed in the item (3) in the above-mentioned section "(Hardware Configuration of the Router Node)".

a1: Increasing the measurement interval of the sensor node 1.

a2: Sending observation information in a mass.

a3: Carrying out "pseudo-communications" between the sensor node 1 and the router node 2. Which one of the above-mentioned three types of processing should be chosen is set in advance by the administrator of the sensor net system through the user terminal 13 or by other measures.

For example, when it is the deceleration processing of the item a1 that is set as the rule RULE4 deceleration processing, the router node R7 calculates, for each deceleration node, such a sensor node measurement interval that achieves the proportional deceleration amount $v_{Ri}$ obtained in Step 1007 of FIG. 12, and sends a command to each of the sensor nodes S1, S2, and S4 to S8 to change the measurement interval to the calculated value. The sensor nodes S1, S2, and S4 to S8 thus increase the measurement interval and accordingly reduce the per-unit time data transfer amount. As a result, the per-unit time data transfer amount in the router node R7 can be reduced to less than the limit transfer rate VL.

When it is the batch transmission of the item a2 that is set as the rule RULE4 deceleration processing, the count of observation values that should be kept by each of the sensor nodes S1, S2, and S4 to S8 to be transmitted at once is calculated such that the data transfer amount of each deceleration node matches the proportional deceleration amount $v_{Ri}$ obtained in Step 1007 of FIG. 12. The calculated count is multiplied by the measurement interval of each of the sensor nodes S1, S2, and S4 to S8, and the product is set as an interval at which the sensor node concerned sends events in a mass. The router node R7 sends, to the sensor nodes S1, S2, and S4 to S8, the calculated count of observation values to be transmitted in a mass, and instructs the sensor nodes S1, S2, and S4 to S8 to execute a batch transmission.

The sensor nodes S1, S2, and S4 to S8 thus keep observation values for the length of the measurement interval and, each time the count of kept observation values reaches the calculated count of observation values to be transmitted in a mass, send multiple observation values in a single event to reduce the per-unit time data transfer amount. As a result, the per-unit time data transfer amount in the router node R7 can be reduced to less than the limit transfer rate VL.

When it is the pseudo-communication of the item a3 that is set as the rule RULE4 deceleration processing, the router node R7 instructs the sensor nodes S1, S2, and S4 to S8 to start a pseudo-communication.

The sensor nodes S1, S2, and S4 to S8 thus obtain observation values at given measurement intervals and, if there is no change in difference (rate of change) from the last observation value, enter a sleep state without sending an obtained observation value. The sensor nodes S1, S2, and S4 to S8 send an obtained observation value only when there is a change in difference (rate of change) between the obtained observation value and the last observation value.

After obtaining at least two observation values from the sensor nodes S1, S2, and S4 to S8, the router node R7 treats the difference between the two observation values as the rate of change, calculates an observation value from the rate of change at given measurement intervals of the sensor nodes S1, S2, and S4 to S8, and sends the calculated observation value to the downstream router node R8.

This means that the sensor nodes S1, S2, and S4 to S8, which are deceleration nodes, do not transmit events during a period in which the rate of change of observation value remains the same, and the amount of data transmitted from the sensor nodes S1, S2, and S4 to S8 per unit time is thus reduced. As a result, the amount of data transferred to the router node R7 per unit time can be reduced to less than the limit transfer rate VL.

According to the rule RULE4, the processing of one of the items a1, a2, and a3 prevents the amount of data transferred to the router node R7 from increasing to an excessive level. After deceleration processing is started, the router node R7 executes reversion processing, which will be described later, to return from the deceleration processing. Through the reversion processing, the router node R7 ends the deceleration processing performed on the sensor nodes S1, S2, and S4 to S8, which are deceleration nodes, and returns to normal processing at a point when the amount of data transferred from the sensor node S3, which has been an excess transmission rate node, satisfies Expression (4).

As mentioned in the detailed description of the rule RULE3 with reference to FIG. 22, the specifics (the items a1 to a3) of deceleration processing may be set or chosen by the sensor node 1 that is a deceleration node instead of being set by a boundary node DR. The boundary node DR in this case sends the proportional deceleration amount $v_{Ri}$ and a deceleration start command to the deceleration node.

Through such processing, information beneficial to a user can be delivered without being discarded or being delayed in transmission as in the rule RULE2. Processing according to the rule RULE4 also has the same effect as processing according to the rule RULE3, and can prevent a communication failure even when there is a lasting, rather than temporary, situation in which a sensor node transmits data in large amount.

(RULE5)

Figure 20:
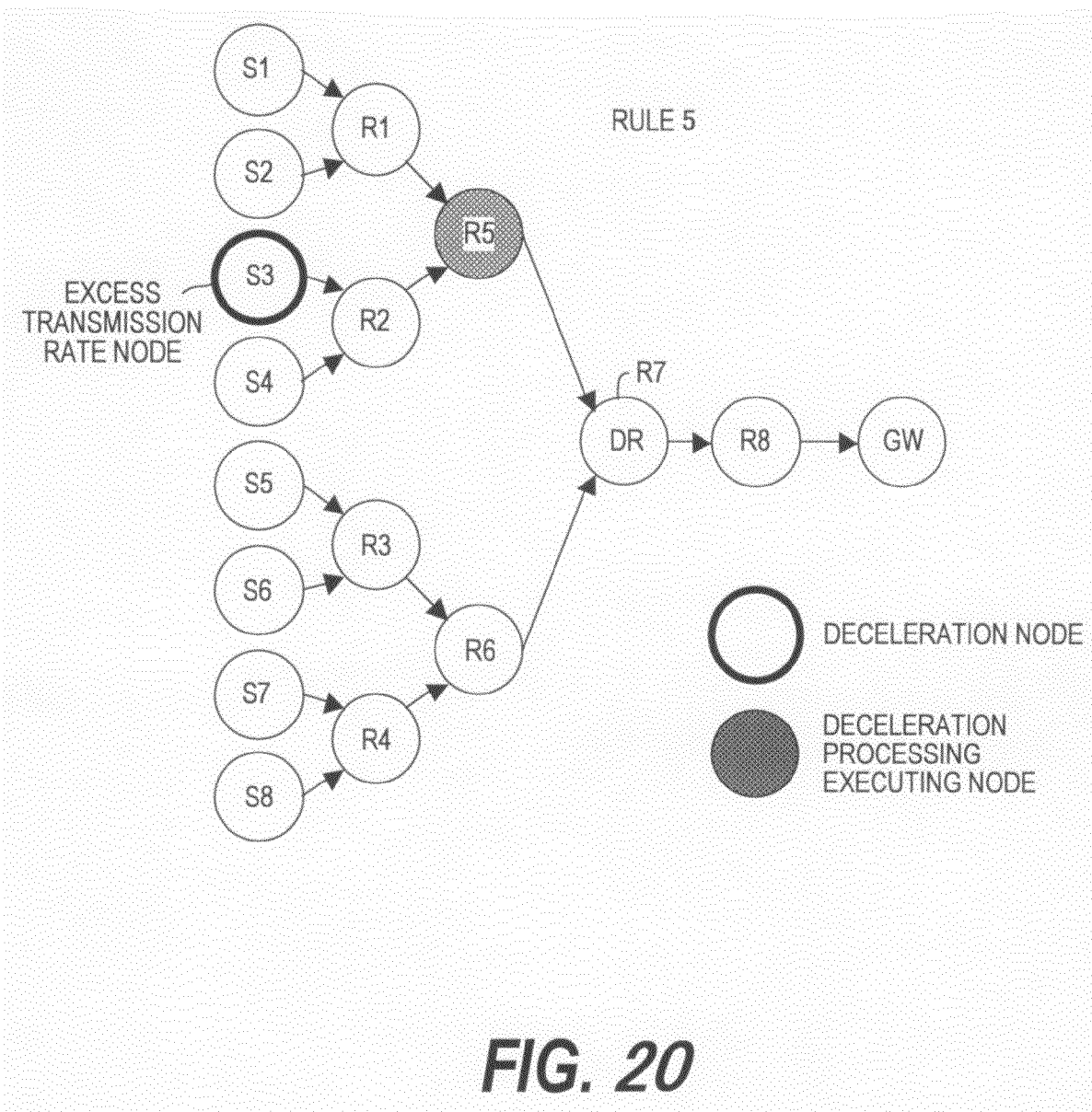
FIG. 20 is an example of a block diagram of a sensor net system in which a deceleration processing rule RULE5 is applied according to the first embodiment.

FIG. 20 shows an example of deceleration processing of the sensor net system in which the rule RULE5 is applied. In FIG. 20, the sensor nodes S1 to S8, the router nodes R1 to R8, and the gateway GW are arranged in the same way as in FIG. 16.

The router node R7 of FIG. 20 is a boundary node since the sum of the inflow velocity of the router nodes R5 and R6 is calculated by Expression (1) to be equal to or larger than the limit transfer rate VL and, at the same time, the inflow velocity of data from the router node R5 and the inflow velocity of data from the router node R6 are each less than the limit transfer rate VL.

According to the rule RULE5, out of nodes downstream of an excess transmission rate node that is identified by a boundary node DR, a child router CR of the boundary node DR is determined as a deceleration processing executing node. The boundary node DR instructs the child router CR downstream of the excess transmission rate node to execute deceleration processing.

The router node R7 determined as a boundary node DR therefore obtains the transmission rate for each ID of the sensor node 1 that is contained in events received from the upstream router nodes R5 and R6, and judges, as an excess transmission rate node, a node whose transmission rate satisfies Expression (5) and is excessively high. The example of FIG. 20 shows a case where the amount of data transferred from the sensor node S3 per unit time has increased to an excessive level. The router node R7 calculates the proportional deceleration amount $v_{Ri}$ from the data transfer amount of the sensor node S3. The router node R7 chooses, as a deceleration processing executing node, the router node R5, which is a child router CR that sends data of the sensor node S3 identified as an excess transmission rate node.

The router node R7, which is the boundary node DR, instructs the router node R5 to execute deceleration processing so that the data transfer amount is reduced by the proportional deceleration amount $v_{Ri}$. The router node R7 executes processing of one of the items b1 and a2, which are part of the deceleration processing listed in the item (3) in the above-mentioned section "(Hardware Configuration of the Router Node)".

b1: Cutting up observation information from an excess transmission rate node into three pieces, that is, the maximum value, the minimum value, and the mean value.

a2: Sending observation information in a mass.

Which one of the above-mentioned two types of processing should be chosen is set in advance by the administrator of the sensor net system through the user terminal 13 or by other measures.

For example, when it is the deceleration processing of the item b1 that is set as the rule RULE5 deceleration processing, the router node R5, which is the child router CR, temporarily stores observation values from the sensor node S3, which is an excess transmission rate node, calculates the maximum value, minimum value, and mean value of the stored observation values in a cycle that achieves the proportional deceleration amount $v_{Ri}$ obtained in Step 1007 of FIG. 12, and outputs the calculated values downstream to the router node R7, which is the boundary node DR. The amount of data transferred downstream of the router node R7 is thus prevented from exceeding the limit transfer rate VL.

Similarly, when it is the batch transmission of the item a2 described above, the router node R5, which is the child router CR, temporarily stores events from the sensor node S3, and sends the stored observation values in a mass to the downstream router node R7 in a cycle that achieves the proportional deceleration amount $v_{Ri}$ obtained in Step 1007 of FIG. 12.

According to the rule RULE5, the processing of the item b1 or a2 prevents the amount of data transferred from the router node R5 to a downstream node from increasing to an excessive level. After deceleration processing is started, the router node R5 executes reversion processing, which will be described later, to return from the deceleration processing. Through the reversion processing, the router node R5 ends the deceleration processing and returns to normal processing at a point when the amount of data transferred from the sensor node S3, which has been an excess transmission rate node, satisfies Expression (4).

The specifics (the items b1 and a2) of deceleration processing may be set or chosen by a child router CR that is a deceleration node instead of being set by a boundary node DR. The boundary node DR in this case sends the deceleration amount VR and a deceleration start command to the sensor node S3.

Figure 23:
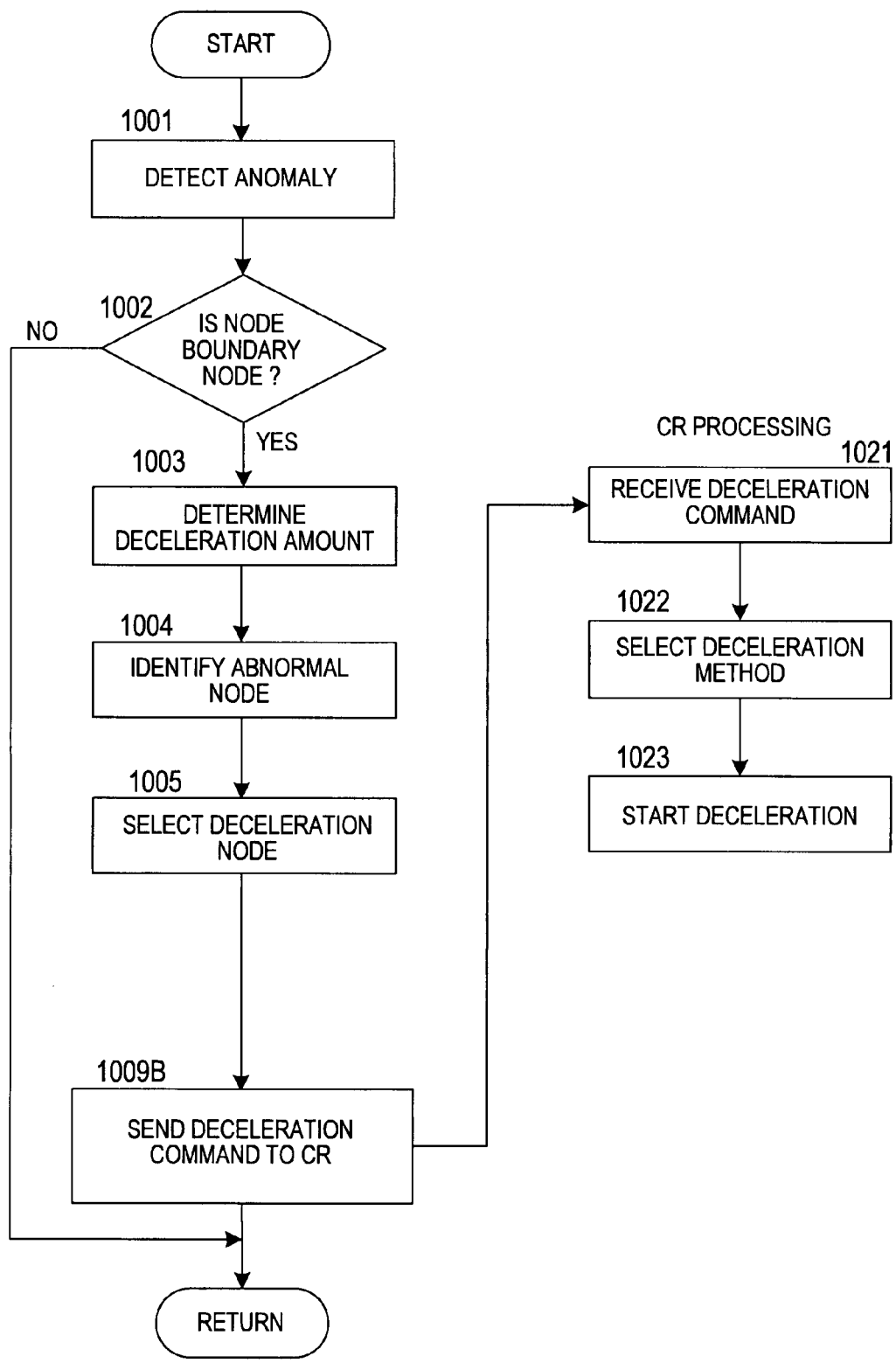
FIG. 23 is a flow chart showing another example of the processing that is executed in the boundary node DR and the sensor node according to the first embodiment.

In FIG. 23, Steps 1006 to 1008 of FIG. 12 are omitted and Step 1009B includes sending a deceleration command from a boundary node DR to a child router CR that is a deceleration node.

Receiving the deceleration command (1021), the child router CR chooses (or sets) specifics of deceleration processing (1022), and reduces the transfer rate (1023).

(RULE6)

Figure 21:
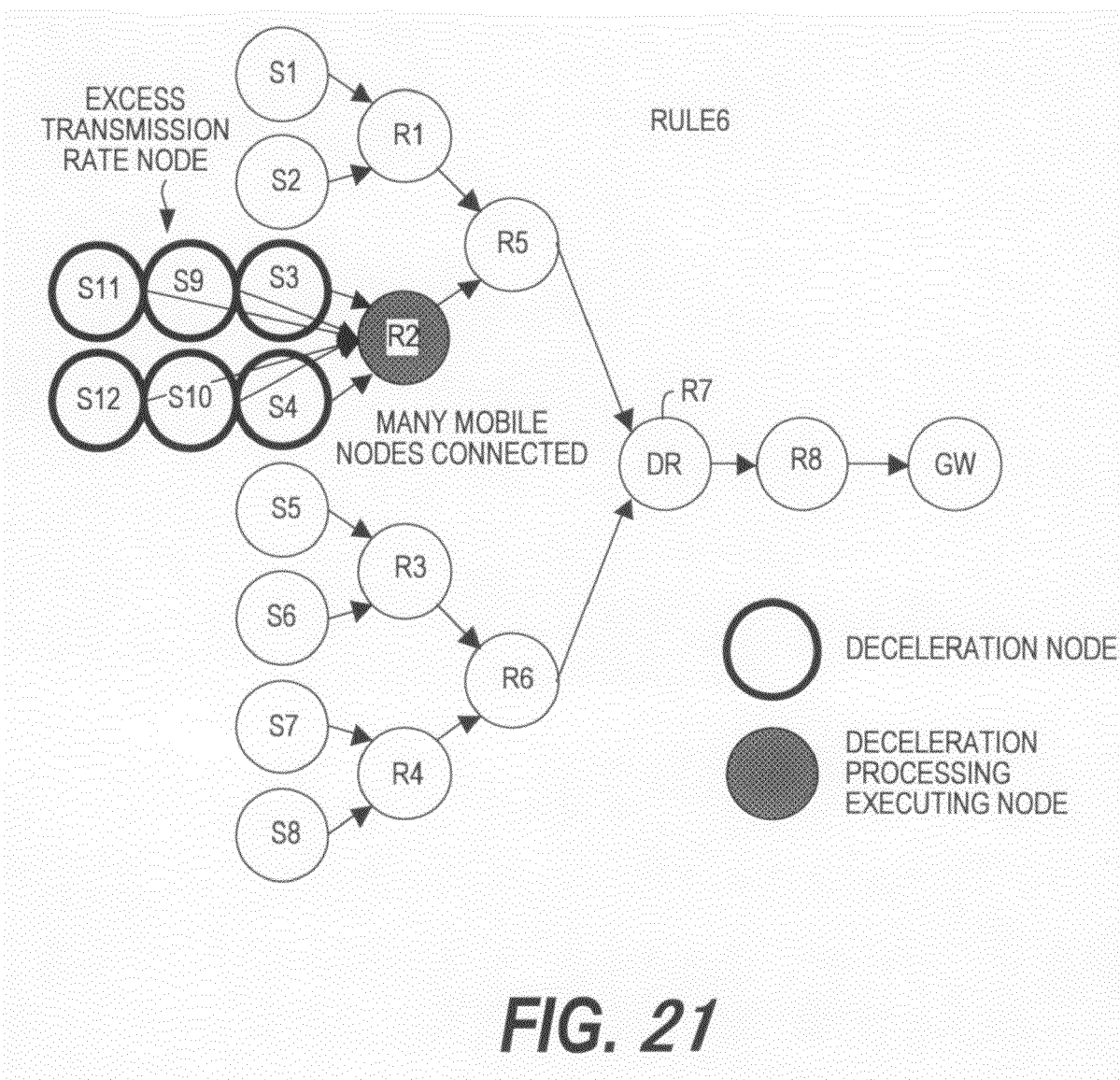
FIG. 21 is an example of a block diagram of a sensor net system in which a deceleration processing rule RULE6 is applied according to the first embodiment.

FIG. 21 shows an example of deceleration processing of the sensor net system in which the rule RULE6 is applied. In FIG. 21, the sensor nodes S1 to S8, the router nodes R1 to R8, and the gateway GW are arranged in the same way as in FIG. 16, except that the sensor nodes S9 to S12, in addition to the mobile sensor nodes S3 and S4, are connected to the router node R2.

The router node R7 of FIG. 21 is a boundary node since the sum of the inflow velocity of the router nodes R5 and R6 is calculated by Expression (1) to be equal to or larger than the limit transfer rate VL and, at the same time, the inflow velocity of data from the router node R5 and the inflow velocity of data from the router node R6 are each less than the limit transfer rate VL.

According to the rule RULE6, out of sensor nodes upstream of an excess transmission rate node that is identified by a boundary node DR, a parent router PR that is connected downstream to the excess transmission rate node is determined as a deceleration processing executing node. The boundary node DR instructs the parent router PR that is connected downstream to the excess transmission rate node to execute deceleration processing.

The router node R7 determined as a boundary node DR therefore obtains the transmission rate for each ID of the sensor node 1 that is contained in events received from the upstream router nodes R5 and R6, and judges, as an excess transmission rate node, a node whose transmission rate satisfies Expression (5) and is excessively high. The example of FIG. 21 shows a case where the amount of data transferred from the sensor nodes S3, S4, and S9 to S12 per unit time has increased to an excessive level. The router node R7 calculates the proportional deceleration amount $v_{Ri}$ from the data transfer amount of the sensor nodes S3, S4, and S9 to S12. The router node R7 chooses, as a deceleration processing executing node, the router node R2, which is a parent router CR that transfers data of the sensor nodes S3, S4, and S9 to S12 identified as excess transmission rate nodes.

The router node R7, which is the boundary node DR, instructs the router node R2, which is the parent router PR, to execute deceleration processing so that the data transfer amount is reduced by the proportional deceleration amount $v_{Ri}$. The router node R7 executes processing of one of the items b1 and a2, which are part of the deceleration processing listed in the item (3) in the above-mentioned section "(Hardware Configuration of the Router Node)".

b1: Cutting up observation information from an excess transmission rate node into three pieces, that is, the maximum value, the minimum value, and the mean value.

a2: Sending observation information in a mass.

Which one of the above-mentioned two types of processing should be chosen is set in advance by the administrator of the sensor net system through the user terminal 13 or by other measures.

For example, when it is the deceleration processing of the item b1 that is set as the rule RULE6 deceleration processing, the router node R2, which is the parent router PR, temporarily stores observation values from the sensor nodes S3, S4, and S9 to S12, which are excess transmission rate nodes, calculates the maximum value, minimum value, and mean value of the stored observation values in a cycle that achieves the proportional deceleration amount $v_{Ri}$ obtained in Step 1007 of FIG. 12, and outputs the calculated values downstream to the router node R7, which is the boundary node DR. The amount of data transferred downstream of the router node R7 is thus prevented from exceeding the limit transfer rate VL.

Similarly, when it is the batch transmission of the item a2 that is set as the rule RULE6 deceleration processing, the router node R2, which is the parent router PR, temporarily stores events from the sensor nodes S3, S4, and S9 to S12, and sends the stored observation values in a mass to the downstream router node R7 in a cycle that achieves the proportional deceleration amount $v_{Ri}$ obtained in Step 1007 of FIG. 12.

According to the rule RULE6, the processing of the item b1 or a2 prevents the amount of data transferred from the router node R2 to a downstream node from increasing to an excessive level. After deceleration processing is started, the router node R2 executes reversion processing, which will be described later, to return from the deceleration processing. Through the reversion processing, the router node R2 ends the deceleration processing and returns to normal processing at a point when the amount of data transferred from each of the sensor nodes S3, S4, and S9 to S12, which have been excess transmission rate nodes, satisfies Expression (4).

Such processing is particularly effective in the case where many sensor nodes are connected to one router node concentrative.

If, in FIG. 21, many sensor nodes are to be concentrated on one router node by connecting the sensor nodes S3, S4, and S9 to S12 to the router node R2, when each of those sensor nodes has a data transfer amount that satisfies Expression (4) and, at the same time, the amount of data transferred downstream of the router node R2 is equal to or larger than the limit transfer rate VL, the router node R2 is both a parent router PR and a boundary node DR, and the rule the rule RULE1 is applied to let the router node R2 execute deceleration processing.

As mentioned in the detailed description of the rule RULE5 with reference to FIG. 23, the specifics (the items b1 and a2) of deceleration processing may be set or chosen by a parent router PR that is a deceleration processing executing node instead of being set by a boundary node DR. The boundary node DR in this case sends the proportional deceleration amount $v_{Ri}$ and a deceleration start command to the parent PR that is a deceleration processing executing node.

Described next is an example of processing that is executed when a parent router PR performs a batch transmission as deceleration processing.

Figure 24:
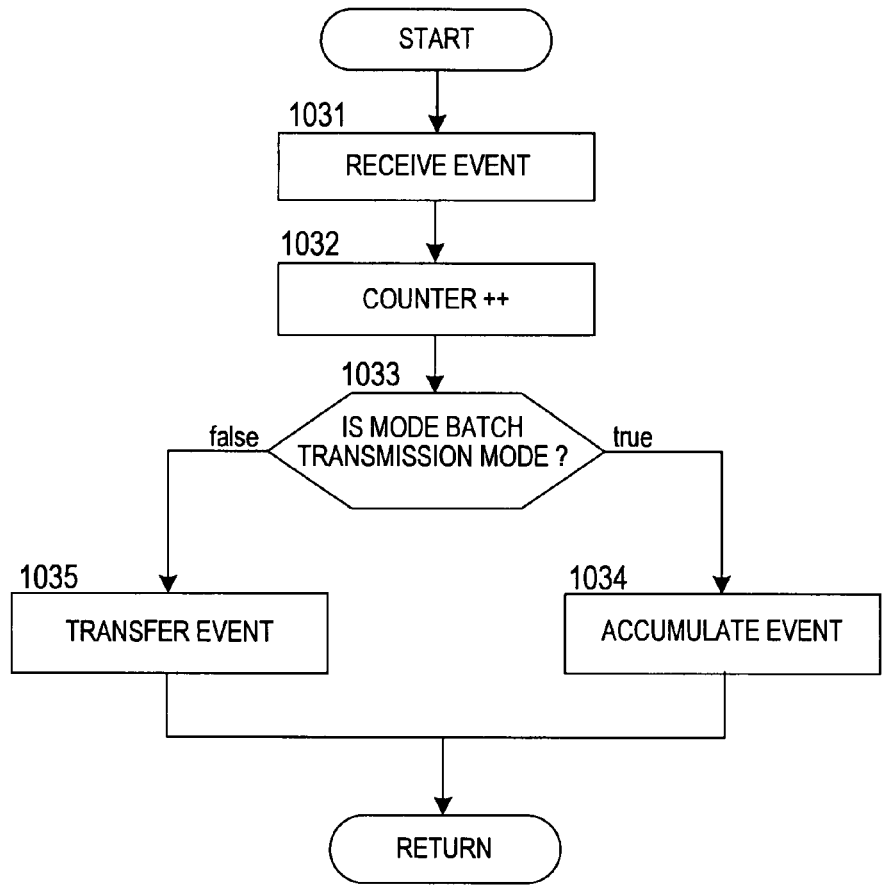
FIG. 24 is flow chart showing an example of an event reception processing which is performed in a parent router according to the first embodiment.

FIGS. 24 to 27 are flow charts showing an example of processing that is executed in a parent router PR. FIG. 24 shows processing that is executed each time the parent router PR receives an event from an upstream node. Receiving an event from an upstream node in Step 1031 of FIG. 24, the parent router PR increments a preset counter (1032). The parent router PR judges whether or not batch transmission processing is currently chosen (1033). In the case where batch transmission processing is not currently chosen, the parent router PR stores the event in the memory 201 or other storage component where received events are accumulated (1034). In the case where batch transmission processing is not currently chosen, the event is transferred to a downstream node (1035).

Figure 25:
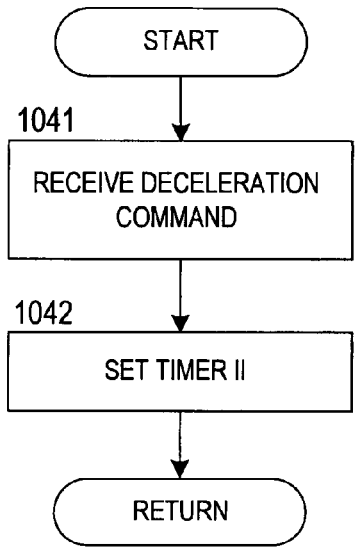
FIG. 25 is a flow chart showing an example of a deceleration command reception processing which is performed in the parent router according to the first embodiment.

FIG. 25 shows processing that is executed when the parent router PR receives a deceleration command from a downstream boundary node DR. Receiving a deceleration command (1041), the parent router PR activates a preset timer II (1042). The timer II causes interruption in a given cycle (e.g., 1-minute cycle) to execute processing described below. When the timer II is set, the parent router PR activates a preset timer I to execute monitoring of deceleration processing (batch transmission) in a given cycle (e.g., 1-minute cycle).

Figure 26:
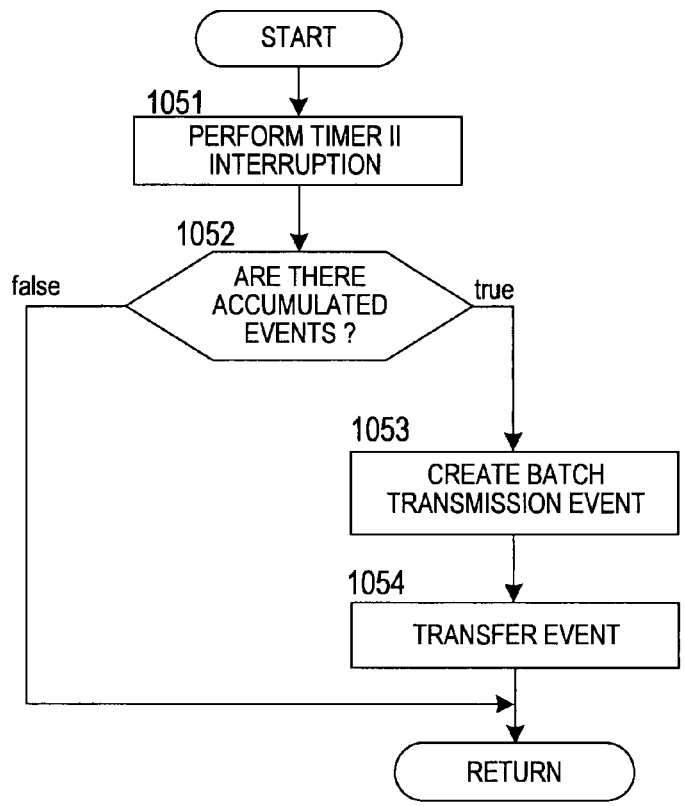
FIG. 26 is a flow chart showing an example of timer II interruption processing which is performed in the parent router according to the first embodiment.

FIG. 26 is a flow chart showing an example of batch transmission processing that is executed as a result of interruption caused by the timer II. The timer II causes interruption in a given cycle to activate this processing (1051). In Step 1052, whether or not there are events accumulated in the memory 201 is judged. When there are events accumulated, an event in which multiple events (observation values or the like) are compiled is created (1053), and the information in which multiple events are compiled is sent to a downstream router node (1054).

Figure 27:
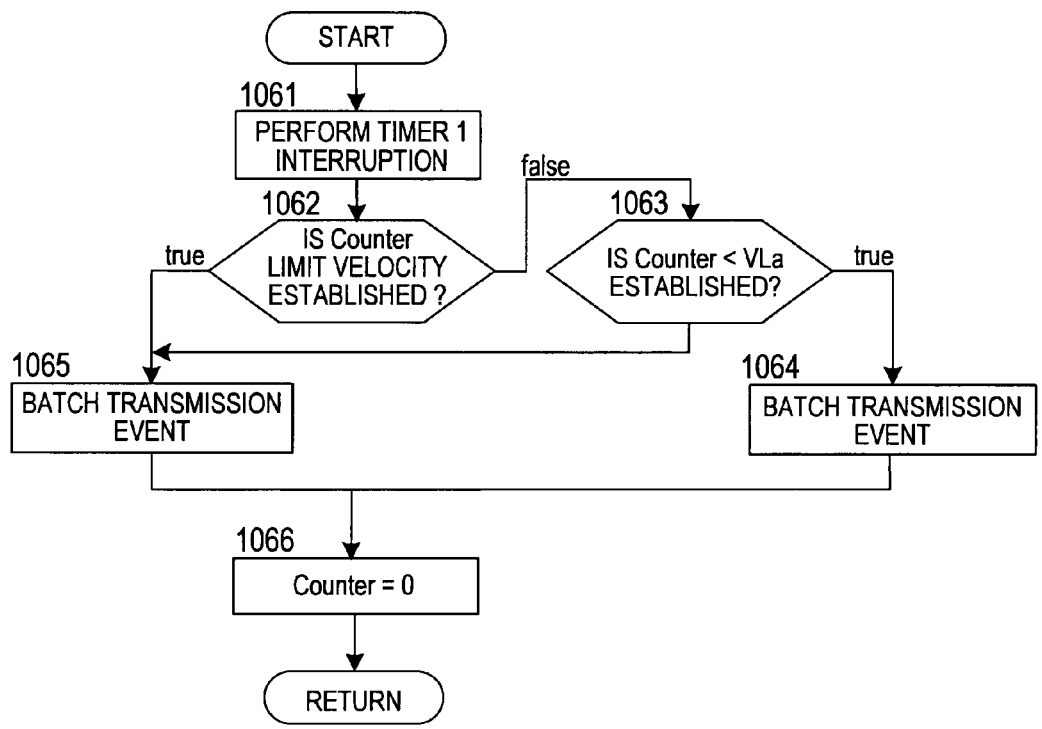
FIG. 27 is a flow chart showing an example of timer I interruption processing which is performed in the parent router according to the first embodiment.

FIG. 27 shows monitoring processing which is periodically executed as a result of interruption caused by the timer I. The timer I causes interruption to activate this processing (1061). A judgment is made about whether or not the value of a counter that counts events in Step 1032 of FIG. 24 is larger than the limit transfer rate VL (1062). The counter indicates how many events are received per cycle (in this example, 1 minute) of the timer I, and the value of the counter is treated as per-unit timer data transfer amount. The limit transfer rate VL is set in advance in the parent router PR as the per-unit time event transfer amount. In the case where the value of the counter is larger than the limit transfer rate VL, the parent router PR proceeds to Step 1065 to set batch transmission processing. Thereafter, the counter is reset to 0 and the processing is ended (1066).

When the value of the counter is found to be equal to or less than the limit transfer rate VL in Step 1062, the parent router PR proceeds to Step 1063 to compare the counter value against a threshold VLa for canceling deceleration processing (1064). In the case where the current data transfer amount (the value of the counter) is less than the threshold VLa, the deceleration processing is terminated. Accordingly, the batch transmission processing is canceled (1064), the counter is reset to 0, and the processing is ended. In the case where the current data transfer amount (the value of the counter) is equal to or larger than the threshold VLa, the deceleration processing is continued. Accordingly, batch transmission processing is set (1065), the counter is reset to 0, and the processing is ended.

Through the above-mentioned processing, the parent router PR starts batch transmission processing upon reception of a deceleration processing command and, when the counter indicating the current data transfer amount reaches a value less than the given threshold VLa, ends the batch transmission processing and stops the deceleration processing to return to normal operation (transfer of events).

(Reversion Processing for Return from Deceleration Processing)

Figure 28:
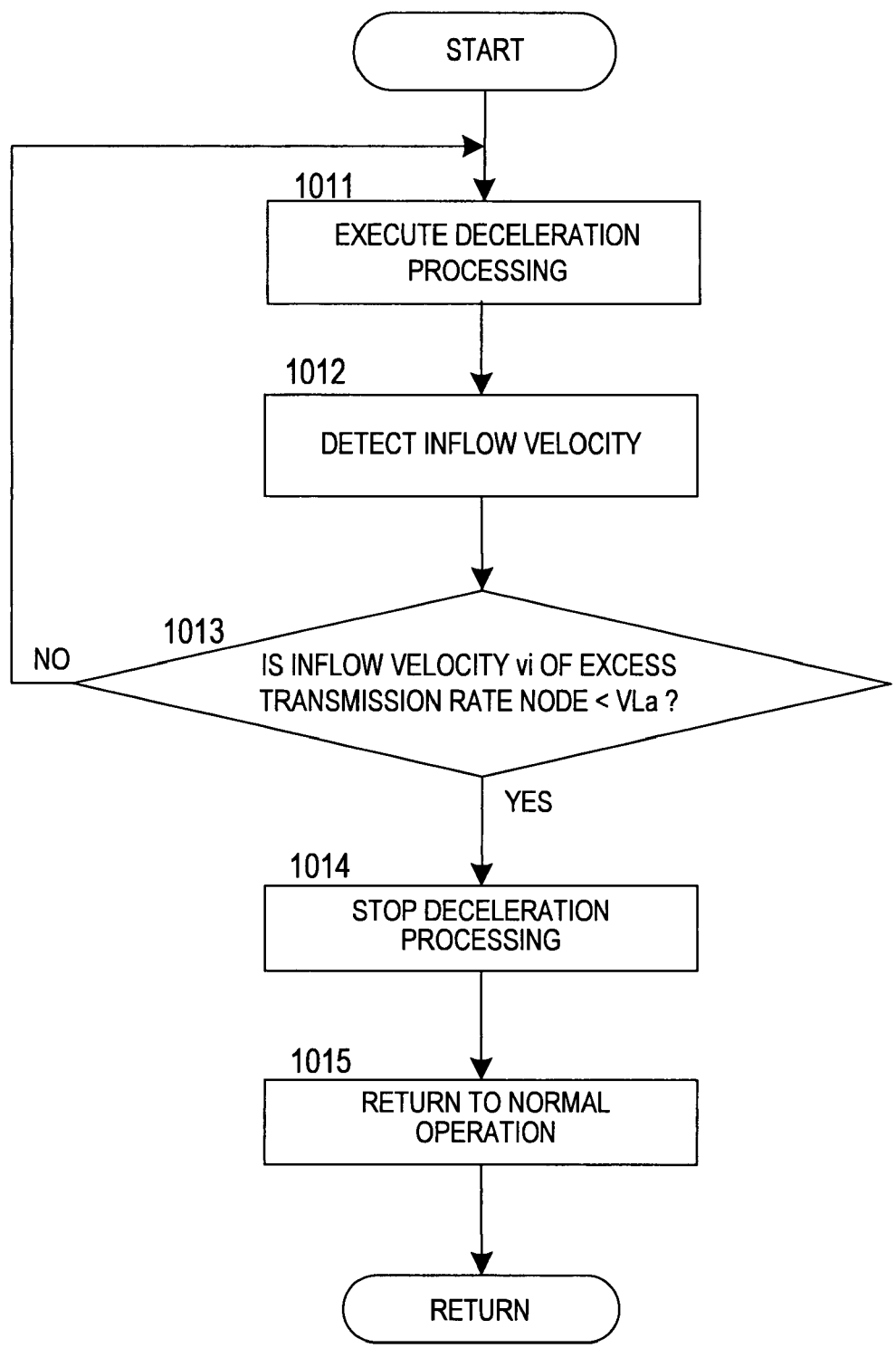
FIG. 28 is a flow chart showing an example of reversion processing which is executed in a deceleration processing executing node according to the first embodiment.

A flow chart of FIG. 28 shows an example of reversion processing performed in a node that executes deceleration processing according to the rules RULE1, RULE2, RULE5, and RULE6. The processing shown in FIG. 28 is performed when the router node 2 or the gateway 3 is a deceleration processing executing node.

After deceleration processing is started (1011), the router node 2 detects the inflow velocity of data from an excess transmission rate node (1012). In Step 1013, the router node 2 compares the inflow velocity vi of the excess transmission rate node against the threshold VLa for ending deceleration processing and, when the inflow velocity vi is less than the threshold VLa, judges that the excess transmission rate node has returned to a normal state. When the inflow velocity vi is equal to or larger than the threshold VLa, it means that the transmission rate is still excessively high, and the router node 2 returns to Step 1011 to repeat the above-mentioned processing. Once the inflow velocity vi of data from the excess transmission rate node becomes less than the threshold VLa, the router node 2 stops the deceleration processing (1014), and returns to normal operation (1015). The threshold VLa is set to a value smaller than the limit transfer rate VL in order to avoid hunting of deceleration processing and normal operation.

In the case where a boundary node serves as a deceleration processing executing node as in the rules RULE1 and RULE2, deceleration processing may be stopped at the time when the transfer rate of the boundary node becomes lower than the limit transfer rate VL.

In the case where the sensor node 1 serves as a deceleration processing executing node as in the rules RULE3 and RULE4, the sensor node 1 does not judge whether or not its own transmission rate is excessively high. Therefore, the parent router PR (or the boundary node DR) of this sensor node 1 interrupts the deceleration processing at given time intervals (e.g., 30-minute intervals) to return the sensor node 1 to normal operation. When the transmission rate in normal operation is equal to or larger than the threshold VLa, the parent router PR or the boundary node DR allows the sensor node 1 to resume the deceleration processing. If the transmission rate of the sensor node 1 returned to normal operation is less than the threshold VLa, the parent router PR or the boundary node DR may keep the sensor node 1 to normal operation and end the deceleration processing.

(Data Format)

The data format of packets used in the sensor net system of this invention will be described below.

Figure 29:
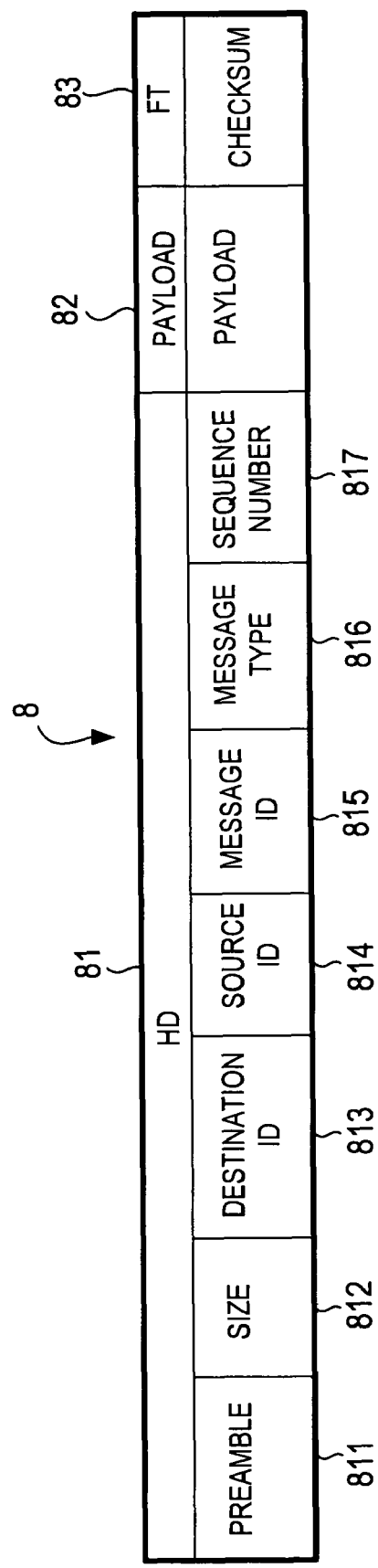
FIG. 29 is an explanatory diagram showing an example of a packet data format according to the first embodiment.

FIG. 29 shows the data format of a packet 8 which includes a header 81, a payload 82, and a checksum 83. The header 81 contains a preamble 811, a size 812, which indicates the capacity of the payload, a destination ID 813, which indicates the ID (for example, MAC address) of the destination, a source ID 814, which indicates the ID (for example, MAC address) of the source, a message ID 815, which indicates the identifier of the type of the packet, a message type 816, which indicates the type of the message, and a sequence number 817, which indicates a sequence number assigned to the packet 8.

Figure 30:
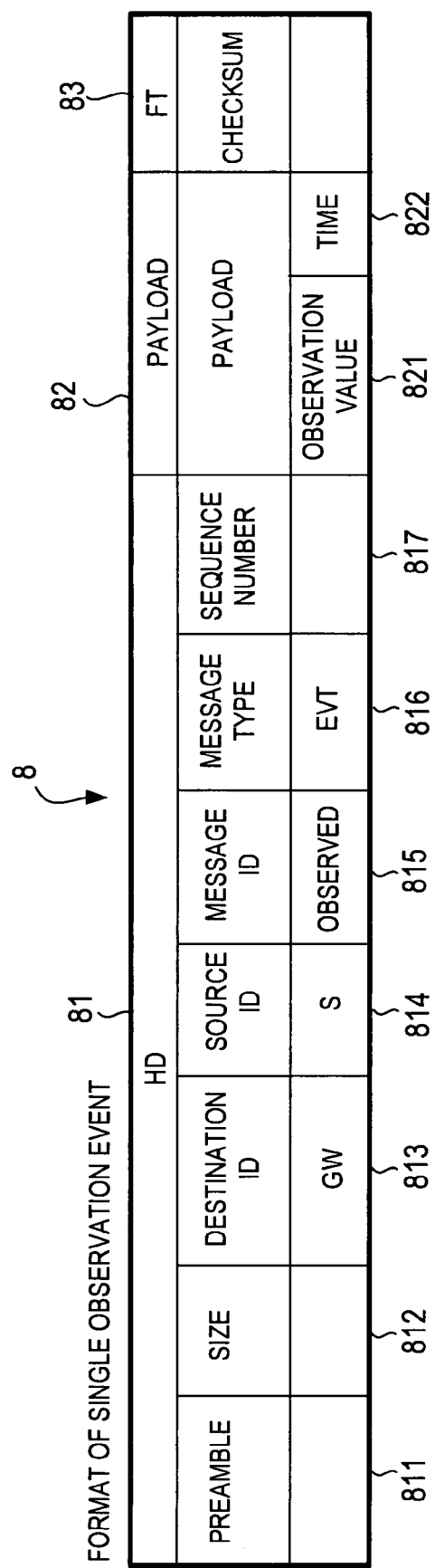
FIG. 30 is an explanatory diagram showing an example of a packet data format for a single observation event according to the first embodiment.

FIG. 30 shows the packet 8 for transmitting one observation value in a single packet. The ID of the sensor node 1 is stored as the source ID 814, the ID of the gateway 3 is stored as the destination ID 813. Stored as the message ID 815 is "OBSERVED", which indicates that it is an observation value. Stored as the message type 816 is "EVT", which indicates that it is an event. The payload 82 holds an observation value 821 and a time 822 at which the observation value 821 has been obtained.

Figure 31:
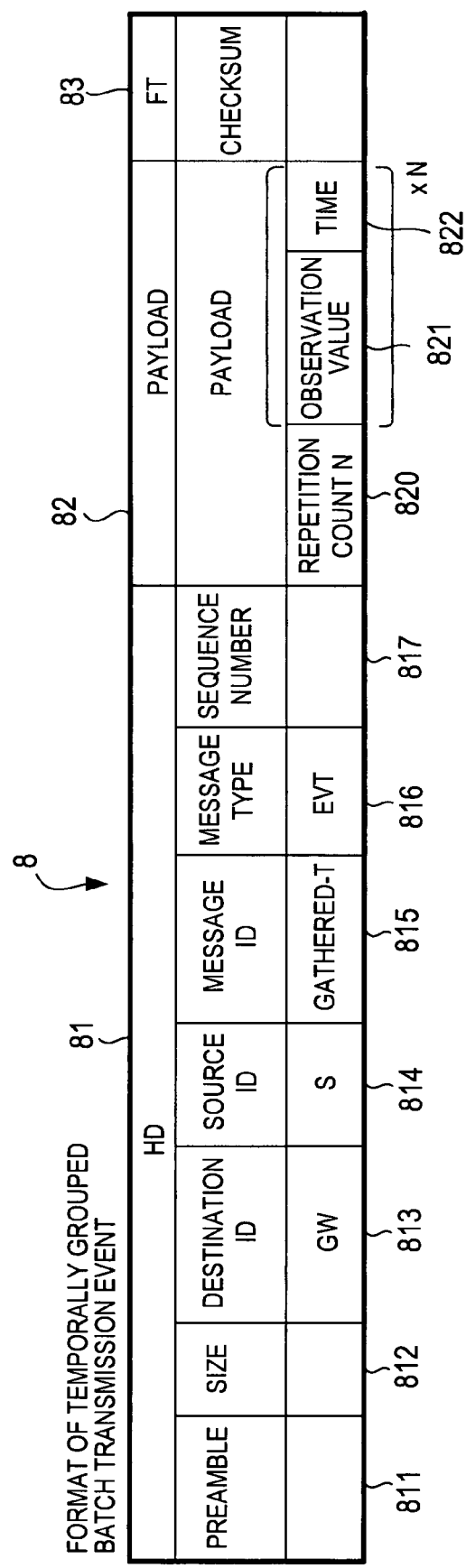
FIG. 31 is an explanatory diagram showing an example of a packet data format for temporally grouped batch transmission events according to the first embodiment.
Figure 32:
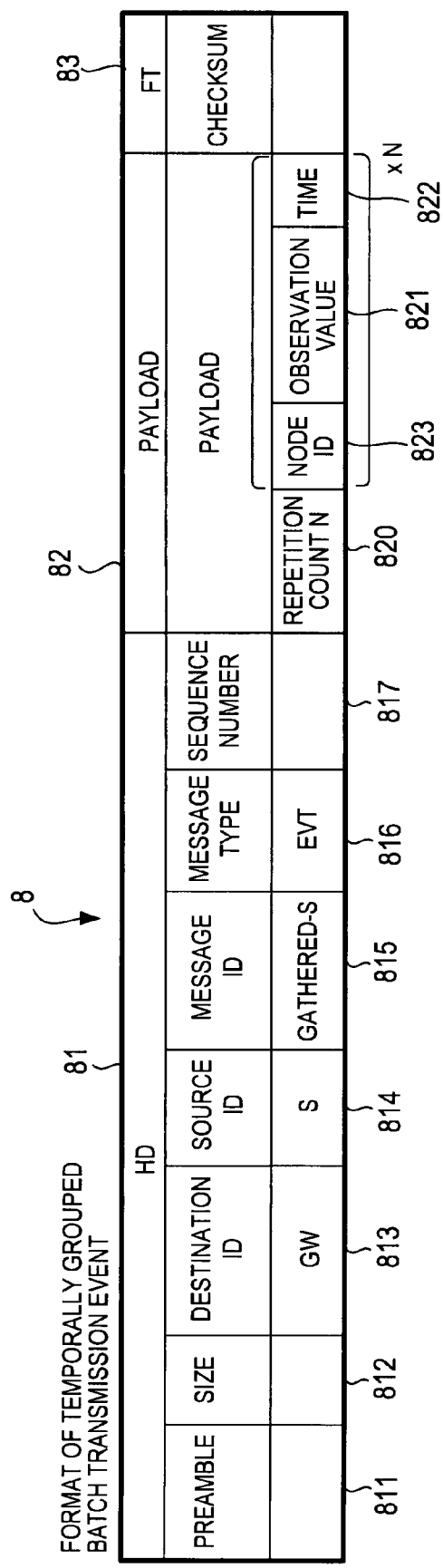
FIG. 32 is an explanatory diagram showing an example of a packet data format for spatially grouped batch transmission events according to the first embodiment.

FIGS. 31 and 32 each show the data format of the packet 8 that is used in the batch transmission processing described above. There are two types of events in batch transmission processing. One is a temporally grouped batch transmission event in which observation values are grouped together based on the measurement interval as shown in FIG. 31, and the other is a spatially grouped batch transmission event in which observation values of different sensor nodes 1 are grouped together as shown in FIG. 32. The format of the temporally grouped batch transmission event has, as shown in FIG. 31, the ID of one sensor node 1 as the source ID 813 and "GATHERED-T", which indicates that it is a temporally grouped batch transmission event, as the message ID 815.

The payload 82 holds a data repetition count 820, and pairs of observation value 821 and time 822. The count of pairs of observation value 821 and time 822 corresponds to the repetition count 820. With the temporally grouped batch transmission event, multiple events of one sensor node 1 can be sent in a single transmission.

The format of the spatially grouped batch transmission event has, as shown in FIG. 32, the ID of a parent router PR to which multiple sensor nodes 1 are connected as the source ID 813 and "GATHERED-S", which indicates that it is a spatially grouped batch transmission event, as the message ID 815.

The payload 82 holds the data repetition count 820, pairs of node ID 823 and observation value 821, and a time 822. The count of pairs of node ID 823 and observation value 821 corresponds to the repetition count 820. With the spatially grouped batch transmission event, events of different sensor nodes 1 can be sent in a single transmission.

FIGS. 33 and 34 each show a multi byte integer (MBI) used to express an observation value and a time that are held in the payload 82. Shown in FIG. 33 is the format of a multi byte integer. A continuation flag is stored in bit 0, and an integer part is stored in 7 bits from bit 1 to bit 7. When the continuation flag is 1, it means that the integer part from bit 1 to bit 7 is combined with an integer part from bit 1 to bit 7 of the subsequent 1-byte (octet) data. As shown in FIG. 34, bytes are combined into one piece of data until a byte whose continuation flag is 0 is reached. The example of FIG. 34 shows a case of combining 3 bytes of multi byte integer. A value obtained by combining the first to seventh bits of three bytes when the seventh bit of the byte whose continuation flag is 0 is set as the least significant bit represents one integer.

FIG. 35 shows a data description in which the temperature and time are each expressed in absolute value and relative value. With a relative value r, the data length can be shortened by describing only the difference from a reference value. When combined with the MBI, this can reduce the data size of a batch transmission event.

Figure 36:
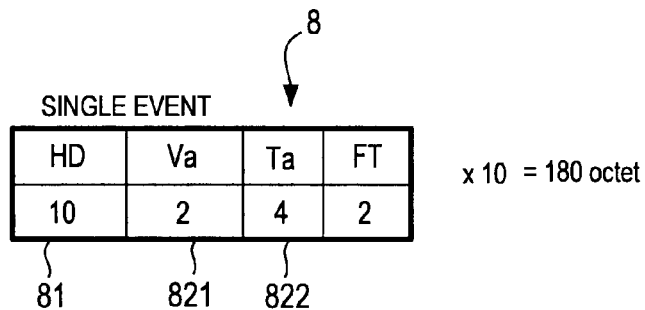
FIG. 36 is an explanatory diagram showing an example of a packet data format for a single observation event according to the first embodiment.

FIG. 36 shows an example of sending the packet 8 that stores a single event ten times. The payload 82 of the packet 8 holds one piece of data including 2-byte observation value 821 expressed in absolute value, 4-byte time 822, 10-byte header 81, and 2-byte checksum 83, i.e., eighteen bytes (octets) in total. The data size is 180 bytes when ten of this packet 8 are sent.

Figure 37:
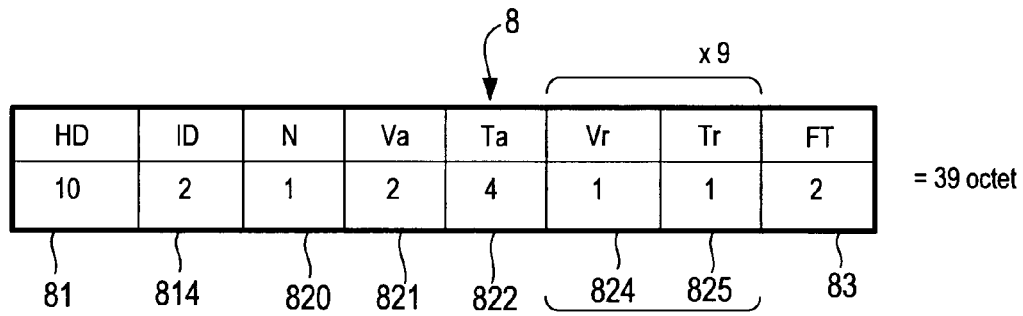
FIG. 37 is an explanatory diagram showing an example of a packet data format for temporally grouped batch transmission events according to the first embodiment.

FIG. 37 shows the packet 8 for the temporally grouped batch transmission event. The payload 82 stores 2-byte reference observation value Va 821 expressed in absolute value and 4-byte reference time Ta 822 expressed in absolute value. Va 821 and Ta 822 are followed by pairs of 1-byte relative observation value Vr 824 and 1-byte relative time value Tr 825. The count of pairs of relative observation value Vr 824 and relative time value Tr 825 corresponds to the repetition count 820. When the header 81 is 10 bytes, the ID 814 is 2 bytes, and the repetition count 820 is 1 byte, a batch transmission event that contains ten pairs of observation value and time has a data size of 39 bytes. In this way, the same amount of data (events) can be transmitted in a far smaller data size than when the single observation event shown in FIG. 36 is transmitted ten times, and the per-unit time data transfer amount can thus be reduced.

Figure 38:
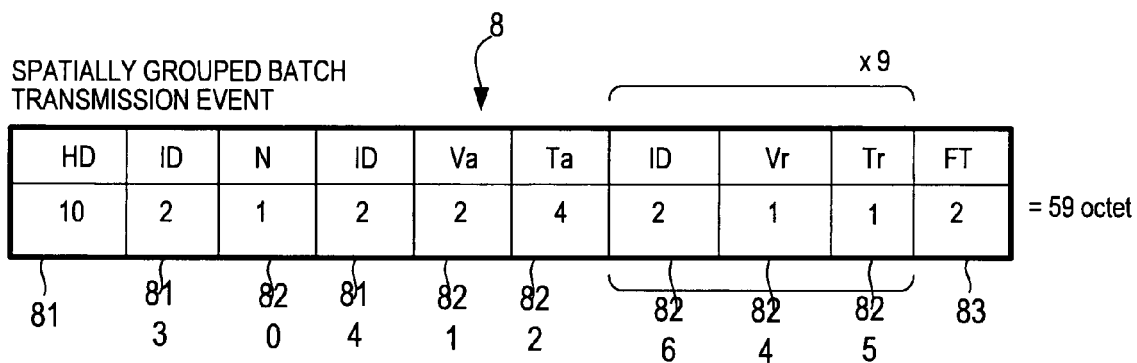
FIG. 38 is an explanatory diagram showing an example of a packet data format for spatially grouped batch transmission events according to the first embodiment.

FIG. 38 shows the packet 8 for the spatially grouped batch transmission event. The payload 82 stores 2-byte reference node ID 814 expressed in absolute value, 2-byte reference observation value Va 821 expressed in absolute value, and 4-byte reference time Ta 822 expressed in absolute value. The node ID 814, Va 821, and Ta 822 are followed by pairs of 2-byte node ID 826 and 1-byte relative observation value Vr 824, and 1-byte relative time value Tr 825. The count of pairs of node ID 826 and relative observation value Vr 824 corresponds to the repetition count 820. When the header 81 is 10 bytes, the ID 813 is 2 bytes, and the repetition count 820 is 1 byte, a batch transmission event that contains ten pairs of node ID and observation value has a data size of 59 bytes. In this way, the same amount of data (events) can be transmitted in a far smaller data size than when the single observation event shown in FIG. 36 is transmitted ten times, and the per-unit time data transfer amount can thus be reduced.

Second Embodiment

Figure 39:
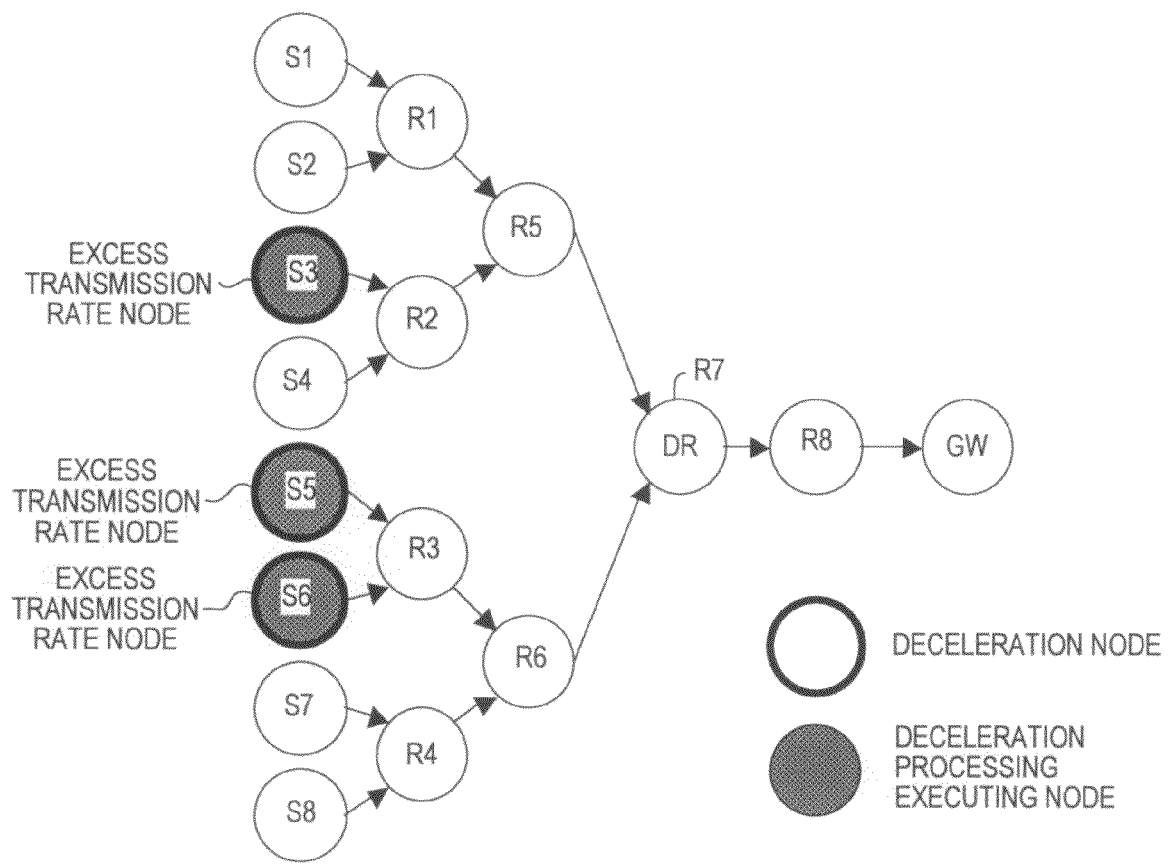
FIG. 39 is an example of a block diagram of a sensor net system in which a deceleration processing rule is applied according to a second embodiment of this invention.

FIG. 39 shows a second embodiment of this invention. Unlike the first embodiment where a deceleration node and a deceleration processing executing node are determined after an excess transmission rate node is identified, the second embodiment omits identification of an excess transmission rate node in executing deceleration processing. The rest of the configuration of the second embodiment is the same as the first embodiment.

Shown in FIG. 39 is an example of deceleration processing of a sensor net system to which the second embodiment is applied. In FIG. 39, the sensor nodes S1 to S8, the router nodes R1 to R8, and the gateway GW are arranged in the same way as in FIG. 16 of the first embodiment.

In the example of FIG. 39, the sensor nodes S3, S5, and S6 are excess transmission rate nodes whose data transfer amount per unit time has increased to an excessive level. The router node R7 is a boundary node since the sum of the inflow velocity of the router nodes R5 and R6 is calculated by Expression (1) to be equal to or larger than the limit transfer rate VL and, at the same time, the inflow velocity of data from the router node R5 and the inflow velocity of data from the router node R6 are each less than the limit transfer rate VL.

Figure 40:
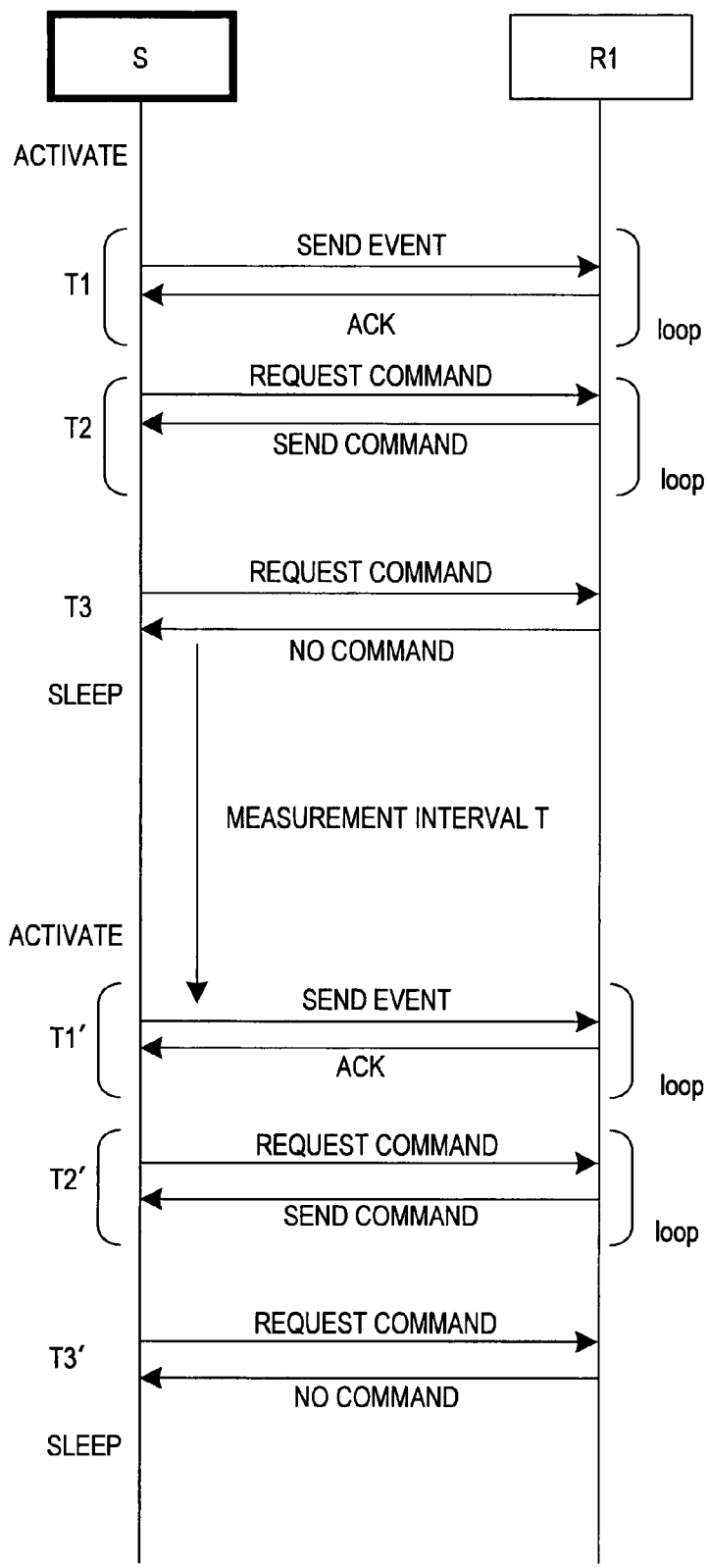
FIG. 40 is a time chart showing an example of communication processing that is executed in a sensor node and a router node according to the second embodiment.

A boundary node DR in the second embodiment does not identify an excess transmission rate node. Instead, the boundary node DR deems all upstream sensor nodes 1 as deceleration nodes and deceleration processing executing nodes, and instructs the upstream sensor nodes 1 to reduce the transmission rate. As shown in FIG. 7, each sensor node 1 is activated upon interruption caused by the timer at given measurement intervals (e.g., 5-minute intervals) and, after finishing measurement and transmission of an observation value and reception and execution of a command, returns to a sleep state. In FIG. 40, the sensor node S1 in a sleep state is activated when a given measurement interval T elapses and sends, as an event, an observation value obtained by the sensor to a parent router PR (T1). Finishing transmitting the event, the sensor node S1 requests a command that is directed to itself and, when a command directed to the sensor node S1 is found in the parent router PR, obtains this command from the parent router PR to execute the command (T2). The sensor node S1 repeats the processing of T2 until there are no commands directed to itself are left (T3), and then returns to a sleep state.

If the per-unit time data transfer amount of the sensor node S1 increases to an excessive level, the measurement interval T of the sensor node S1 becomes significantly shorter than normal. For example, when the normal measurement interval is five minutes, the measurement interval of an excess transmission rate node is ten seconds. The data transfer amount of the sensor node S1 is thus increased to an excessive level.

In such an excess transmission rate node, an interval T2'-T2 of command request at T2 of FIG. 40 is also shortened in proportion to the shortening of the measurement interval T. Therefore, when the transmission rate of a node becomes excessively high in the second embodiment, the boundary node DR issues, to the parent router PR upstream of the boundary node DR, a deceleration command to perform deceleration processing on every sensor node. Having an extremely short measurement interval T, an excess transmission rate node frequently requests a command from the parent router PR, and will most likely receive and execute the deceleration command.

Once the per-unit time data transfer amount of the boundary node DR becomes less than the limit transfer rate VL, the boundary node DR instructs the upstream parent router PR to delete the deceleration command. Since the measurement interval T of a normal sensor node is longer than that of an excess transmission rate node, the deceleration command will most likely be deleted by the time a normal sensor node requests a command from the parent router PR. The possibility of a normal sensor node receiving the deceleration command is therefore low, and the normal sensor node can keep operating normally.

The above-mentioned example will be described with reference to FIG. 39. The router node R7 determined as a boundary node DR is receiving an excessive amount of events from the upstream router nodes R5 and R6. The sensor nodes S3, S5, and S6 in this example are excess transmission rate nodes which satisfy Expression (5), but the router node R7 takes no action to identify which node is an excess transmission rate node.

The router node R7 issues deceleration commands for decelerating all the sensor nodes S1 to S8, and sends the deceleration commands to the router nodes R1 to R4 as parent routers PR of the sensor nodes S1 to S8, which output events to the upstream router nodes R5 and R6.

Receiving the deceleration commands, the parent routers PR wait for the sensor nodes S1 to S8 to request commands. The sensor nodes S3, S5, and S6, which are excess transmission rate nodes, have an extremely short measurement interval T. Therefore, the sensor node S3 receives the deceleration command from its parent router PR, i.e., the router node R2, and executes the deceleration command. The sensor nodes S5 and S6 receive the deceleration commands from their parent router PR, i.e., the router node R3, and execute the deceleration command. The per-unit time data transfer amount of the boundary node DR is reduced as a result to less than the limit transfer rate VL. Now that the transfer rate is below the limit transfer rate VL, the boundary node DR instructs the upstream parent routers PR to delete the deceleration command. At this point, the deceleration commands directed to the sensor nodes S3, S5, and S6, which are excess transmission rate nodes in FIG. 39, have already been received and are not in the router nodes R2 and R3. The parent routers PR accordingly delete the deceleration commands such that the router node R2 deletes the deceleration command directed to the sensor node S4 while the router nodes R1 and R4 delete all the deceleration commands they have received.

If the normal sensor nodes S1, S2, S4, S7, and S8 request commands from the parent routers PR after that, those normal sensor nodes do not perform deceleration since the deceleration commands have already been deleted.

The boundary node DR can thus reduce its per-unit time data transfer amount to less than the limit transfer rate by decelerating (reducing the transmission rate of) only the sensor node 1 that has an excessively high per-unit time data transmission amount without identifying the excess transmission rate node.

Figure 41:
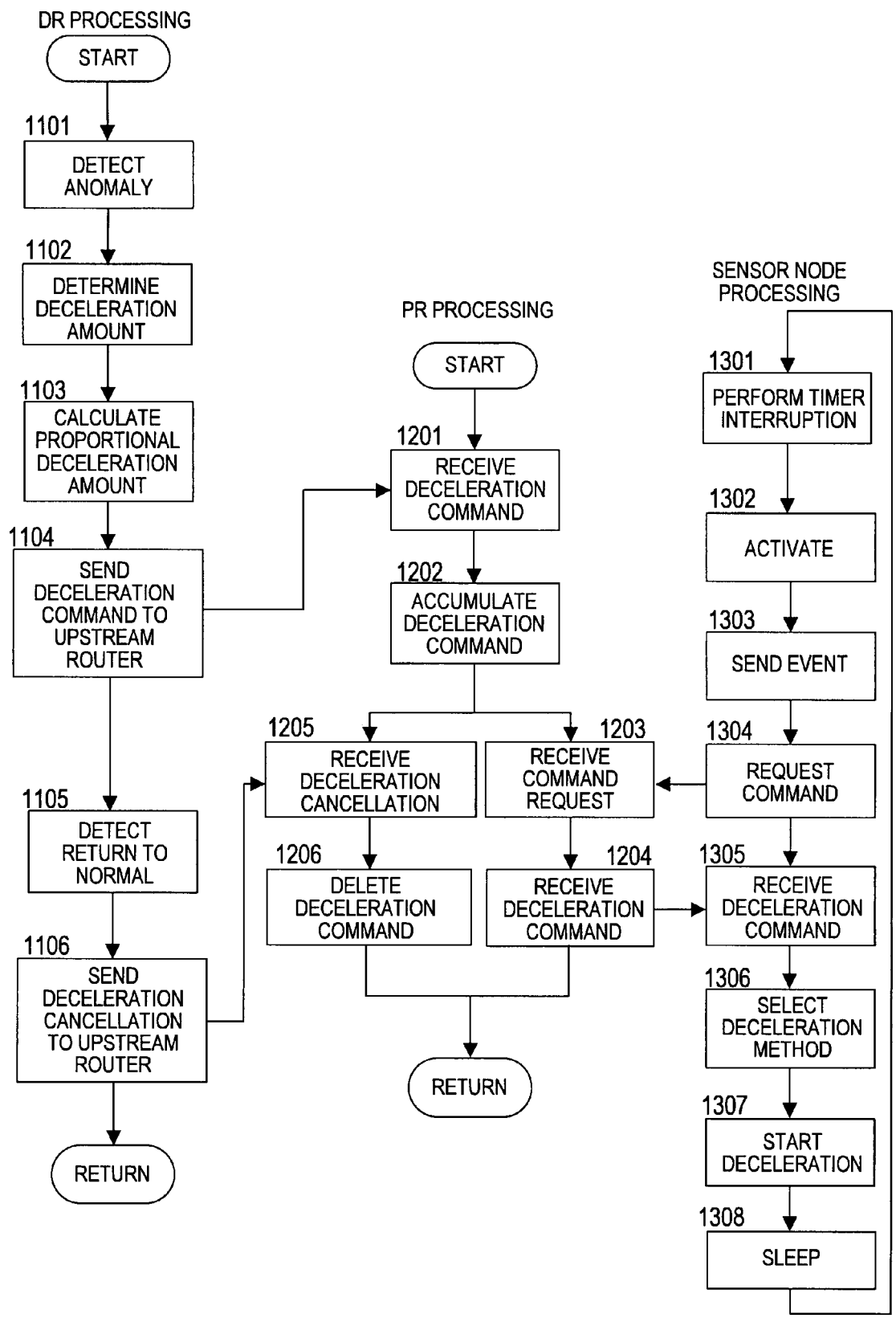
FIG. 41 is a flow chart showing an example of processing that is executed in a boundary node DR, a parent router PR, and the sensor node according to the second embodiment.

FIG. 41 is a flow chart showing an example of processing that is executed in a boundary node DR, a parent router PR, and the sensor node 1.

The router node R2 which is a boundary node DR judges itself as a boundary node DR and starts deceleration processing in the case where the inflow velocity of events into itself is calculated by Expression (1) of the first embodiment to be equal to or larger than the limit transfer rate VL and, at the same time, each input is less than the limit transfer rate VL (1101).

The boundary node DR uses Expression (2) and Expression (3) to calculate the deceleration amount VR and the proportional deceleration amount $v_{Ri}$ in the manner described in the first embodiment (1102 and 1103). The boundary node DR then sends deceleration commands containing the proportional deceleration amount $v_{Ri}$ to all the upstream sensor nodes (1104).

Figure 42:
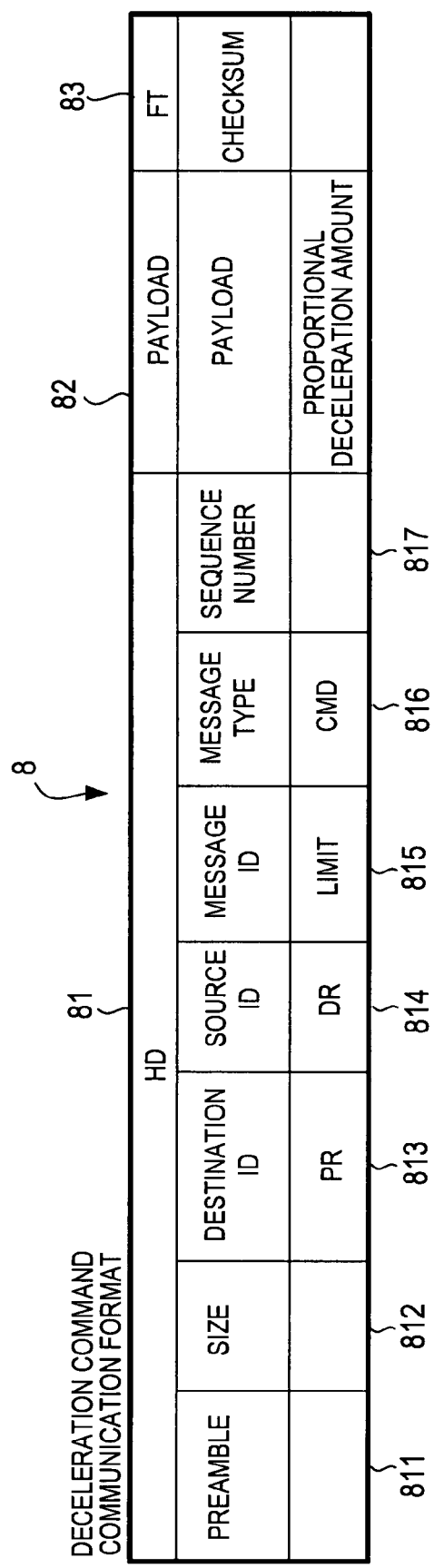
FIG. 42 is an explanatory diagram showing an example of a packet data format for a deceleration command according to the second embodiment.

FIG. 42 shows the data format of the packet 8 for a deceleration command. The packet 8 of FIG. 42 includes the header 81, the payload 82, and the checksum 83 as in the case of FIG. 29 of the first embodiment. The header 81 includes the preamble 811, the size 812, which indicates the capacity of the payload, the destination ID 813, which indicates the ID (for example, MAC address) of the destination, the source ID 814, which indicates the ID (for example, MAC address) of the source, the message ID 815, which indicates the identifier of the type of the packet, the message type 816, which indicates the type of the message, and the sequence number 817, which indicates a sequence number assigned to the packet 8. The ID of a parent router PR upstream of the boundary node DR is stored as the destination ID 813, and the ID of this boundary node DR is stored as the source ID 814. Stored as the message ID 815 is "LIMIT", which indicates deceleration. Stored as the message type 816 is "CMD", which indicates that it is a command. The payload 82 stores the proportional deceleration amount $v_{Ri}$.

In FIG. 41, after issuing the deceleration commands, the boundary node DR monitors the sum Σvi of the inflow velocity vi. The boundary node DR judges as in the first embodiment that the inflow velocity vi has been restored to a normal level when the sum Σvi becomes less than the given threshold VL (1105). In other words, the boundary node DR judges that deceleration (transmission rate reduction) of the upstream sensor nodes by the deceleration commands has been completed.

The boundary node DR next sends commands (deceleration cancellation command) for deleting the deceleration commands to the upstream nodes (1106). The boundary node DR thus prevents the transmission rate of a normal sensor node from being reduced.

Figure 43:
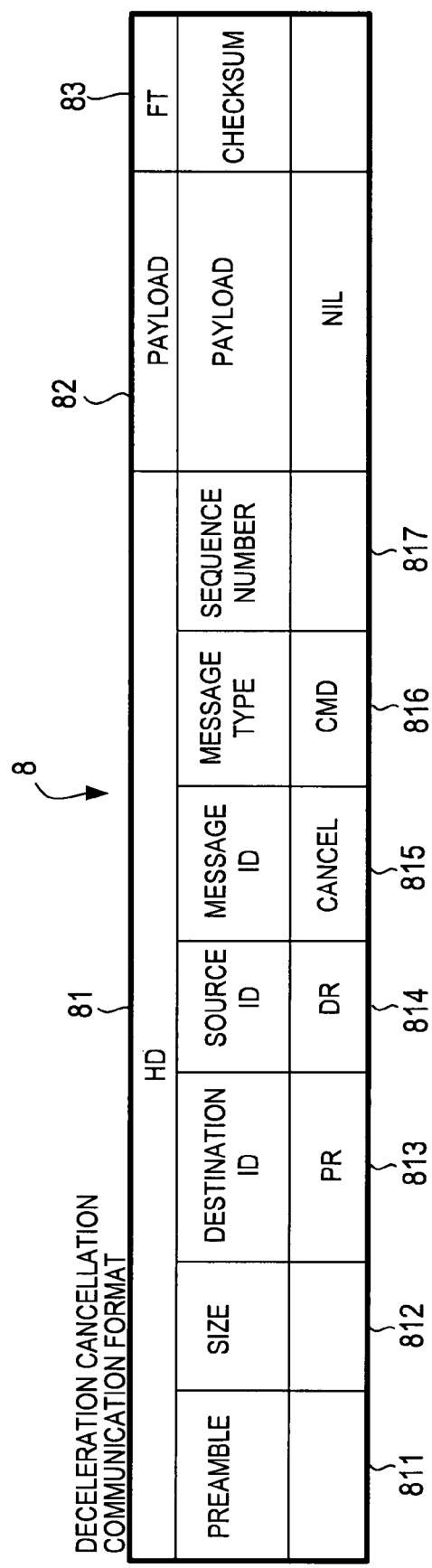
FIG. 43 is an explanatory diagram showing an example of a packet data format for a deceleration cancellation command according to the second embodiment.

FIG. 43 shows the data format of the packet 8 for a deceleration cancellation command. The packet 8 of FIG. 43 includes the header 81, the payload 82, and the checksum 83 as in the case of FIG. 42. The ID of a parent router PR upstream of the boundary node DR is stored as the destination ID 813, and the ID of this boundary node DR is stored as the source ID 814. Stored as the message ID 815 is "CANCEL", which indicates cancellation of deceleration. Stored as the message type 816 is "CMD", which indicates that it is a command. The payload 82 in this case is empty.

The deceleration commands issued by the boundary node DR in Step 1104 are sequentially transferred between the upstream nodes to be delivered to parent routers PR. In the sensor net system shown in FIG. 39, for example, the router node R7 determined as a boundary node DR sends deceleration commands to the router nodes R5 and R6. The router nodes R5 and R6 transfer the received deceleration commands to upstream nodes and, when there are the sensor nodes 1 that are connected to the router nodes R5 and R6, accumulate the deceleration commands.

The router nodes R1 to R4 upstream of the router nodes R5 and R6 accumulate the deceleration commands since there are no router nodes 2 upstream of the router nodes R1 to R4. The router nodes R1 to R4, which are parent routers PR of the sensor nodes S1 to S8, execute processing of Steps 1201 to 1206 shown in FIG. 41.

First, each parent router PR receives a deceleration command from a downstream node (1201), and stores the deceleration command in the command accumulating unit 223 of the PR block 212 shown in FIG. 11. The parent router PR receives a command request from a sensor node that is under its control when the sensor node is activated at given measurement intervals (1203). In response to the command request, the parent router PR sends a deceleration command stored in the command accumulating unit 223 to the sensor node (1204).

Figure 44:
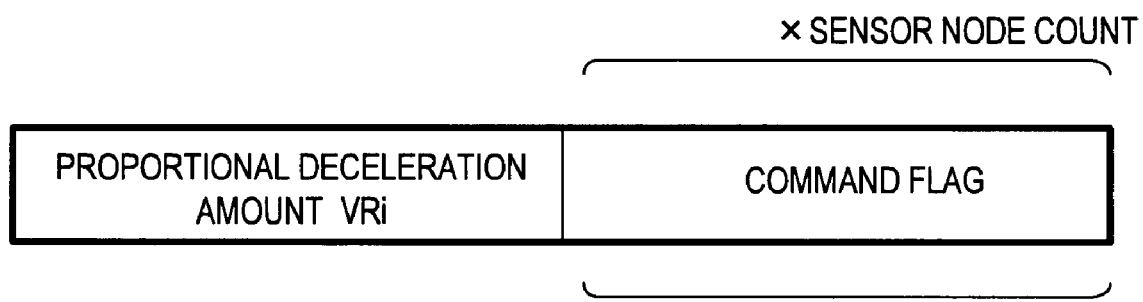
FIG. 44 is an explanatory diagram showing an example of a deceleration command which is accumulated in a parent router PR according to the second embodiment.

An example of deceleration commands accumulated in a parent router PR is shown in FIG. 44. The command accumulating unit 223 of the parent router PR extracts the proportional deceleration amount $v_{Ri}$, which is a limiting value, from a deceleration command delivered from a boundary node DR. The command accumulating unit then sets to the proportional deceleration amount $v_{Ri}$ as many command flags as the count of sensor nodes that are under control of the parent router PR. Each command flag is associated uniquely with the ID of a sensor node. When a sensor node receives a deceleration command, a flag associated with the ID of this sensor node is set so that the sensor node to which the command is given is identified.

In FIG. 41, the parent router PR receives a deceleration cancellation command from a downstream node (1205), and deletes a deceleration command that has been stored in the command accumulating unit 223 (1206). The parent router PR accordingly does not send a deceleration command to a sensor node that requests a command from the router node 2 after the parent router PR receives a deceleration cancellation command.

Described next with reference to the flow chart of FIG. 41 is an example of processing that is executed in the sensor node 1. The sensor node 1 is activated intermittently by the timer that causes interruption at given measurement intervals as has been described in the first embodiment (1301 and 1302). The sensor node 1 obtains an observation value from the sensor 107, and sends the observation value as an event to the router node R2, which is a parent router PR (1303). After finishing the transmission of the event, the sensor node 1 requests the router node R2 to send a command that is directed to this sensor node 1 (1304). In the case where there is a deceleration command stored in the router node R2 at this point, the sensor node 1 receives the deceleration command (1305).

The sensor node 1 then determines specifics of deceleration processing (1306). As in the first embodiment, deceleration processing specifics include a1: Increasing the measurement interval of the sensor node 1.

a2: Sending observation information in a mass a3: Pseudo-communication

Which one of the items a1 to a3 should be employed may be determined based on the proportional deceleration amount $v_{Ri}$. Alternatively, deceleration processing that is set in advance may be executed.

The sensor node 1 next executes the determined deceleration processing to start deceleration (1307), and then enters a sleep state (1308). Deceleration is started by setting an increased measurement interval to the timer in the case where the deceleration processing of the item a1 is chosen and, in the case where the item a2 is employed, by setting the count of events that are to be sent together. In the case where the deceleration processing of the item a3 is employed, the last observation value and the current observation value are compared to obtain the rate of change, and the sensor node 1 is set such that an observation value is sent to the router node R2, which is a parent router PR, only when the rate of change is changed.

Figure 45:
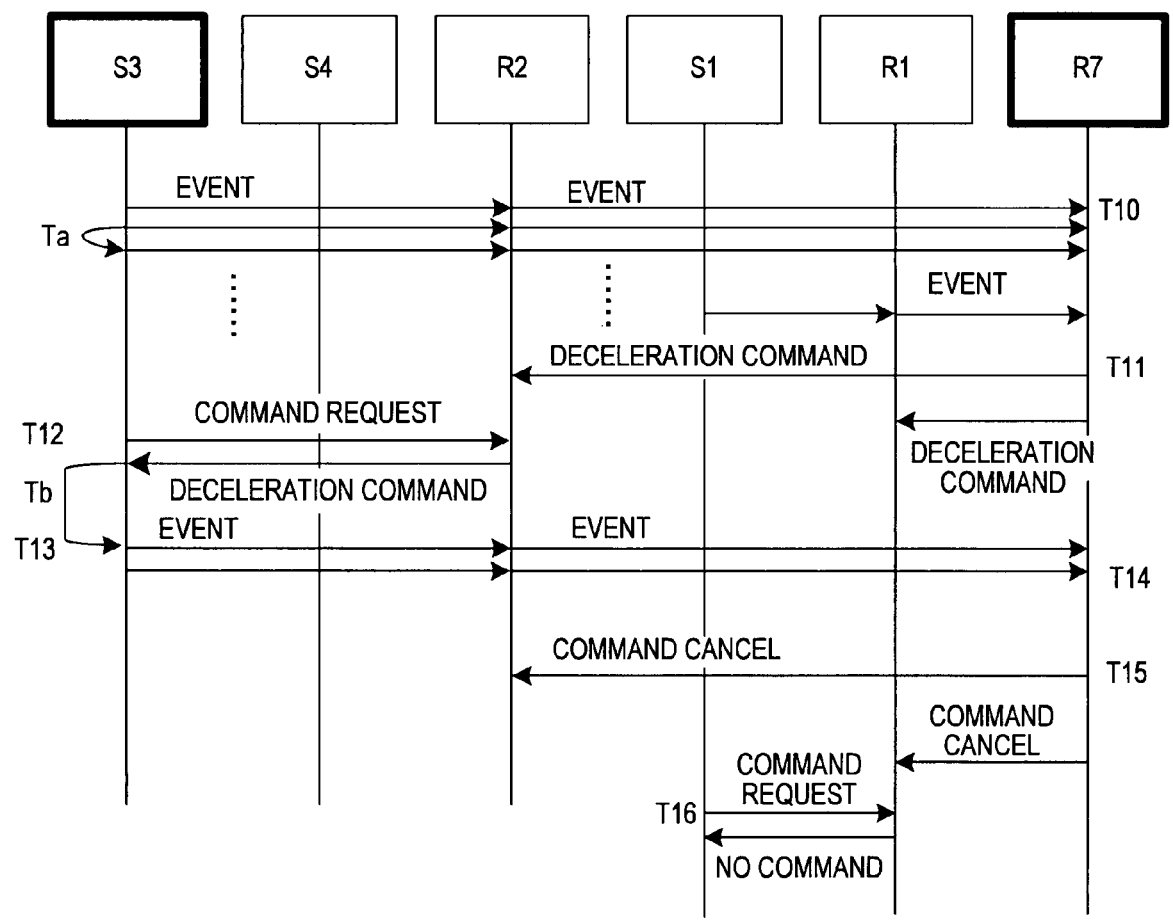
FIG. 45 is a time chart showing an example of processing that is executed in the boundary node DR, the parent router PR, and the sensor node according to the second embodiment.

FIG. 45 is a time chart for processing in which the boundary node DR (router node R7) issues a deceleration command in the sensor net system shown in FIG. 39.

In FIG. 45, the router node R7 receives events in large amount from the upstream sensor node S3. At a time T10, the router node R7 detects that the sum $\Sigma v i$ of the event inflow velocity vi has exceeded the limit transfer rate VL, thereby causing a transfer rate anomaly in the sensor net system. The router node R7 judges itself as a boundary node DR and at a time T11, sends deceleration commands to the router nodes R1 and R2, which are upstream parent routers PR.

The router nodes R1 and R2, which are parent routers PR, temporarily store the deceleration commands received from the router node R7 and wait for sensor nodes to access. The sensor node S3, which is an excess transmission rate node, sends events to the router node R2 and requests a command in an extremely short measurement cycle Ta. The sensor node S3 accordingly requests a command from the router node R2 at a time T12 immediately after the router node R2 has stored the deceleration command, and receives the deceleration command. Obtaining the deceleration command, the sensor node S3 executes the deceleration command and performs given deceleration processing as described above. In the case where increasing the measurement interval is employed as deceleration processing, for example, the measurement interval of the sensor node S3 is extended to Tb of FIG. 45, to thereby reduce the amount of data transferred from the sensor node S3 per unit time (a time T13).

After issuing the deceleration commands, the router node R7, which is a boundary node DR, monitors the event inflow velocity vi. When it is found through the monitoring that the sum $\Sigma v i$ has become lower than the limit transfer rate VL, the router node R7 judges that the transfer rate in the sensor net system has been restored to a normal level (a time T14). Since the transfer rate in the sensor net system returns to normal, the router node R7 issues deceleration cancellation commands to the upstream parent routers PR to stop further deceleration (transmission rate reduction).

The normal sensor node S1 access its parent router PR, the router node R1, at normal measurement intervals (e.g., 5-minute intervals), and requests a command after finishing sending an event (a time T16). The router node R1 at this point has finished deleting the deceleration command in response to the instruction from the router node R7, and a normal sensor node is thus prevented from starting deceleration processing.

As has been described, according to the second embodiment, a sensor node whose per-unit time data transmission amount is excessively high can be decelerated while skipping identification of an excess transmission rate node and other steps. Instead of determining which sensor node should be reduced in transmission rate by invariably using the same criterion of whether Expression (5) is satisfied or not, the second embodiment reduces the transmission rate of nodes in descending order of per-unit time data transmission amount. Since a sensor node whose transmission rate is not excessively high has little chance of receiving a deceleration command, an overload on a communication path in the sensor net system can be avoided while transferring information from the sensor node as close to real time as possible. For instance, even when multiple sensor nodes have substantially the same per-unit time data transmission amount, it is possible to choose, as a transmission rate reduction target, a sensor node that is appropriate for sufficient lowering of the transfer rate, and as much sensor node information as possible can be transferred.

Third Embodiment

Figure 46:
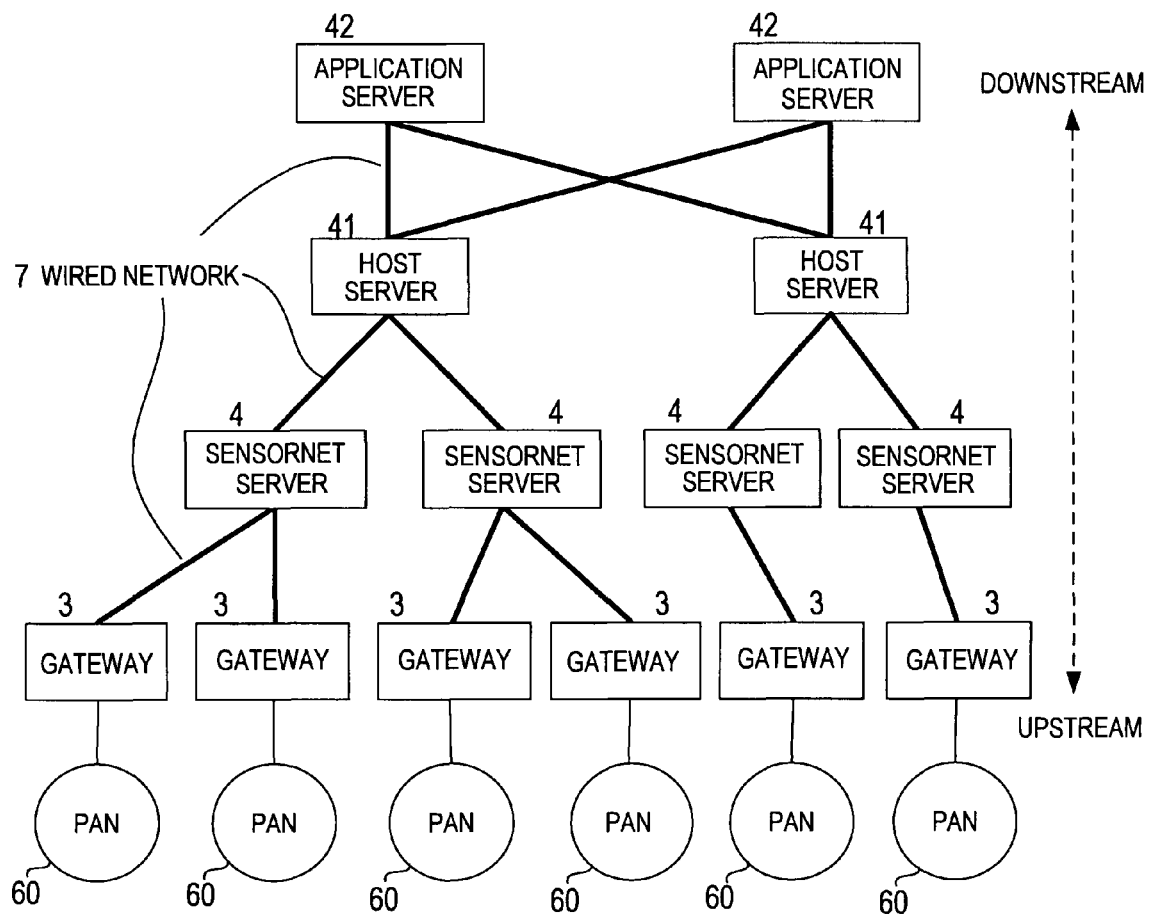
FIG. 46 is an example of a block diagram showing a sensor net system according to a third embodiment of this invention.
Figure 47:
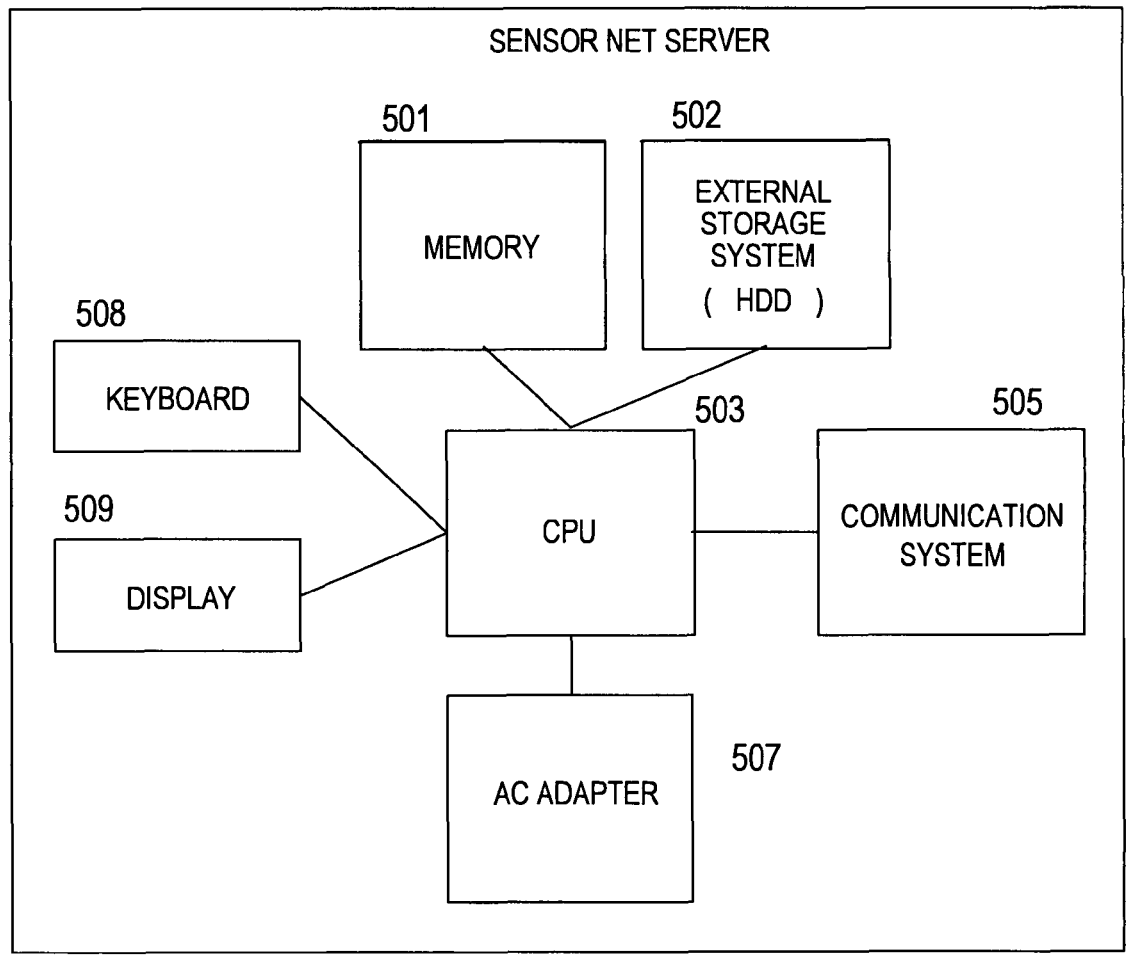
FIG. 47 is an example of a block diagram showing a server node according to the third embodiment.

FIGS. 46 and 47 show a sensor net system according to a third embodiment of this invention which has more than one gateway 3 and sensor net server 4 described in the first embodiment. The third embodiment shows an example in which the deceleration processing between router nodes described in the first embodiment is applied to event transfer between servers.

A personal area network (PAN) 60 constituted of the sensor node 1, the router node 2, and the wireless network 6 which are described in the first embodiment with reference to FIG. 1 is connected upstream to each gateway 3. Events from the sensor node 1 are transferred downstream to the gateway 3 by the PAN 60.

The sensor net server 4, which collects events transferred from the upstream, is connected downstream to each gateway 3 via the wired network 7.

A host server 41, which utilizes events collected by the sensor net server 4, is connected downstream to the sensor net server 4 via the wired network 7. The host server 41 receives events from multiple sensor net servers 4. An application server 42 is connected downstream to the host server 41 via the wired network 7. The application server 42 receives events from the host server 41, and transfers the events to a downstream computer (not shown). The host server 41, the application server 42, or the sensor net server 4 can process a received event and send the thus created information as a new event to a downstream computer.

Events from the sensor node 1 are sent from the PAN 60, collected in the downstream sensor net server 4 through the gateway 3, and further transferred to the host server 41 and the application server 42.

The host server 41 and the application server 42 have the configuration of the sensor net server 4 as shown in FIG. 47.

FIG. 47 is a block diagram showing the configuration of the host server 41 or the application server 42.

In FIG. 47, the host server 41 or the application server 42 functions as an upper layer server node that transfers events between servers. The host server 41 or the application server 42 has a memory 501, which stores information, a CPU 503, which performs computation processing, an external storage system 502, which records data for a long time, a communication device 505, which communicates with other components, an AC adapter 507, which supplies power to components of the server 41 or 42, a keyboard 508, which is operated by an administrator or the like, and a display 509, which displays information. When the host server 41 or the application server 42 is activated, a program recorded in the external storage system 502, which is constituted of a disk device or the like, is read onto the memory 501, and is executed by the CPU 503 to perform given processing.

A program read onto the memory 502 refers to or process an event received from an upstream server, and sends a new event.

A server node in such a sensor net system is similar to the router node 2 of the first embodiment in that a failure can occur in communications between servers when the sum of inflow velocity of events received from the upstream through each server node exceeds the limit transfer rate VL. Therefore, the server node downstream of the gateway 3 is treated in the same way as the router node 2 and sensor node 1 of the first embodiment, and a server node that is located on the border of transfer rate excess is determined as a boundary server node. A server node can have a higher CPU processing performance and more memories than the router node 2 of the first embodiment. Therefore, the limit transfer rate VL may be replaced by a limit transfer rate VL', which is enhanced in proportion to the server node performance.

Expression (5) of the first embodiment is used to identify, as an excess transmission rate node, a sensor node that has an excessively high transmission rate or a relay node that has an excessively high transfer rate. A relay node attaches its ID to an event from a sensor node when transferring the event, thereby enabling the boundary server node to identify the relay node as an excess transmission rate node. The boundary server node determines, as a deceleration server node, a server node that is a deceleration target, determines, as a deceleration processing executing node, a server node that executes deceleration processing, and then performs deceleration processing as described in the first embodiment with reference to FIG. 15.

The boundary server node sends an alarm event, which indicates that deceleration processing has started due to an excessively high event transfer amount, to a downstream server node. Receiving the alarm event, the server node sends the alarm to a further downstream server node (or user terminal).

For instance, when the sensor net server 4 receives events in large amount from multiple gateways 3, the sensor net server 4 performs deceleration processing and sends an alarm event to the downstream host server 41. The amount of events transferred to a server node downstream of a server node where an excessively high transfer rate is detected is prevented from exceeding the limit transfer rate in this manner. Also, the received alarm event enables the downstream server node to identify a communication path on which an anomaly has occurred. Deceleration processing that can be executed in a server node is the item b1 or a2 given in the item (3) "Specifics of Deceleration Processing" of the first embodiment.

The following processing can also be performed as deceleration processing of a server node:

c1: Events to be transferred to a downstream node are pulled off and all the removed events are stored in the external storage system 502. Having more processing performance to spare than the router node 2 and the gateway 3, the server node analyzes the received events to find out the cause of the anomaly.

c2: The events stored in the external storage system 502 in the item c1 are transmitted with a delay.

A server node that executes deceleration processing and a boundary server node may analyze every received event in order to identify which event should be filtered.

As has been described, the third embodiment prevents a failure in communications between servers of a sensor net system by executing detection of a transfer rate excess and deceleration processing between server nodes which are connected to each other via the wired network 7.

Modification Example 1

In the first embodiment, specifics of deceleration processing to be employed in Step 1008 of FIG. 12 are chosen in advance from the items a1 to a3 and b1 of (3) "Specifics of Deceleration Processing". Alternatively, the router node 2 that is determined as a boundary node DR, the gateway 3, the router node 2 that is determined as a deceleration processing executing node, or the sensor node 1 may choose one of the deceleration processing specifics items a1 to a3 and b1 in accordance with a given rule.

Also, a boundary node DR may choose one of the deceleration processing specifics as either deceleration processing executed in the sensor node 1 or deceleration processing executed in the router node 2.

Modification Example 2

As in the third embodiment where a boundary server node sends an alarm event to a downstream server node, a boundary node of the first embodiment may send an alarm event to the downstream router node 2 or gateway 3. This enables the router node 2 or the gateway 3 downstream of the boundary node to identify on which communication path an anomaly has occurred.

This invention thus enables a sensor net system to transfer information sent from a sensor node as close to real time as possible without discarding the information completely while preventing the per-unit time data transmission amount along a path of the sensor net system from increasing to an excessive level. This invention is therefore applicable to a sensor net system for health management, a sensor net system for management of a building environment, and the like.

While the present invention has been described in detail and pictorially in the accompanying drawings, the present invention is not limited to such detail but covers various obvious modifications and equivalent arrangements, which fall within the purview of the appended claims.

What is claimed is:

1. A sensor network system, comprising:
a sensor node which transmits obtained information as an event; and
a relay node which receives the event and transfers the event toward a server computer,
wherein the relay node includes:
a limit transfer rate judging unit which judges whether or not a transfer rate of the event is higher than a limit transfer rate set in advance;
an excess transmission rate node identifying unit which identifies, when the limit transfer rate judging unit judges that the transfer rate is higher than the limit transfer rate, as an excess transmission rate node, a sensor node connected to the relay node and having an event transmission rate that meets a preset condition;
a deceleration node selecting unit which chooses, as a deceleration node, a sensor node whose transmission rate should be reduced, the deceleration node selecting unit choosing one of the excess transmission rate node and other sensor nodes than the excess transmission rate node;
a deceleration processing executing node selecting unit which chooses, as a deceleration processing executing node, one of the deceleration node and a relay node that is connected to the deceleration node; and
a deceleration initiating unit which instructs the deceleration processing executing node to execute processing specified in accordance with a preset deceleration processing rule.

2. The sensor network system according to claim 1,
wherein the deceleration node selecting unit chooses the excess transmission rate node as the deceleration node, and
wherein the deceleration processing executing node selecting unit chooses the relay node as the deceleration processing executing node.

3. The sensor network system according to claim 1,
wherein the deceleration node selecting unit chooses other sensor nodes than the excess transmission rate node as the deceleration nodes, and
wherein the deceleration processing executing node selecting unit chooses the relay node as the deceleration processing executing node.

4. The sensor network system according to claim 1,
wherein the deceleration node selecting unit chooses the excess transmission rate node as the deceleration node, and
wherein the deceleration processing executing node selecting unit chooses the excess transmission rate node as the deceleration processing executing node.

5. The sensor network system according to claim 1,
wherein the deceleration node selecting unit chooses other sensor nodes than the excess transmission rate node as the deceleration nodes, and
wherein the deceleration processing executing node selecting unit chooses the other sensor nodes than the excess transmission rate node as the deceleration processing executing nodes.

6. The sensor network system according to claim 1,
wherein the deceleration node selecting unit chooses the excess transmission rate node as the deceleration node, and
wherein the deceleration processing executing node selecting unit chooses, as the deceleration processing executing node, a relay node that relays events of the deceleration node on a side closer to sensor nodes than the relay node.

7. The sensor network system according to claim 1,
wherein the deceleration node selecting unit chooses the excess transmission rate node as the deceleration node, and
wherein the deceleration processing executing node selecting unit chooses, as the deceleration processing executing node, a relay node under direct control of the excess transmission rate node.

8. The sensor network system according to claim 1, wherein, when the limit transfer rate judging unit judges that the transfer rate is higher than the limit transfer rate and, at the same time, the transmission rate of a sensor node under direct control of the relay node of the limit transfer rate judging unit and the transfer rate of a relay node under direct control of the relay node of the limit transfer rate judging unit are each less than the limit transfer rate, the relay node of the limit transfer rate judging unit is determined as a boundary node.

9. The sensor network system according to claim 8, wherein, after the limit transfer rate judging unit judges that the transfer rate is higher than the limit transfer rate and when the transfer rate of events that are transferred toward the server computer from the relay node of this limit transfer rate judging unit becomes lower than the limit transfer rate, the relay node sends a deceleration cancellation instruction to a relay node under direct control of the sensor node.

10. The sensor network system according to claim 1,
wherein the deceleration processing executing node has an event accumulating unit in which the event is stored, and
wherein, when a count of events accumulated in the event accumulating unit reaches a preset number, the deceleration processing executing node sends the events in a mass.

11. A sensor network system, comprising:
a sensor node which transmits obtained information as an event; and
a relay node which receives the event and transfers the event toward a server computer,
wherein the relay node includes:
a limit transfer rate judging unit which judges whether or not a transfer rate of the event is higher than a limit transfer rate set in advance; and
a deceleration instructing unit which sends, when the limit transfer rate judging unit judges that the transfer rate is higher than the limit transfer rate, a deceleration instruction to a relay node under direct control of a sensor node that is connected to the relay node of this deceleration instructing unit,
wherein the sensor node includes:
a communication processing unit which communicates with the relay node under direct control of the sensor node; and
a deceleration processing executing unit which performs, when the communication processing unit receives the deceleration instruction, processing specified in accordance with a preset deceleration processing rule on the event to reduce a transmission rate of the event, and
wherein, after the limit transfer rate judging unit judges that the transfer rate is higher than the limit transfer rate and upon the transfer rate of the event that is transferred toward the server computer from the relay node that includes the limit transfer rate judging unit becoming lower than the limit transfer rate, the relay node sends a deceleration cancellation instruction to a relay node under direct control of the sensor node.

12. A sensor network system, comprising:
a relay node which transfers an event received from a sensor node; and
a server node which receives the transferred event and sends the event to a server computer,
wherein the server node includes:
a limit transfer rate judging unit which judges whether or not a transfer rate of the event transferred by the server node to the server computer is higher than a limit transfer rate set in advance;
an excess transmission rate node identifying unit which identifies, when the limit transfer rate judging unit judges that the transfer rate is higher than the limit transfer rate, as an excess transmission rate node, a relay node connected to the server node and having an event transfer rate that meets a preset condition;
a deceleration node selecting unit which chooses, as a deceleration node, a relay node whose transfer rate should be reduced, the deceleration node selecting unit choosing one of the excess transmission rate node and other relay nodes than the excess transmission rate node;
a deceleration processing executing node selecting unit which chooses, as a deceleration processing executing node, one of the deceleration node and a server node that is connected to the deceleration node; and
a deceleration initiating unit which instructs the deceleration processing executing node to execute processing specified in accordance with a preset deceleration processing rule.

13. A method of processing data in a sensor network system, comprising:
judging whether or not a transfer rate of an event transferred from a relay node toward a server computer is higher than a limit transfer rate set in advance, the event being information that is obtained by a sensor node;
identifying, when it is judged that the transfer rate is higher than the limit transfer rate, as an excess transmission rate node, a sensor node connected to the relay node and having an event transmission rate that meets a preset condition;

selecting as a deceleration node a sensor node whose transmission rate should be reduced, from one of the excess transmission rate node and other sensor nodes than the excess transmission rate node;

selecting, as a deceleration processing executing node, one of the deceleration node and a relay node that is connected to the deceleration node; and instructing the deceleration processing executing node to execute processing specified in accordance with a preset deceleration processing rule.

14. The method of processing data in a sensor network system according to claim 13, further comprising:
choosing the excess transmission rate node as the deceleration node; and
choosing the relay node as the deceleration processing executing node.

15. The method of processing data in a sensor network system according to claim 13, further comprising:
choosing other sensor nodes than the excess transmission rate node as the deceleration nodes; and
choosing the relay node as the deceleration processing executing node.

16. The method of processing data in a sensor network system according to claim 13, further comprising determining, when it is judged that the transfer rate is higher than the limit transfer rate and when the transmission rate of a sensor node under direct control of the relay node and the transfer rate of a relay node under direct control of the relay node are each less than the limit transfer rate, the relay node as a boundary node.

17. The method of processing data in a sensor network system according to claim 13, further comprising sending, after it is judged that the transfer rate is higher than the limit transfer rate and when the transfer rate of events that are transferred toward the server computer from the relay node becomes lower than the limit transfer rate, a deceleration cancellation instruction to a relay node under direct control of the sensor node.

18. A method of processing data in a sensor network system, comprising:
judging whether or not a transfer rate of an event transferred from a relay node toward a server computer is higher than a limit transfer rate set in advance, the event being information that is obtained by a sensor node;
sending, when it is judged that the transfer rate is higher than the limit transfer rate, a deceleration instruction to a relay node under direct control of a sensor node that is connected to the relay node;
performing, by the sensor node, upon reception of the deceleration instruction from the relay node under direct control of the sensor node, processing specified in accordance with a preset deceleration processing rule on the event to reduce a transmission rate of the event; and
sending, after it is judged that the transfer rate is higher than the limit transfer rate and upon the transfer rate the event that is transferred toward the server computer from the relay node becoming lower than the limit transfer rate, a deceleration cancellation instruction to a relay node under direct control of the sensor node.

* * * * *